United States Patent [19]
Ohtake

[11] Patent Number: 5,831,768
[45] Date of Patent: Nov. 3, 1998

[54] ZOOM LENS CAPABLE OF SHIFTING AN IMAGE

[75] Inventor: Motoyuki Ohtake, Kanagawa-ken, Japan

[73] Assignee: Nikon Corporation, Tokyo, Japan

[21] Appl. No.: 540,164

[22] Filed: Oct. 6, 1995

[30] Foreign Application Priority Data

Oct. 6, 1994 [JP] Japan ................................... 6-268422
Nov. 22, 1994 [JP] Japan ................................... 6-312606

[51] Int. Cl.⁶ .................................................. G02B 27/64
[52] U.S. Cl. .......................... 359/557; 359/554; 359/689
[58] Field of Search .................................. 359/554–557, 359/676–677, 683–685, 689–690

[56] References Cited

U.S. PATENT DOCUMENTS

| | | | |
|---|---|---|---|
| 4,653,872 | 3/1987 | Takahashi | 359/687 |
| 5,000,549 | 3/1991 | Yamazaki | 359/557 |
| 5,040,881 | 8/1991 | Tsuji | 359/557 |
| 5,054,897 | 10/1991 | Ozawa | 359/708 |
| 5,069,537 | 12/1991 | Kitagishi | 359/557 |
| 5,086,356 | 2/1992 | Kojima et al. | 359/708 |
| 5,270,857 | 12/1993 | Oizumi et al. | 359/557 |
| 5,442,486 | 8/1995 | Sato | 359/557 |
| 5,502,594 | 3/1996 | Suzuki et al. | 359/557 |
| 5,530,589 | 6/1996 | Sato | 359/557 |
| 5,530,593 | 6/1996 | Shibayama et al. | 359/554 |
| 5,654,826 | 8/1997 | Suzuki | 359/557 |

FOREIGN PATENT DOCUMENTS

| | | |
|---|---|---|
| 1-191112 | 8/1989 | Japan . |
| 2-103014 | 4/1990 | Japan . |
| 2-93620 | 4/1990 | Japan . |
| 6075192A | 3/1994 | Japan . |
| 7244258AA | 9/1995 | Japan . |

*Primary Examiner*—Thong Nguyen
*Attorney, Agent, or Firm*—Oliff & Berridge, PLC

[57] ABSTRACT

A zoom lens with a high zoom ratio is disclosed which is capable of shifting an image while preventing image deterioration. The zoom lens includes a lens group having, in order from the object, a first sub-lens group, a second sub-lens group, and a third sub-lens group, wherein the lens group moves as an integral unit along the optical axis for zooming from the wide-angle end to the telephoto end. The second sub-lens group has at least one positive lens component and at least one negative lens component and is moveable in a direction substantially perpendicular to the optical axis to shift the image.

17 Claims, 62 Drawing Sheets

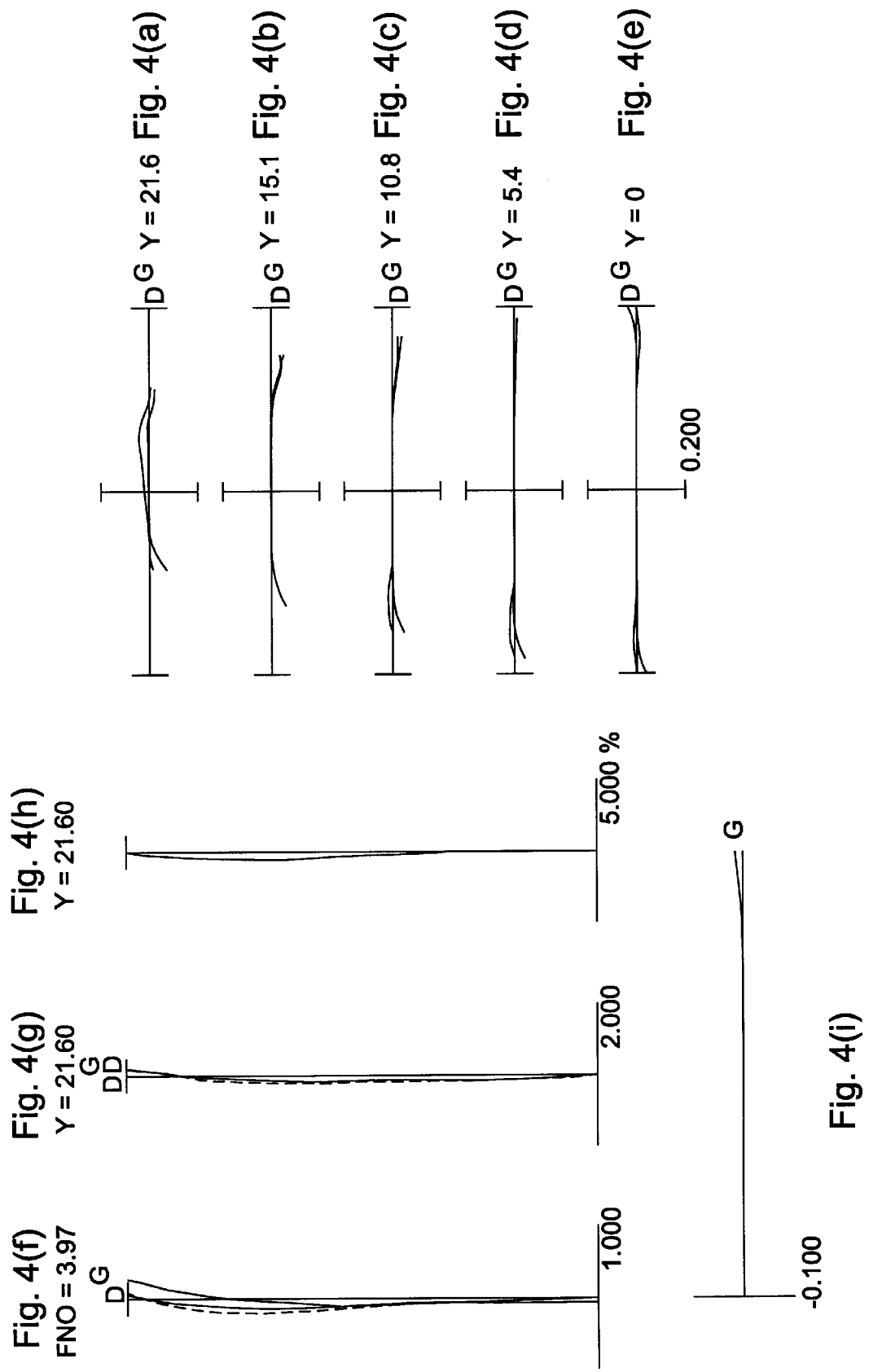

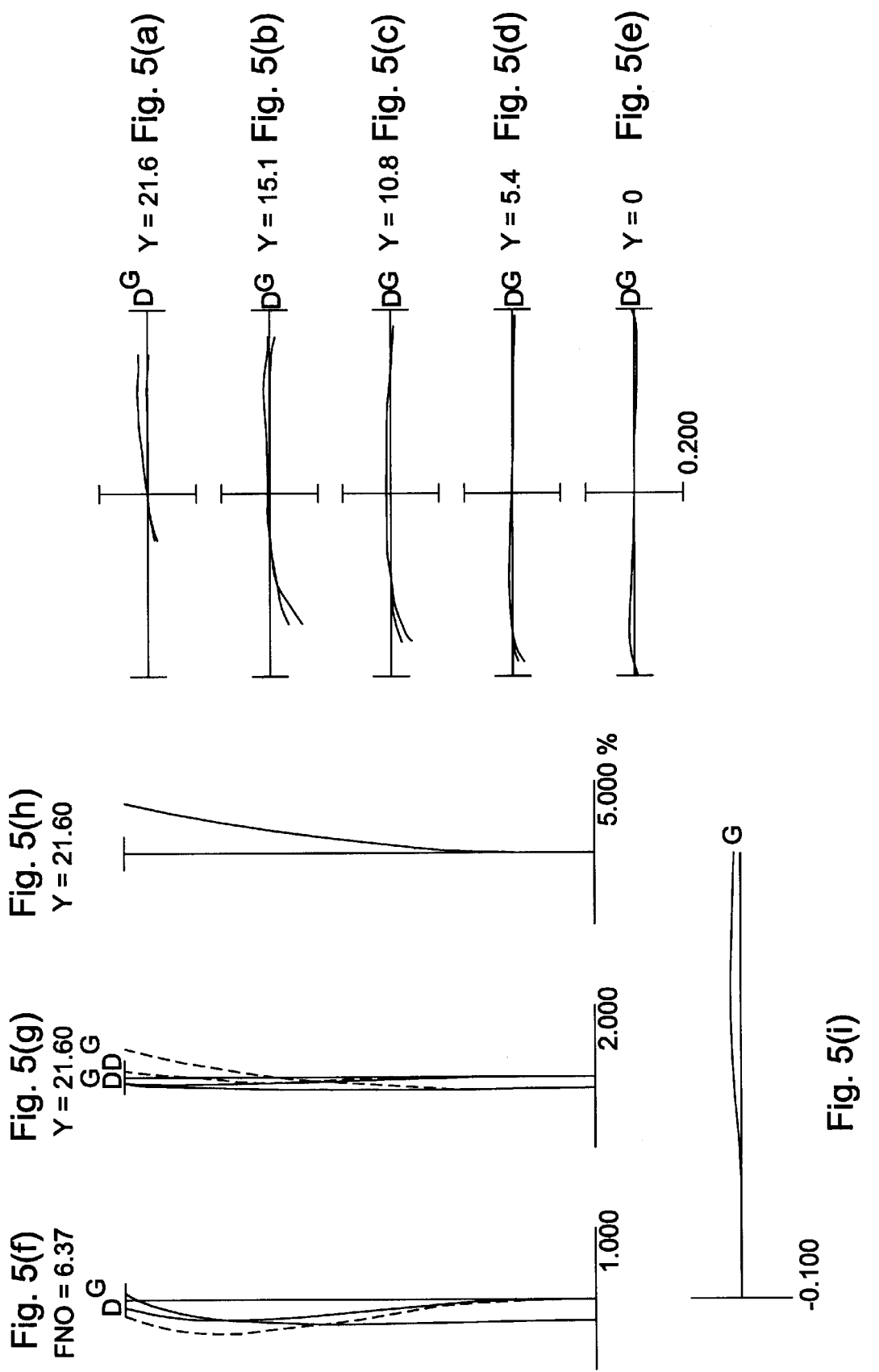

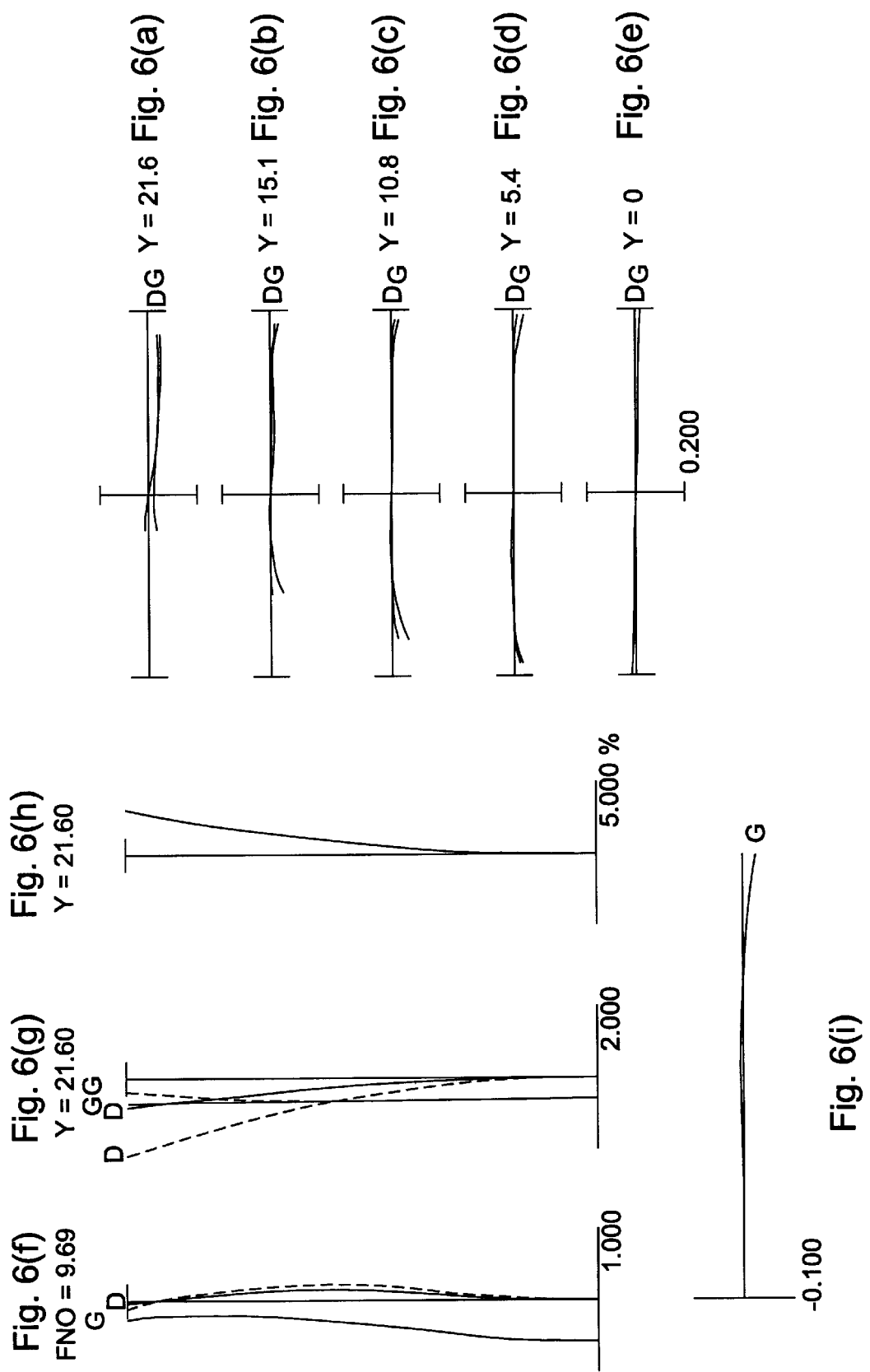

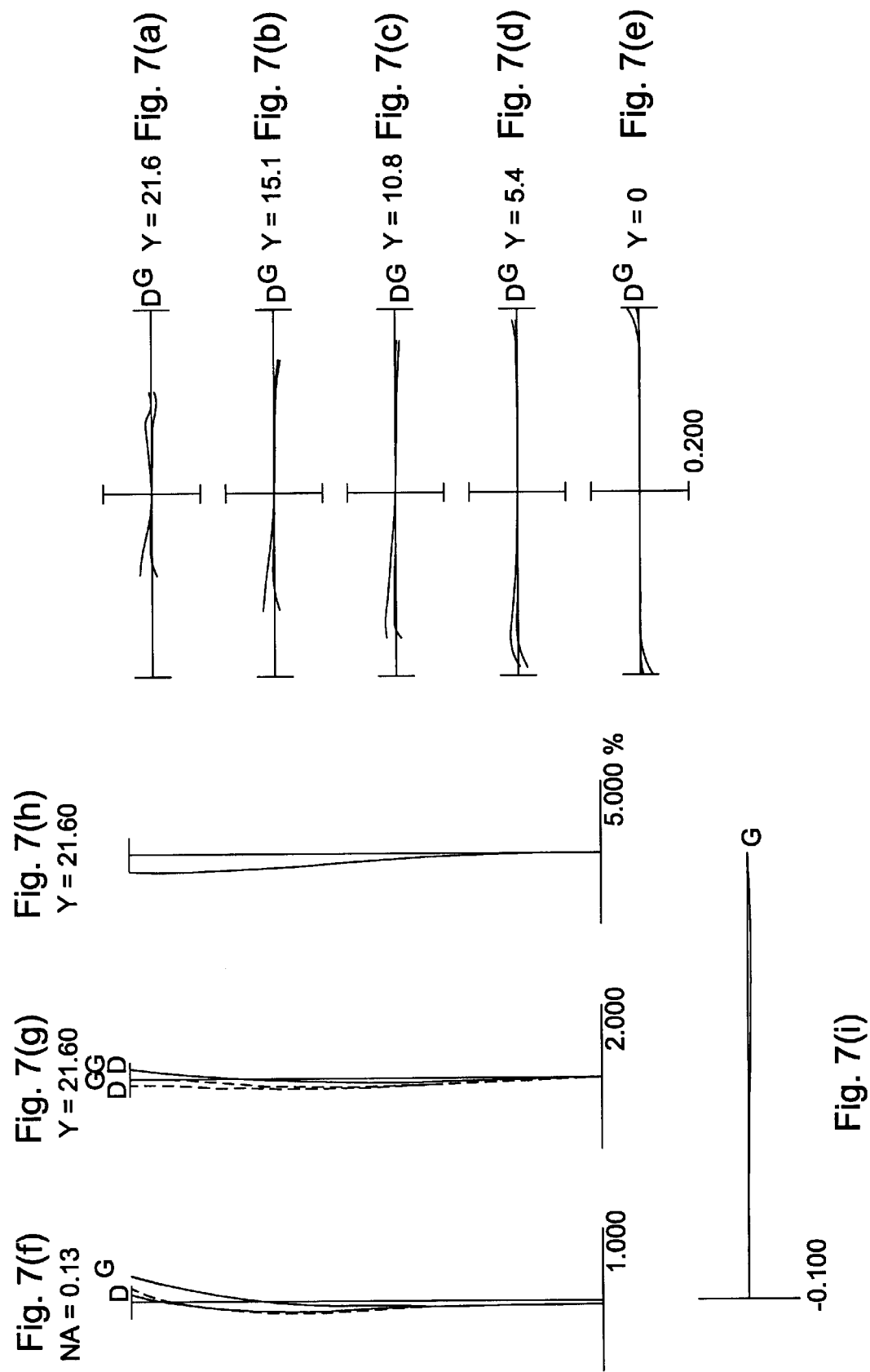

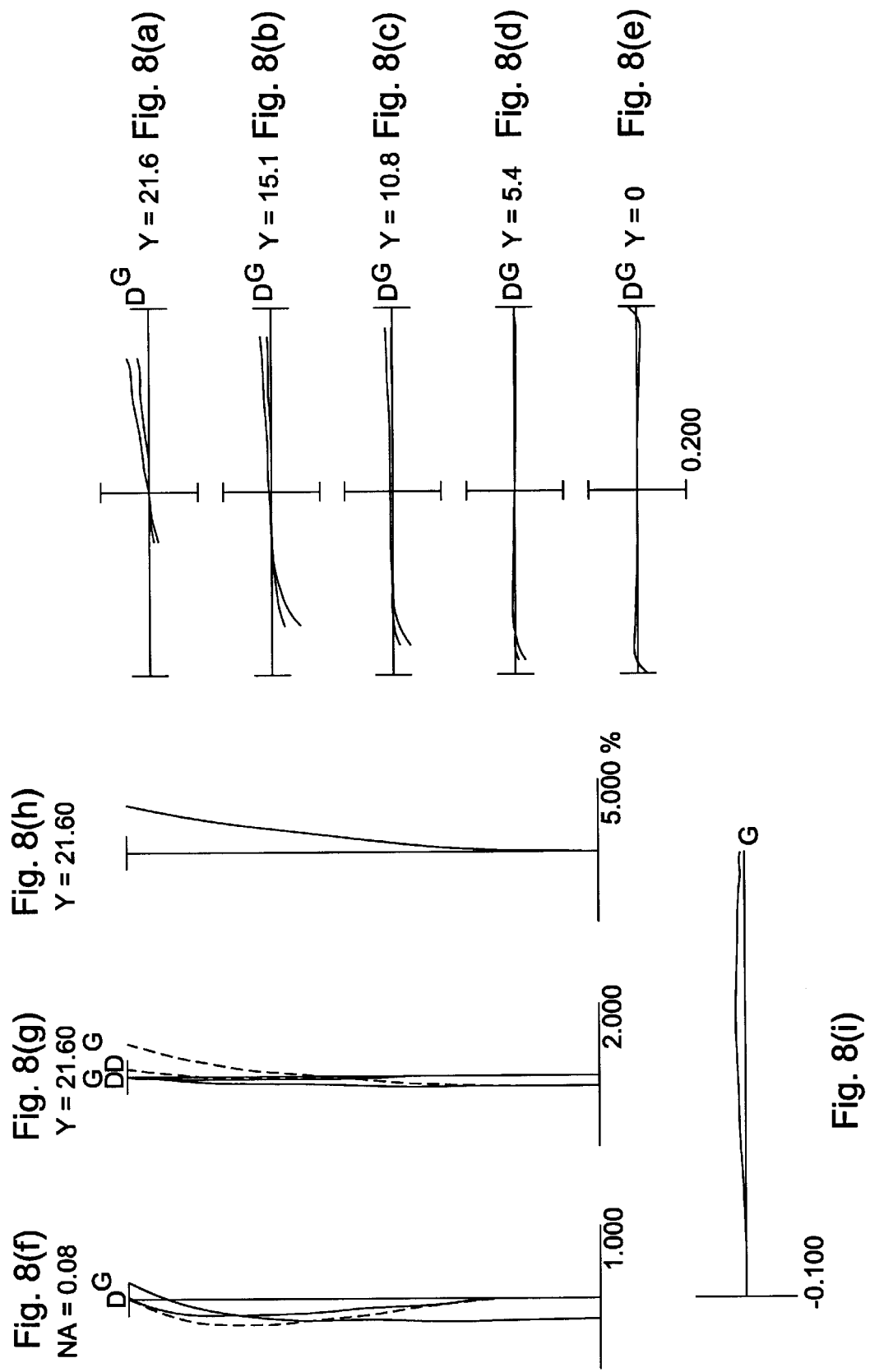

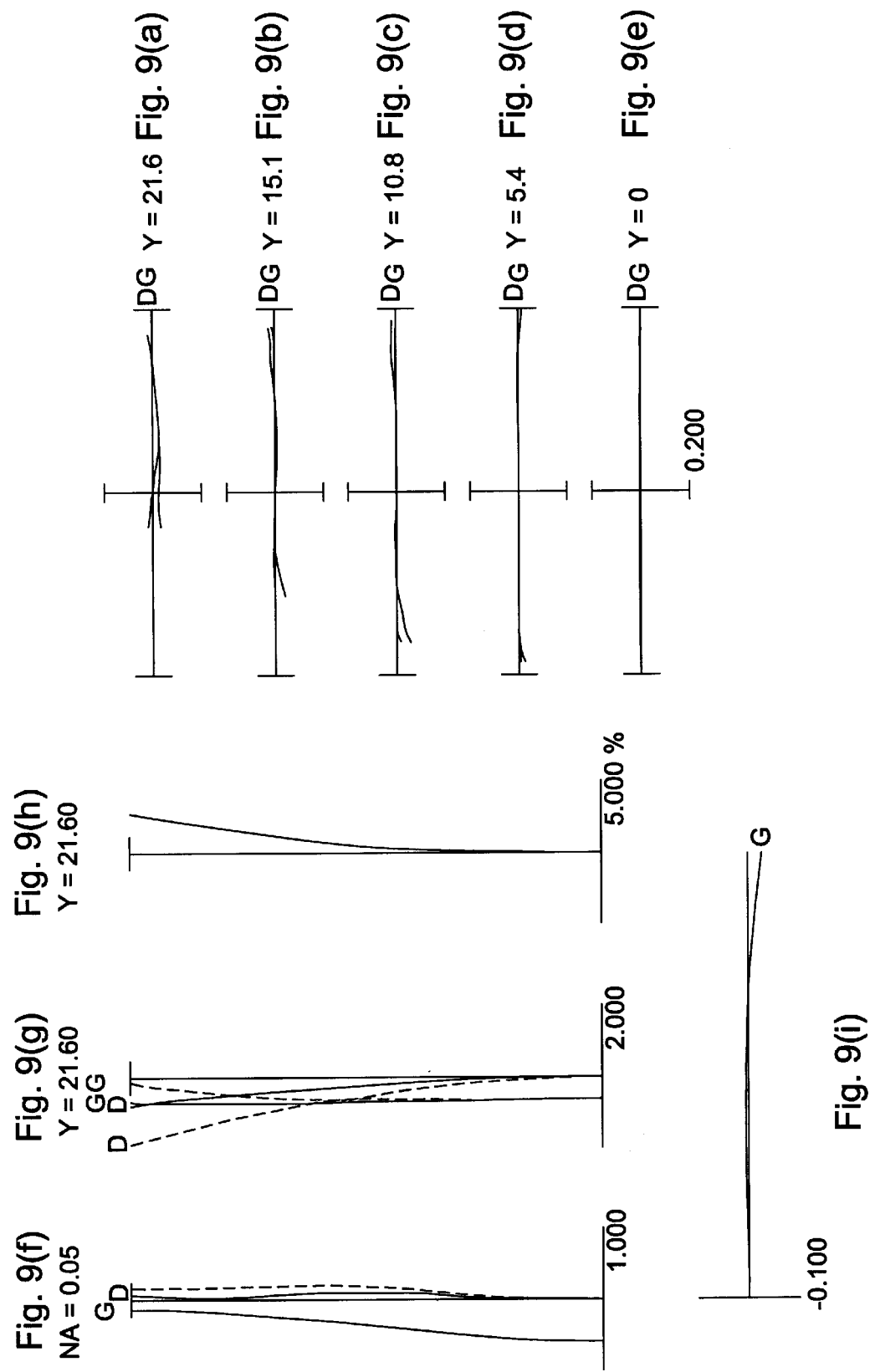

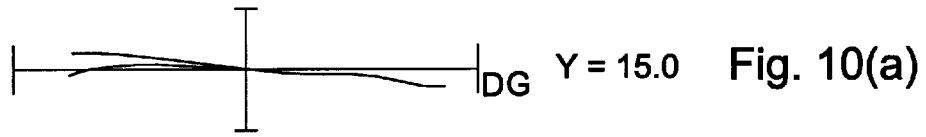
Fig. 10(a) Y = 15.0
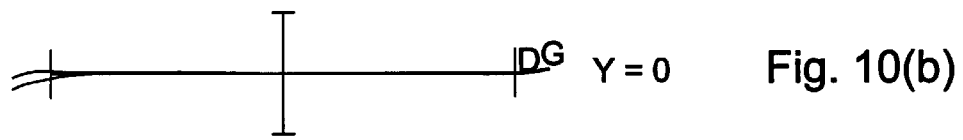
Fig. 10(b) Y = 0
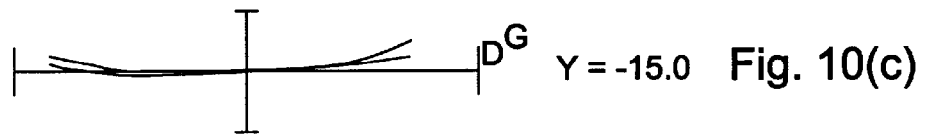
Fig. 10(c) Y = -15.0
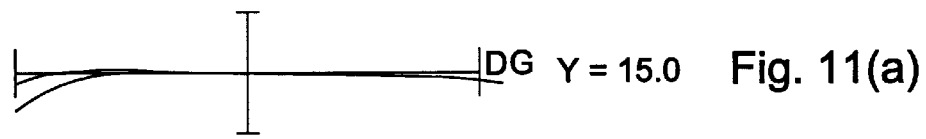
Fig. 11(a) Y = 15.0
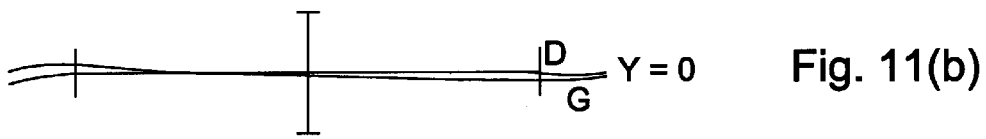
Fig. 11(b) Y = 0
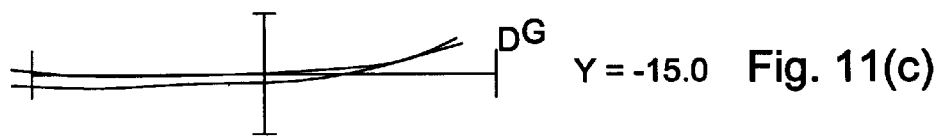
Fig. 11(c) Y = -15.0

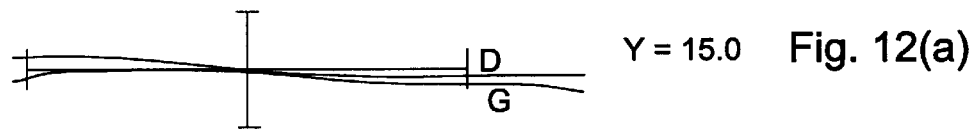
Y = 15.0   Fig. 12(a)
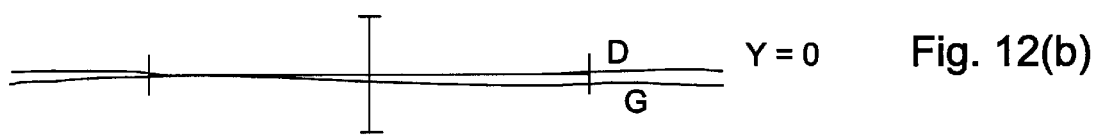
Y = 0   Fig. 12(b)
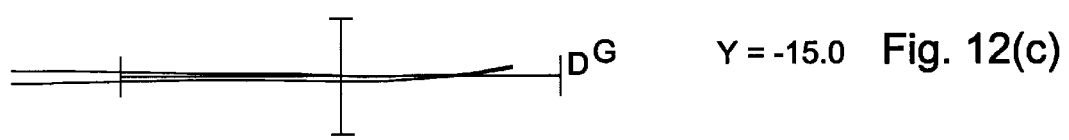
Y = -15.0   Fig. 12(c)
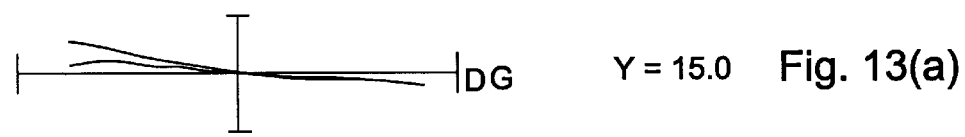
Y = 15.0   Fig. 13(a)
Y = 0   Fig. 13(b)
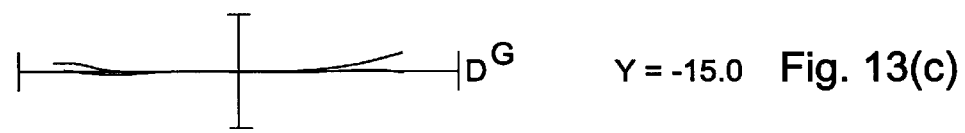
Y = -15.0   Fig. 13(c)

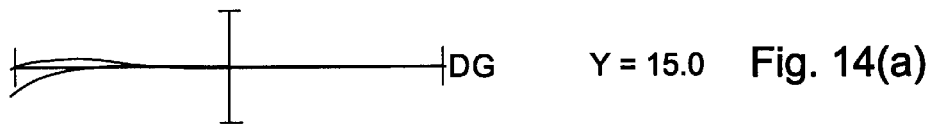
Y = 15.0   Fig. 14(a)
Y = 0   Fig. 14(b)
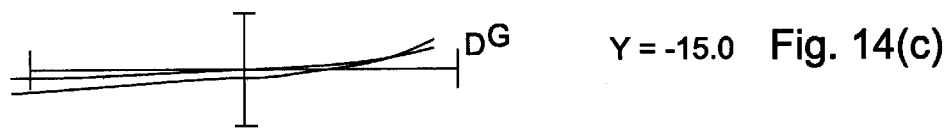
Y = -15.0   Fig. 14(c)
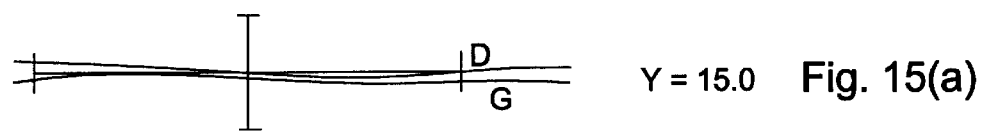
Y = 15.0   Fig. 15(a)
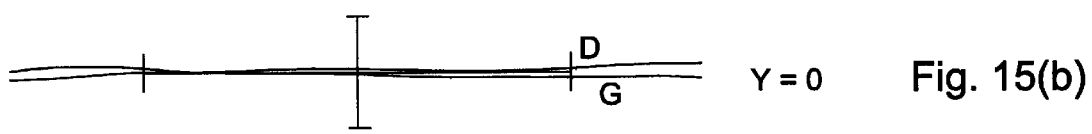
Y = 0   Fig. 15(b)
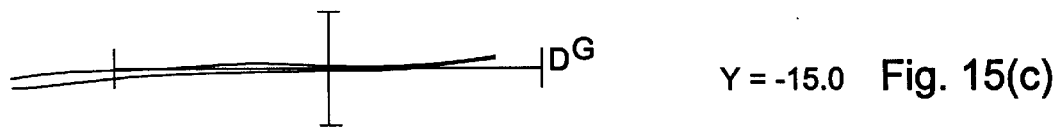
Y = -15.0   Fig. 15(c)

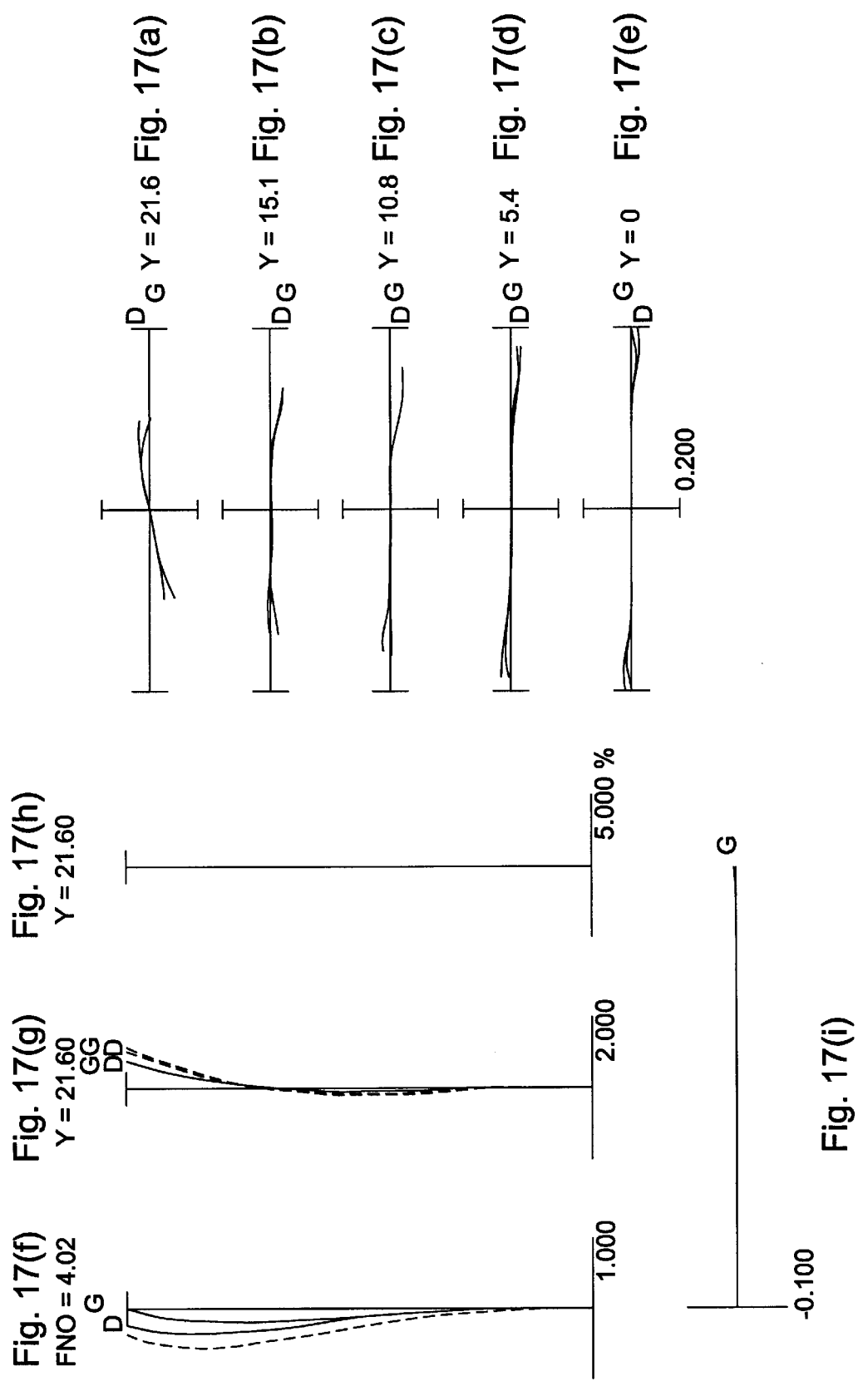

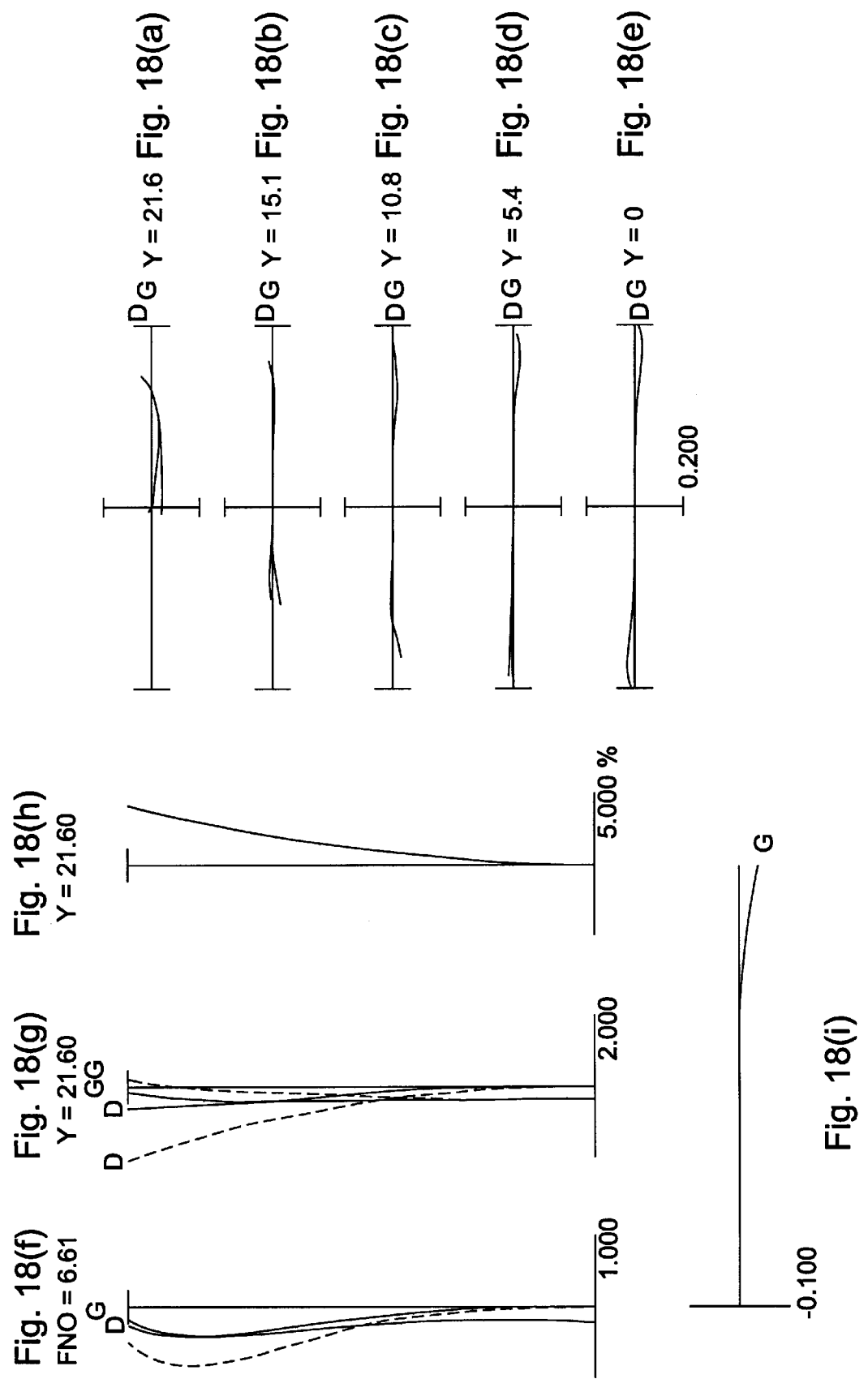

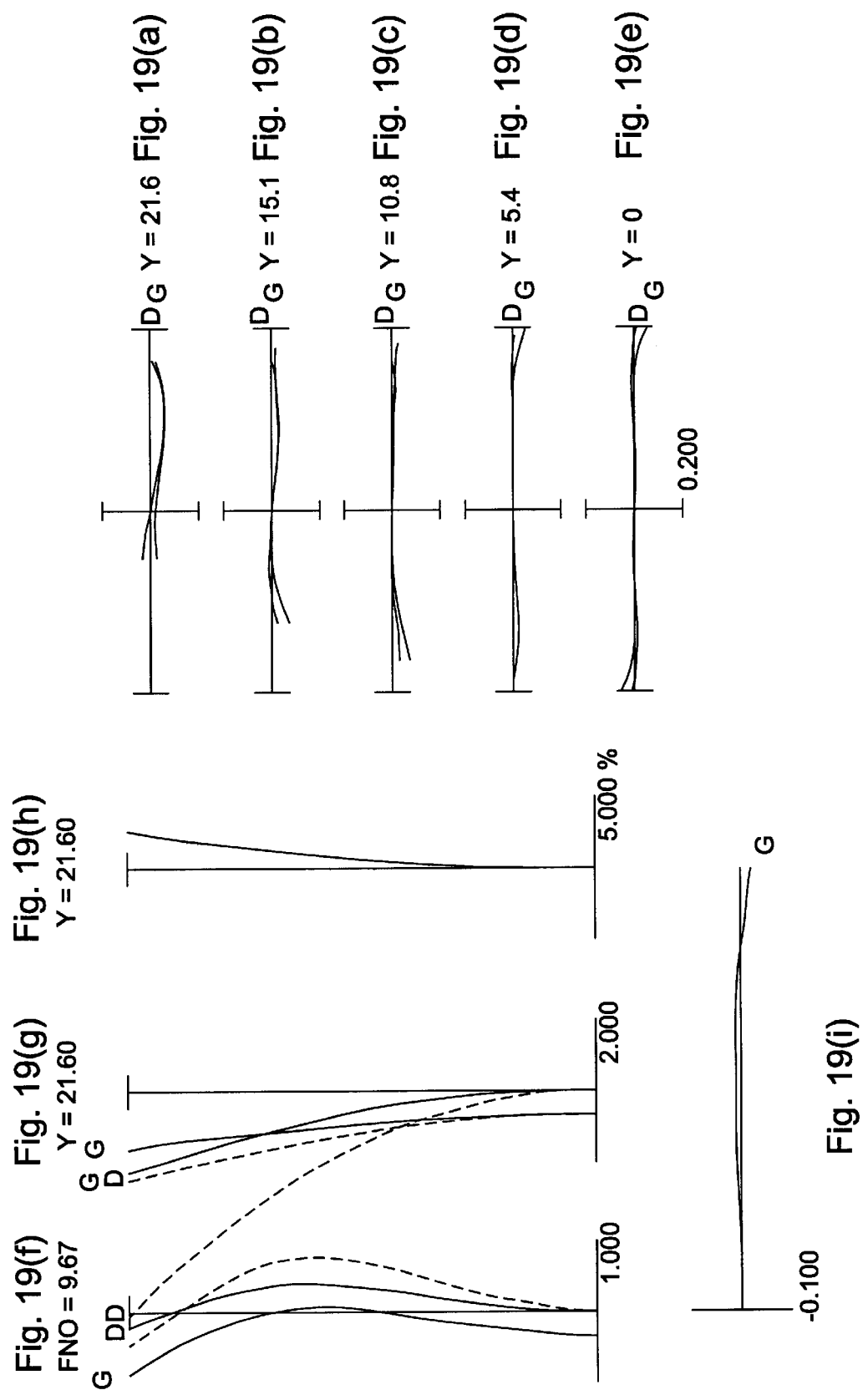

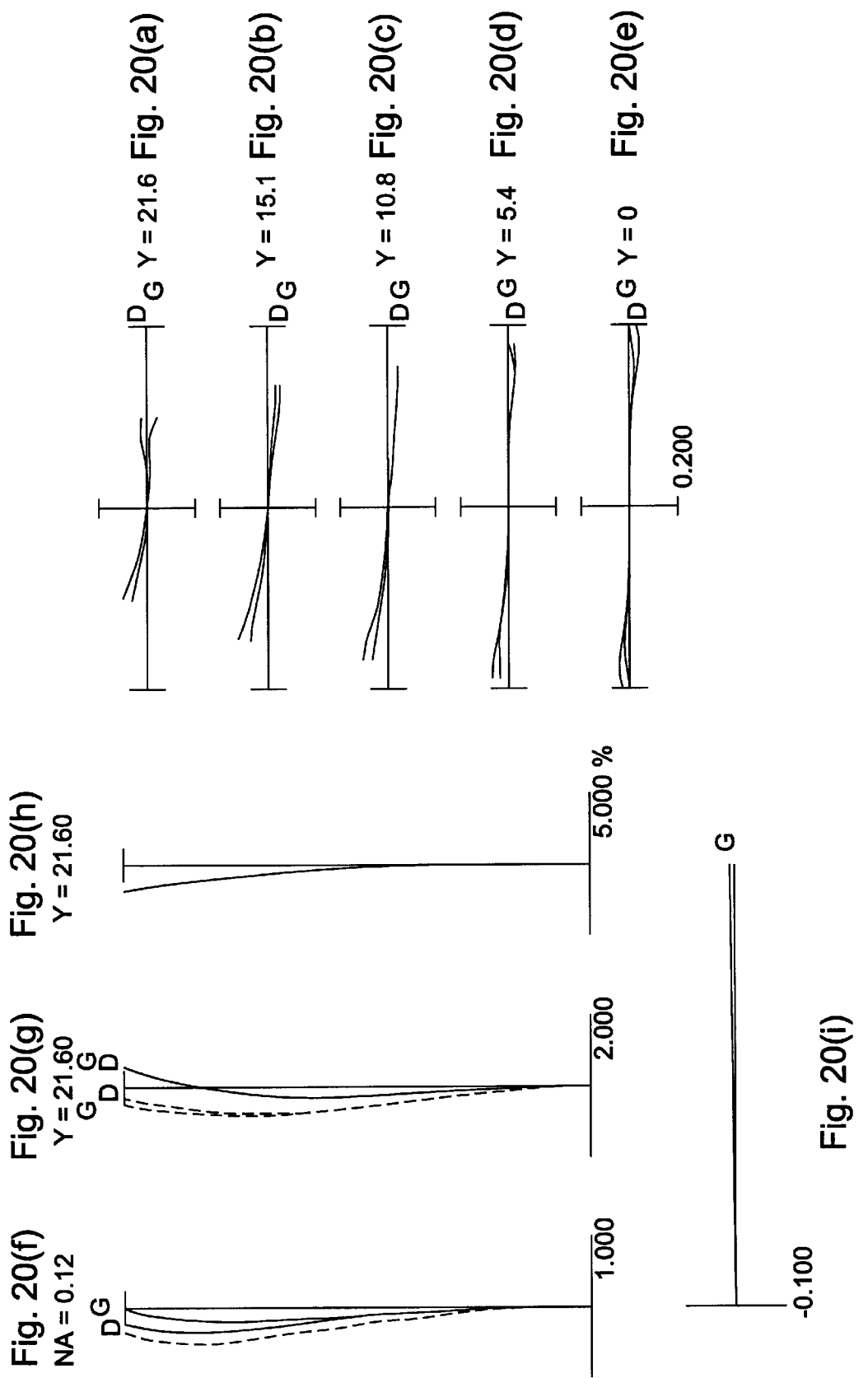

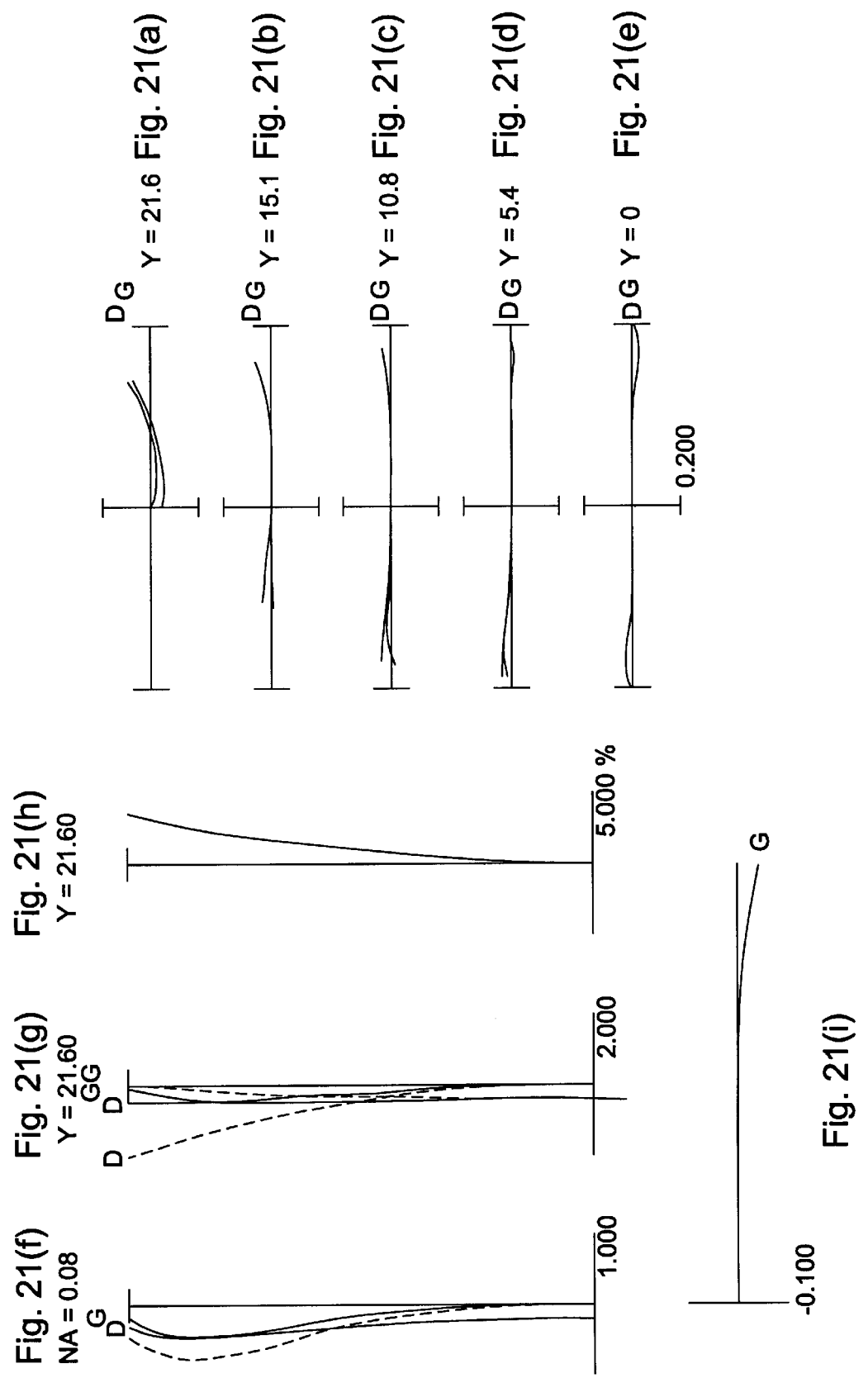

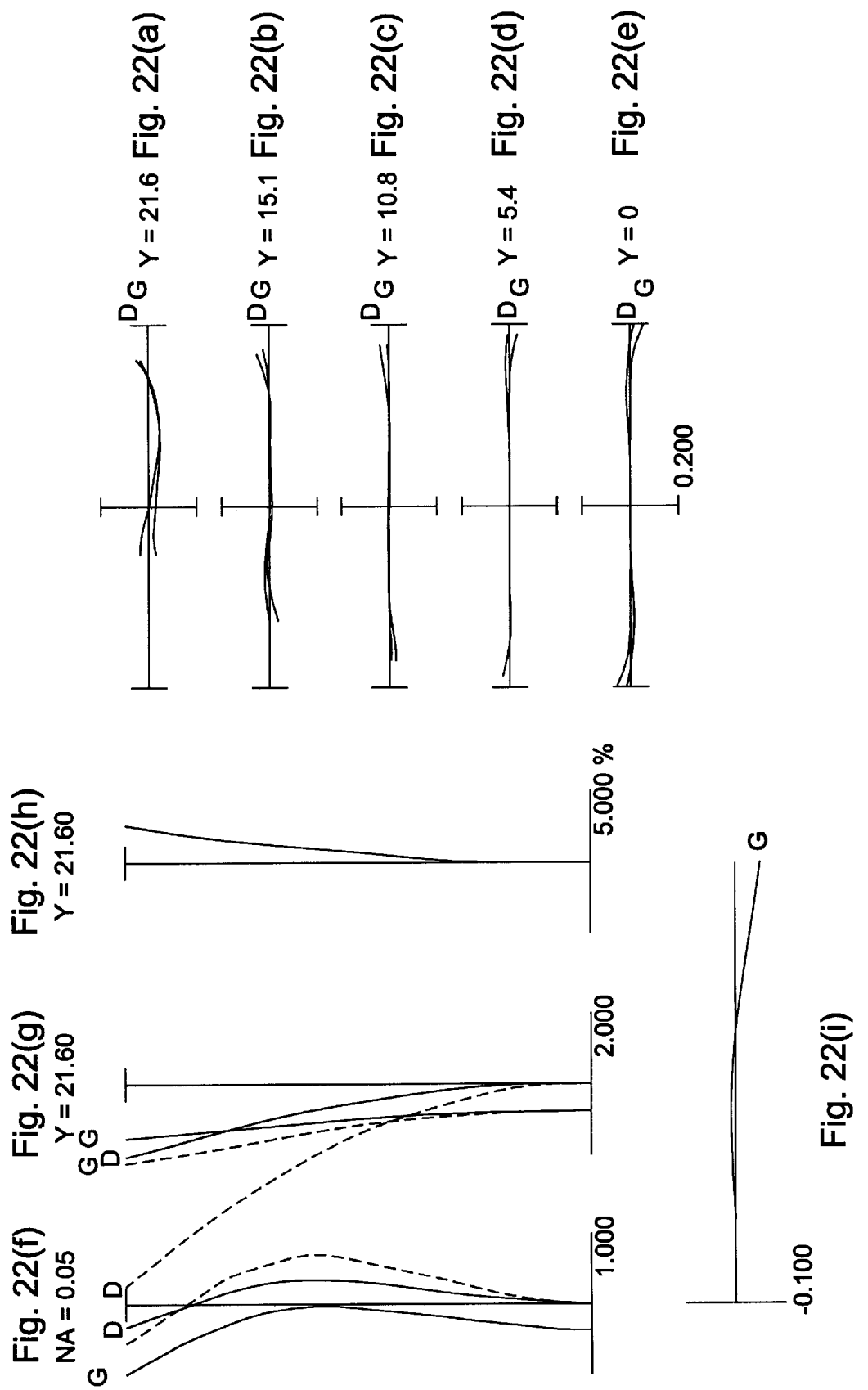

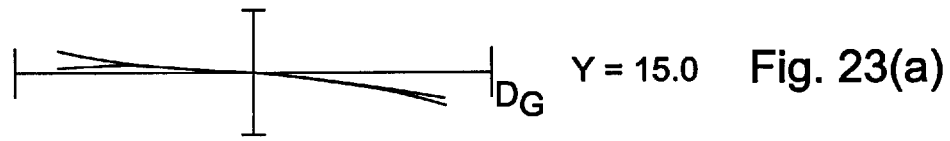 Y = 15.0 Fig. 23(a)
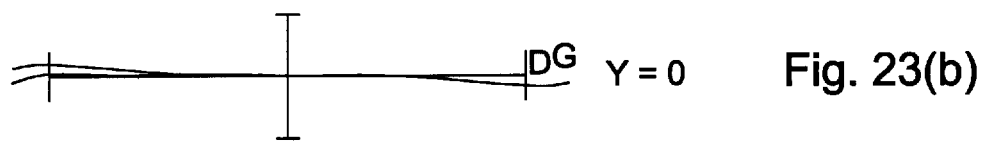 Y = 0 Fig. 23(b)
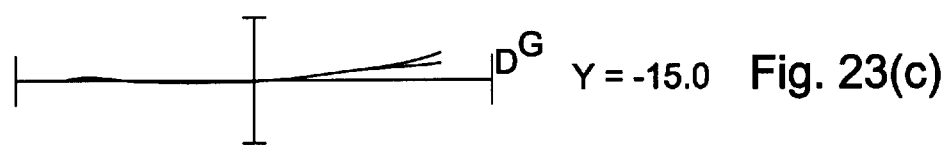 Y = -15.0 Fig. 23(c)
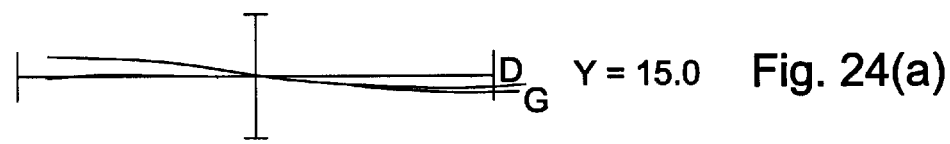 Y = 15.0 Fig. 24(a)
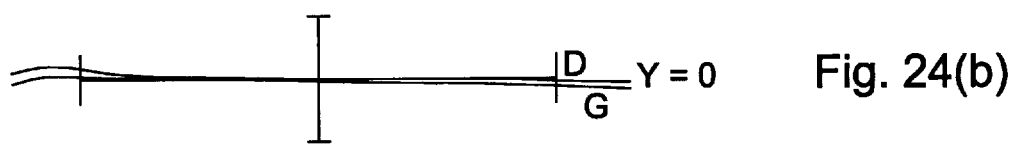 Y = 0 Fig. 24(b)
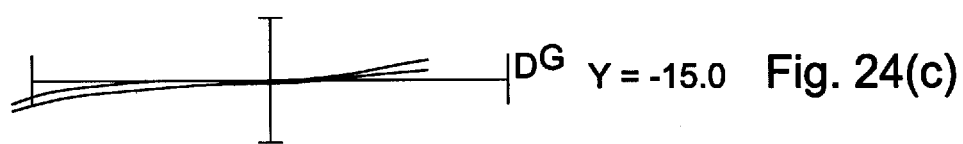 Y = -15.0 Fig. 24(c)

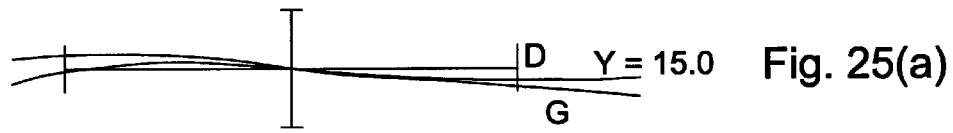
Fig. 25(a) Y = 15.0
Fig. 25(b) Y = 0
Fig. 25(c) Y = -15.0
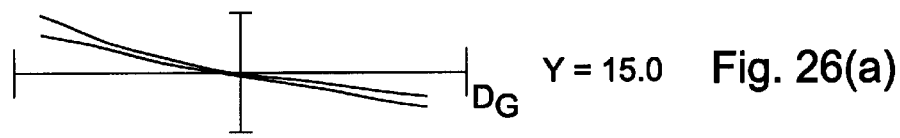
Fig. 26(a) Y = 15.0
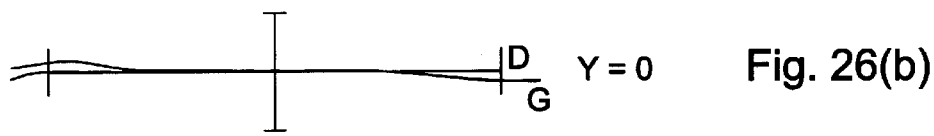
Fig. 26(b) Y = 0
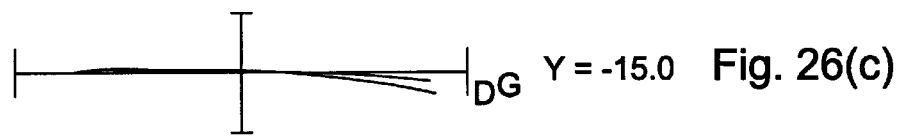
Fig. 26(c) Y = -15.0

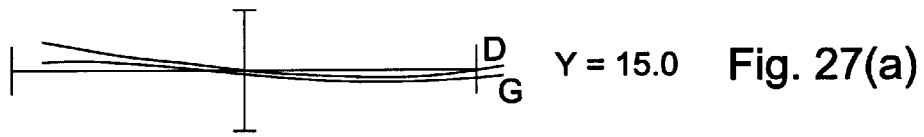 Y = 15.0    Fig. 27(a)
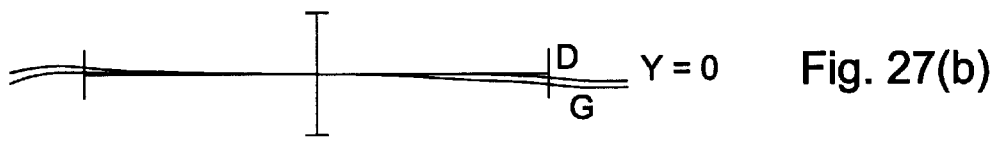 Y = 0    Fig. 27(b)
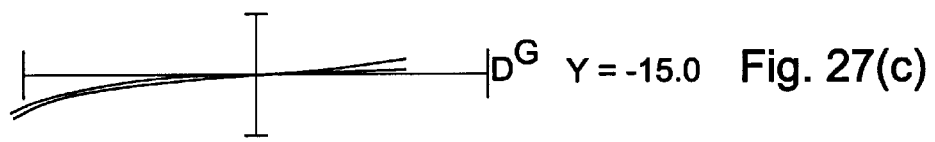 Y = -15.0    Fig. 27(c)
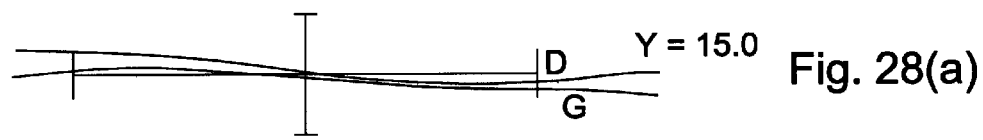 Y = 15.0    Fig. 28(a)
 Y = 0    Fig. 28(b)
 Y = -15.0    Fig. 28(c)

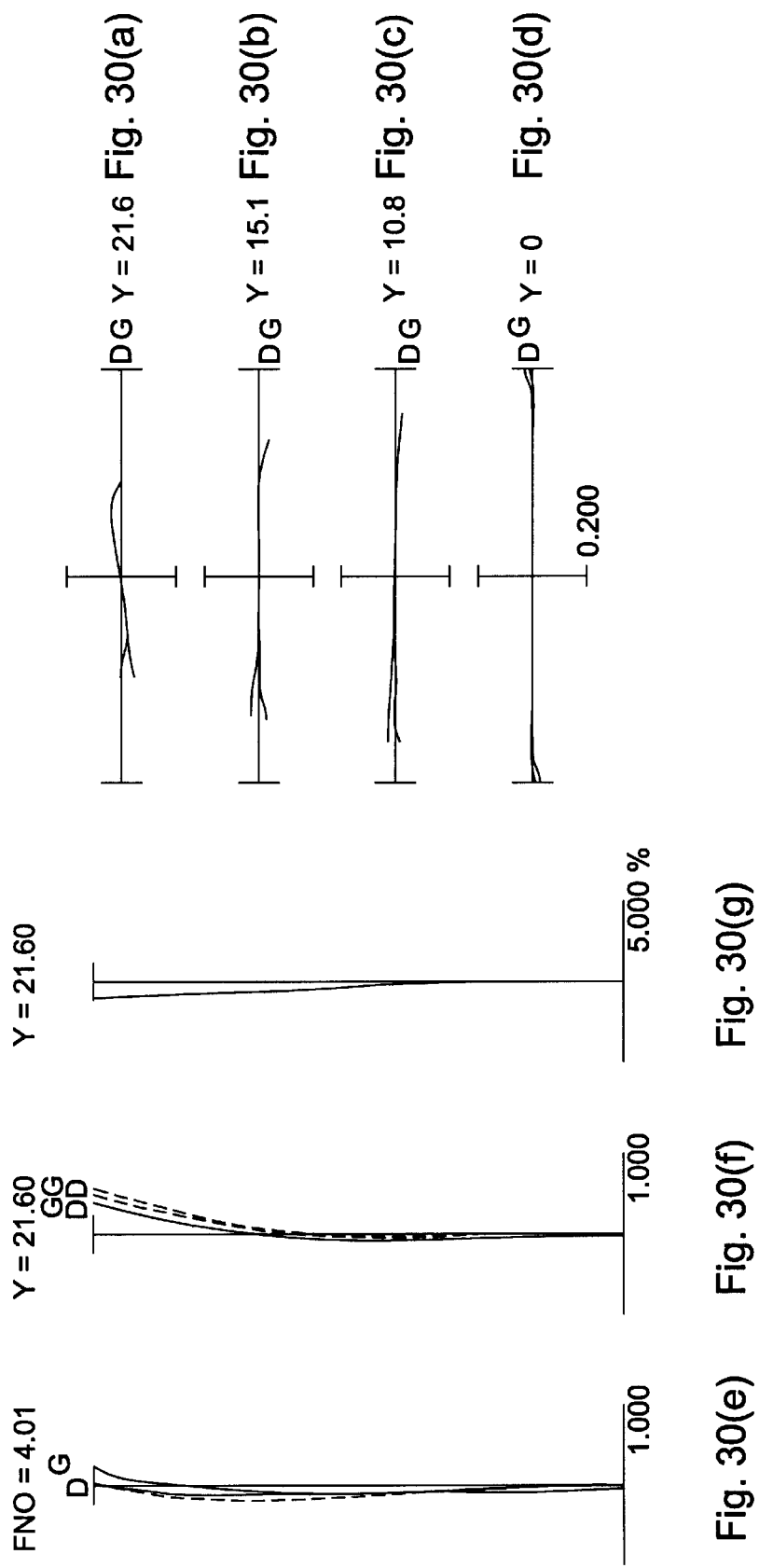

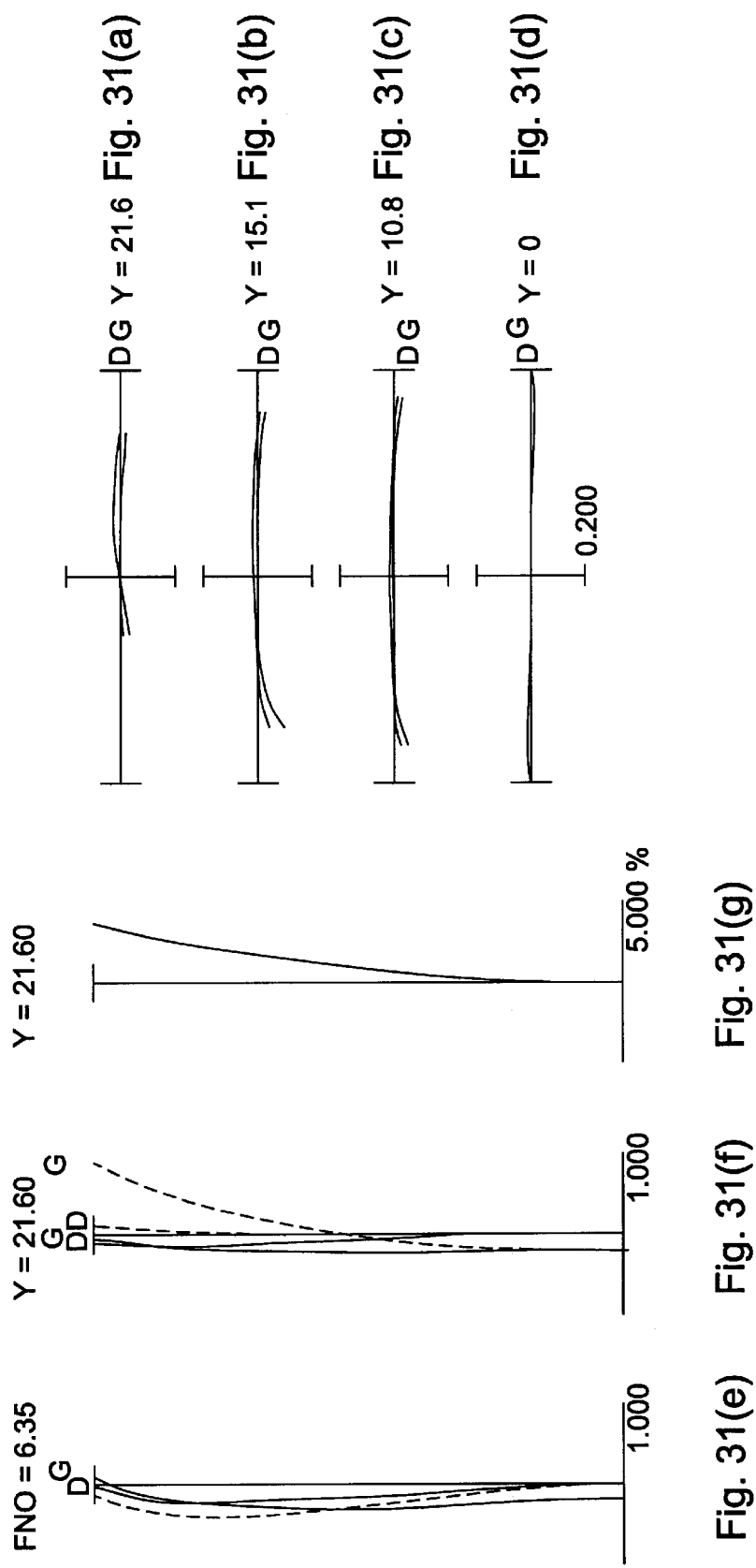

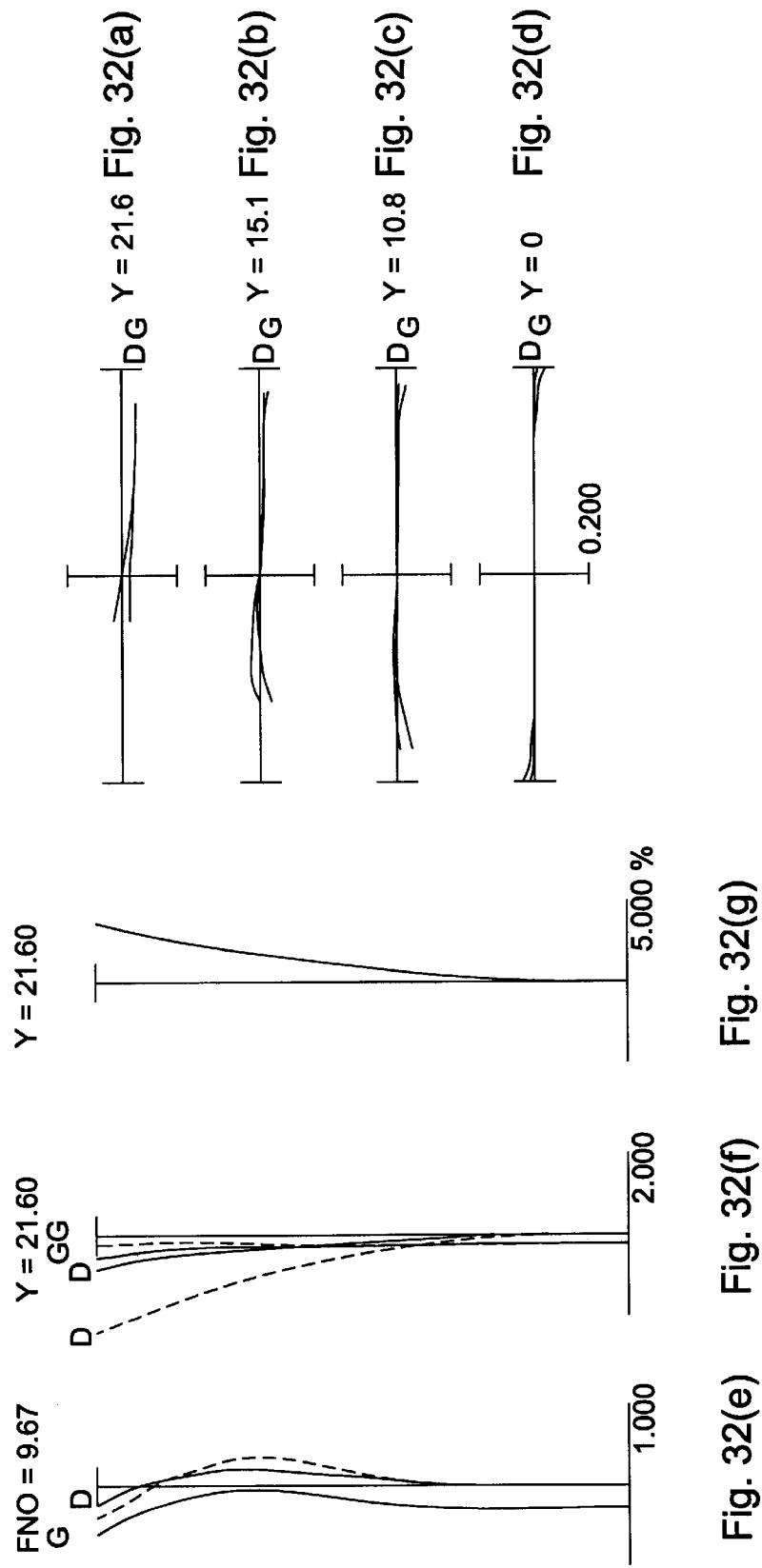

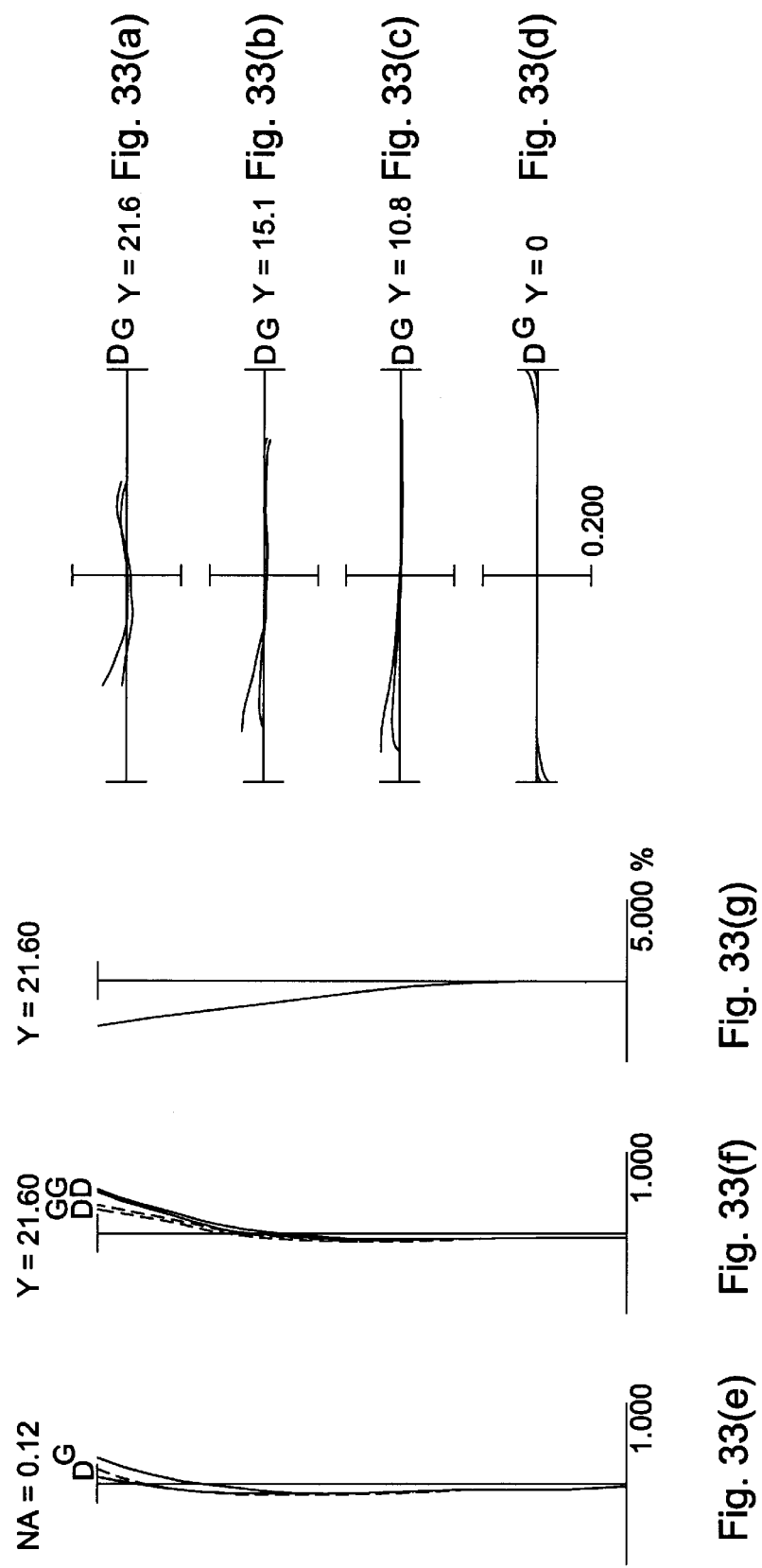

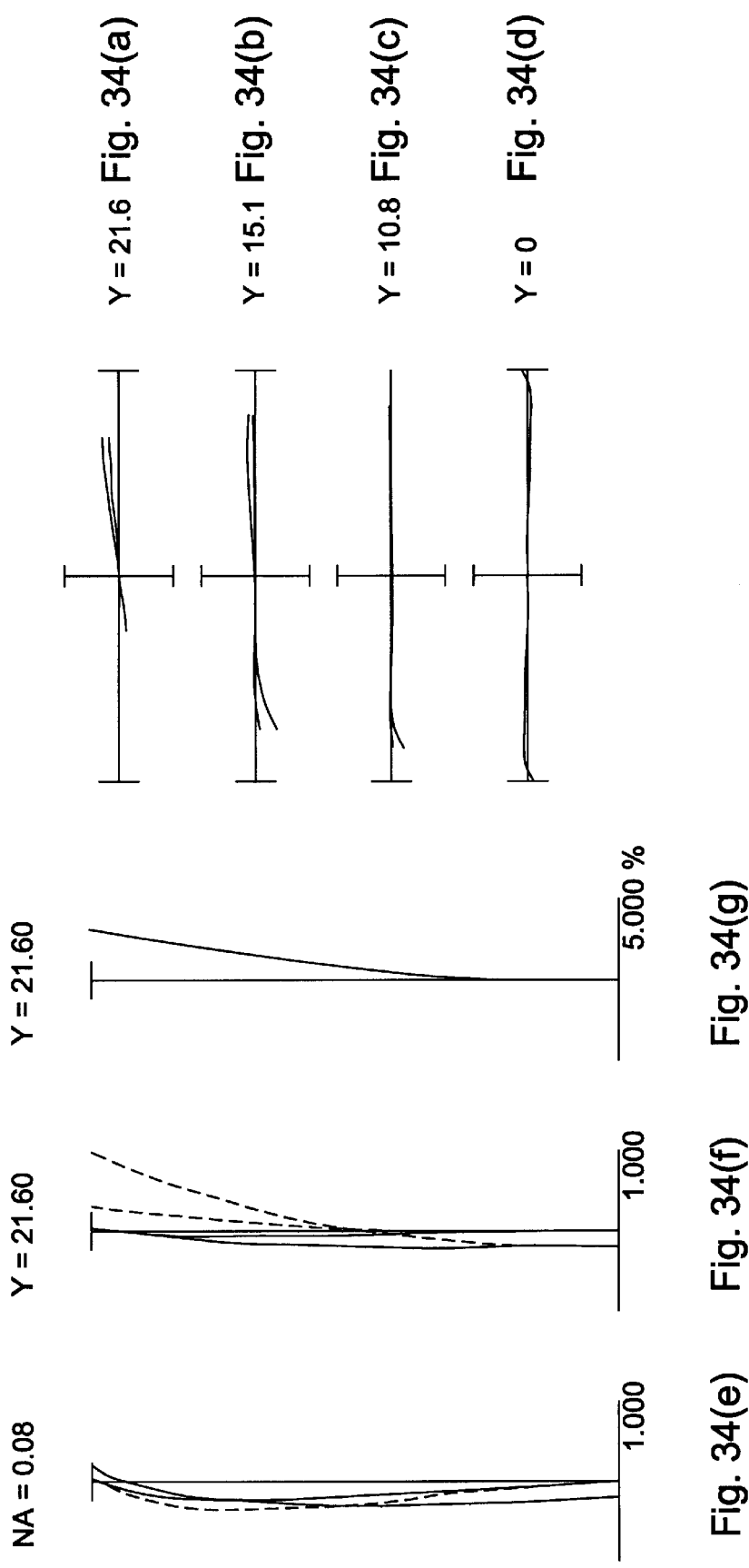

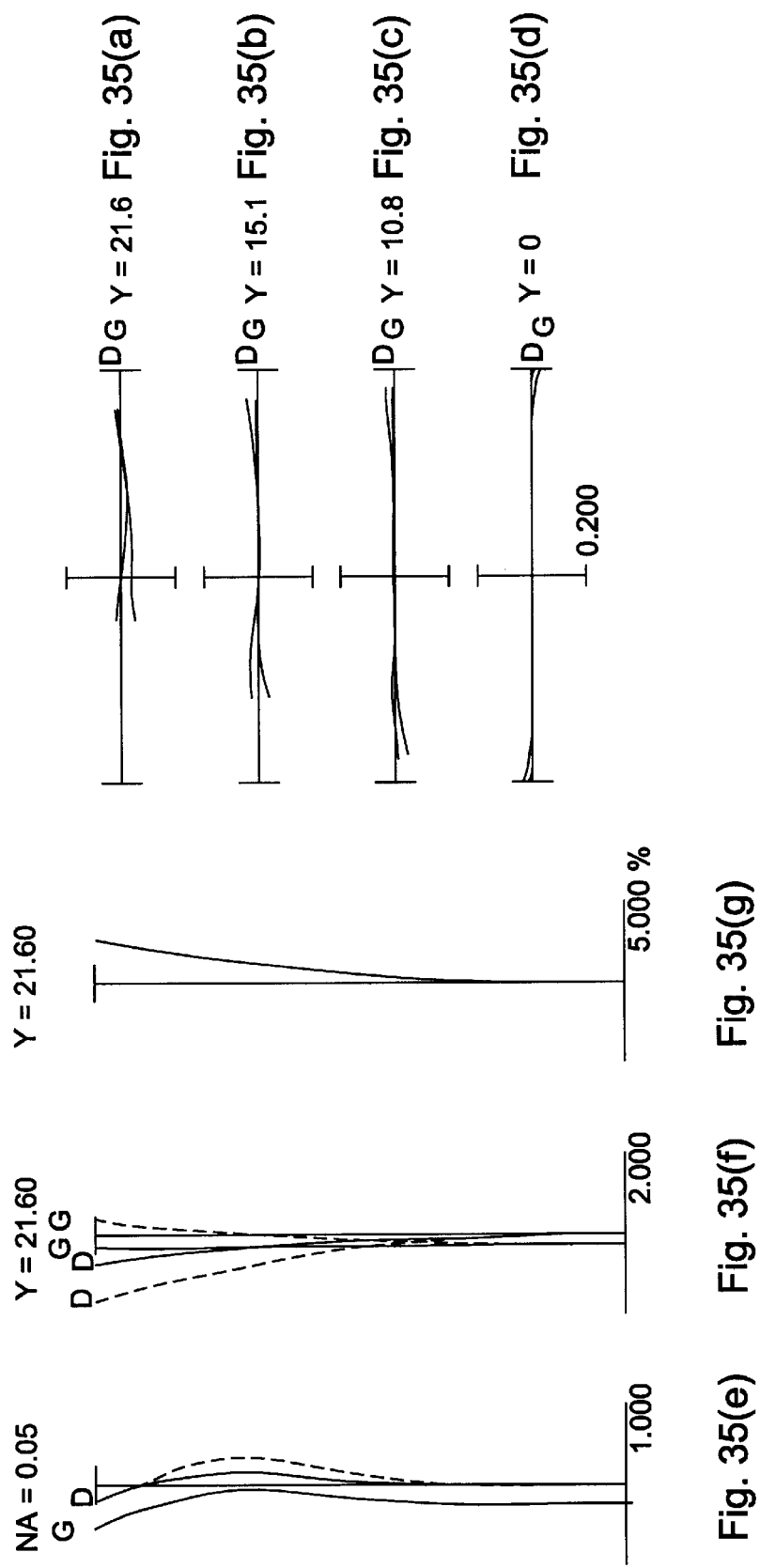

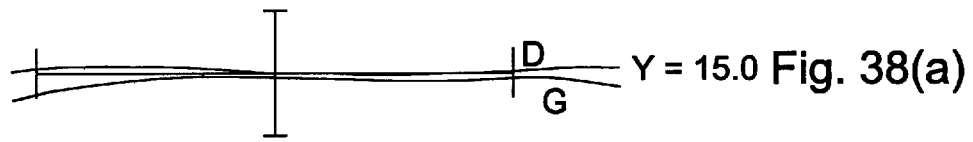
Y = 15.0 Fig. 38(a)
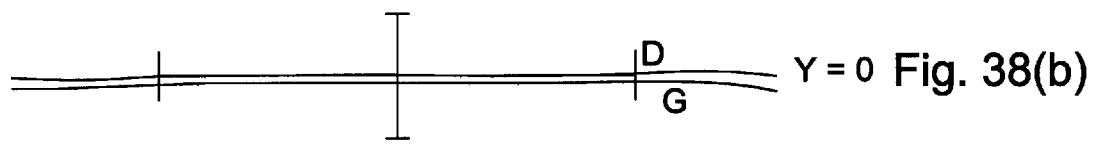
Y = 0 Fig. 38(b)
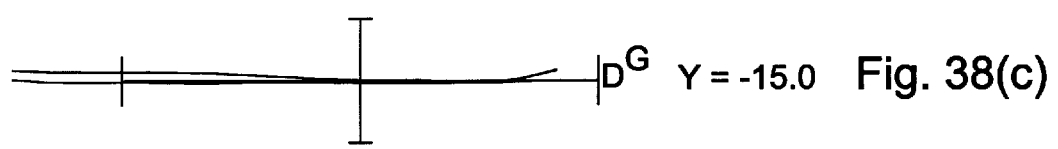
Y = -15.0 Fig. 38(c)
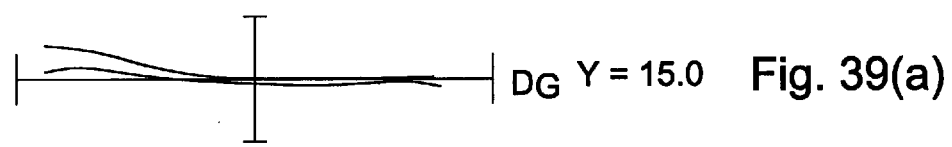
Y = 15.0 Fig. 39(a)
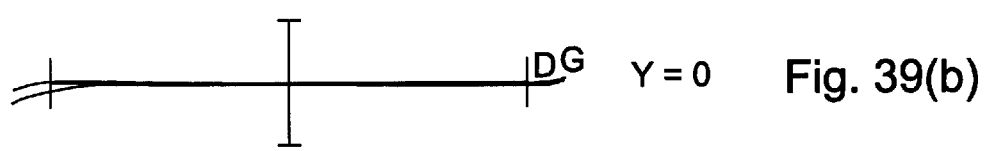
Y = 0 Fig. 39(b)
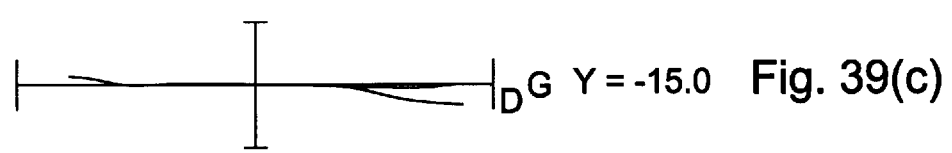
Y = -15.0 Fig. 39(c)

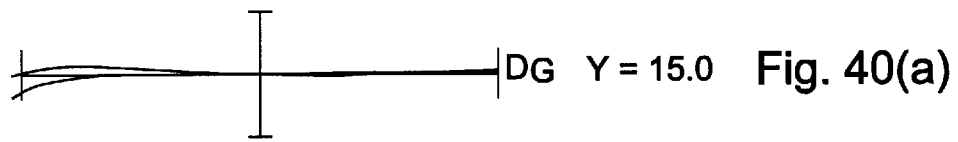
Fig. 40(a) Y = 15.0
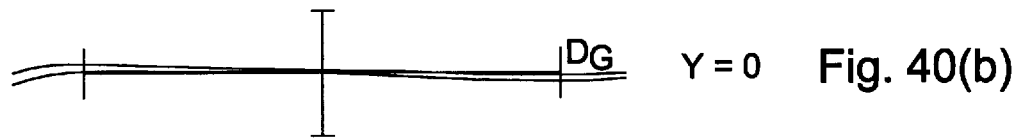
Fig. 40(b) Y = 0
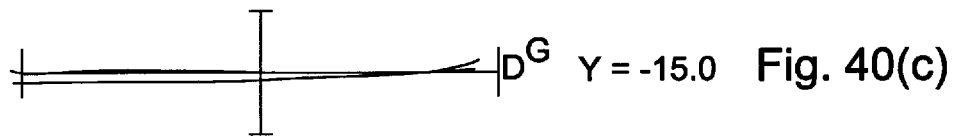
Fig. 40(c) Y = -15.0
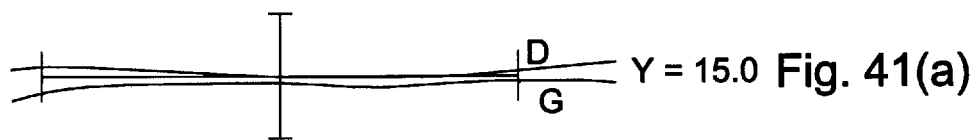
Fig. 41(a) Y = 15.0
Fig. 41(b) Y = 0
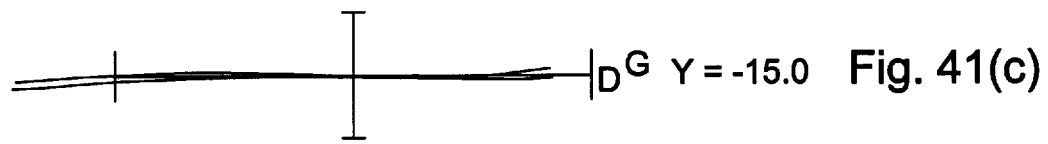
Fig. 41(c) Y = -15.0

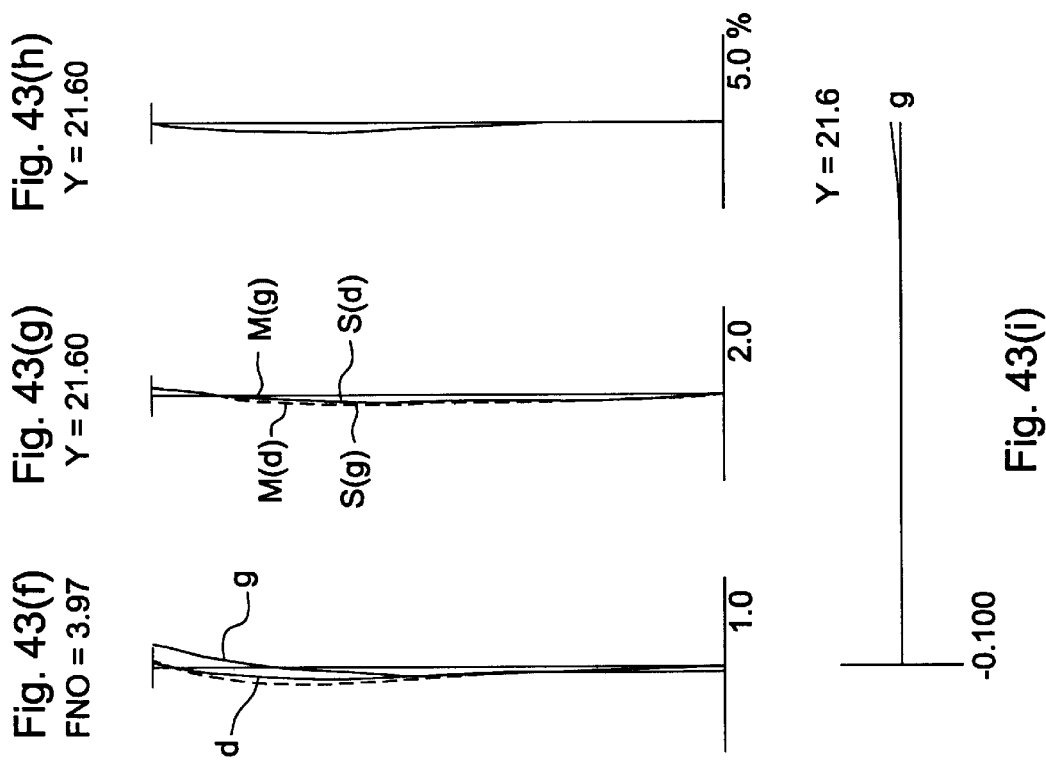

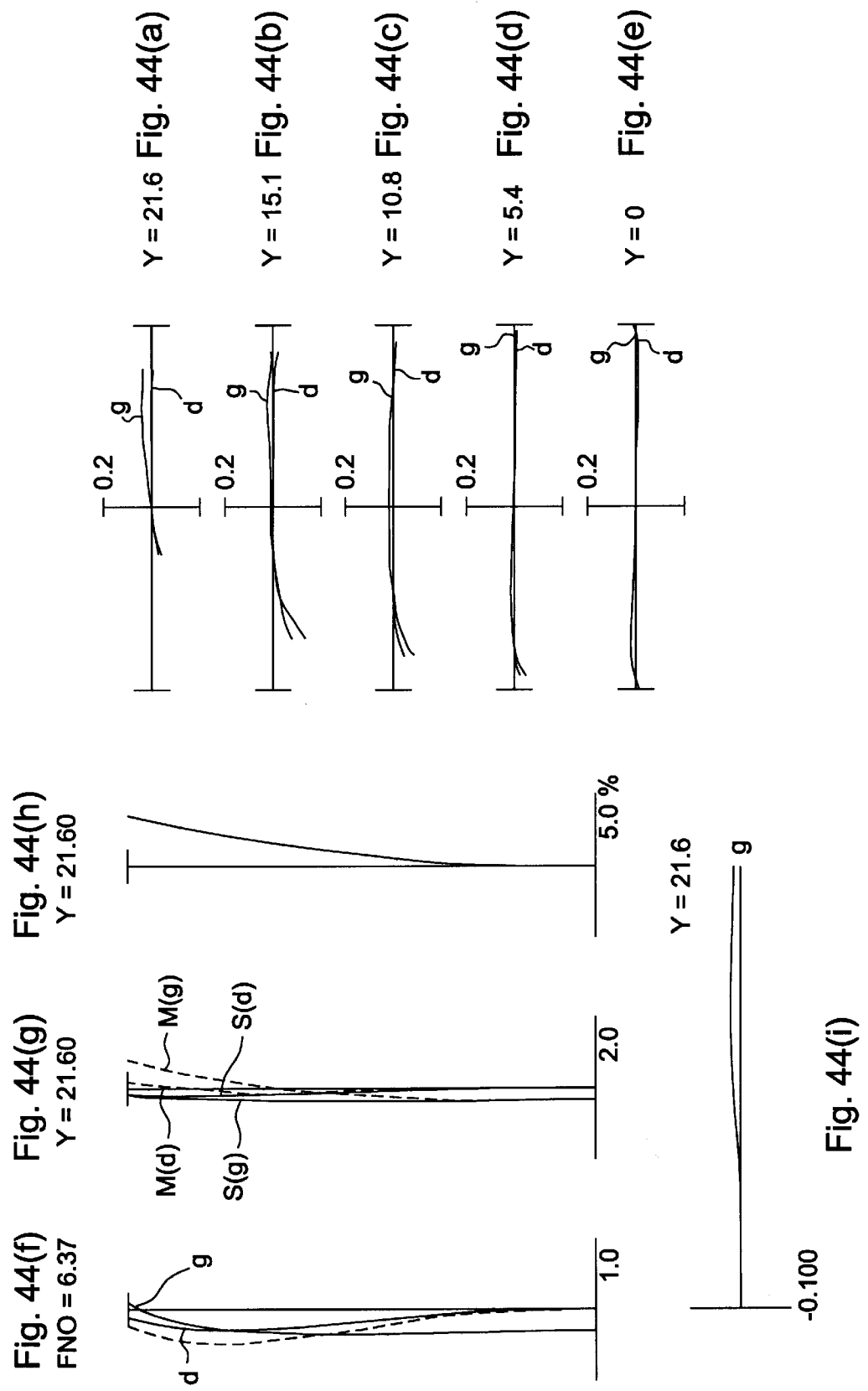

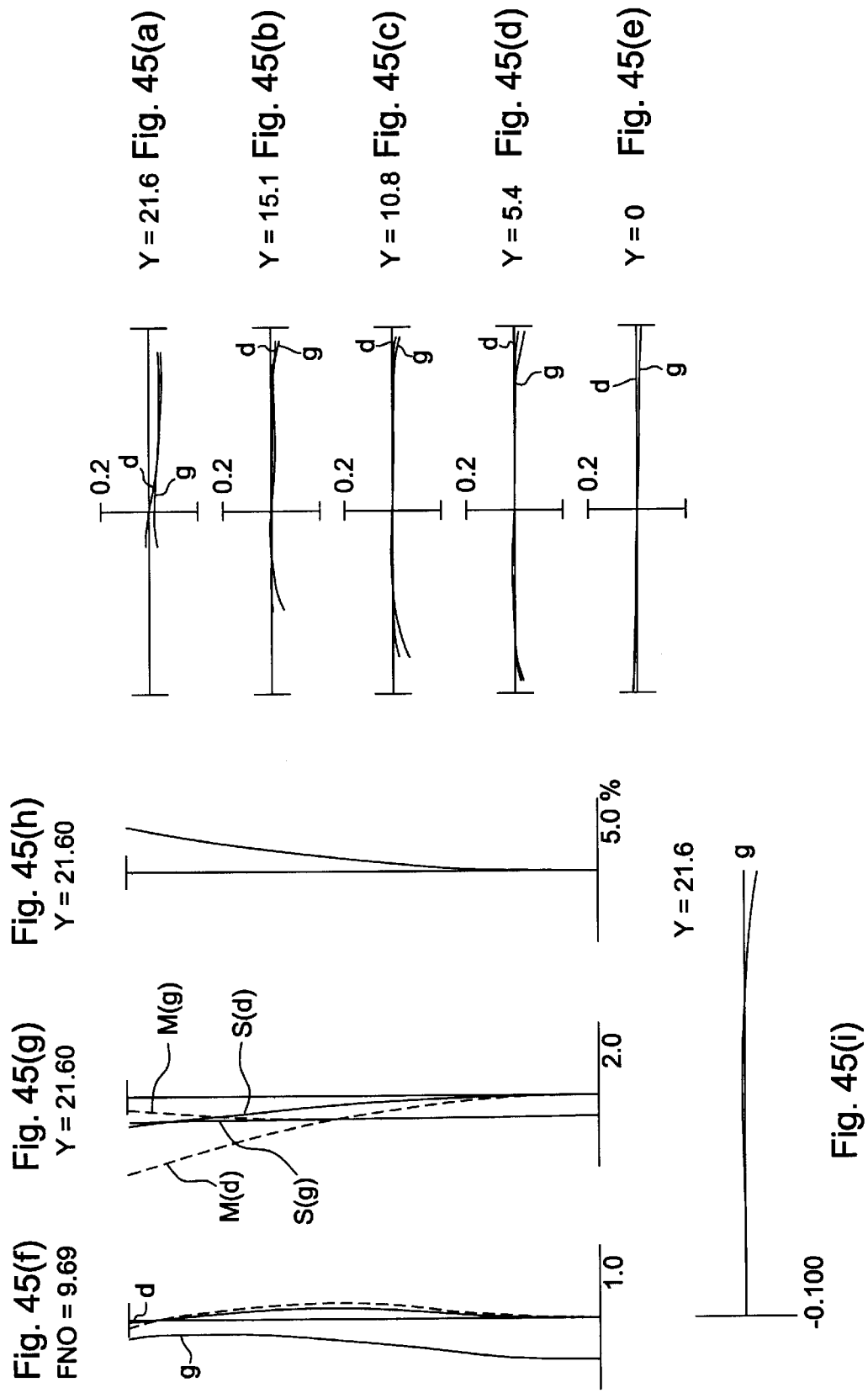

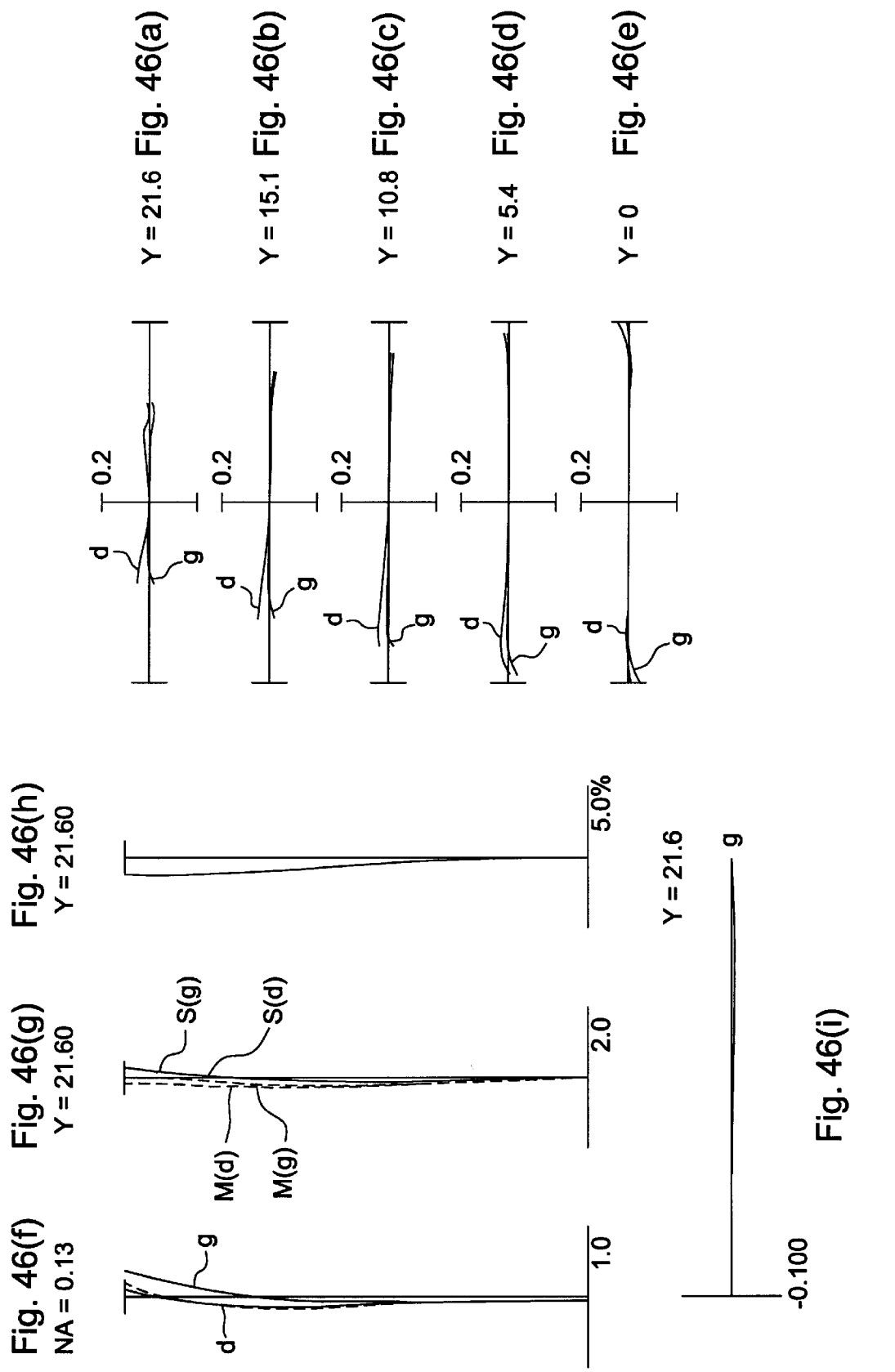

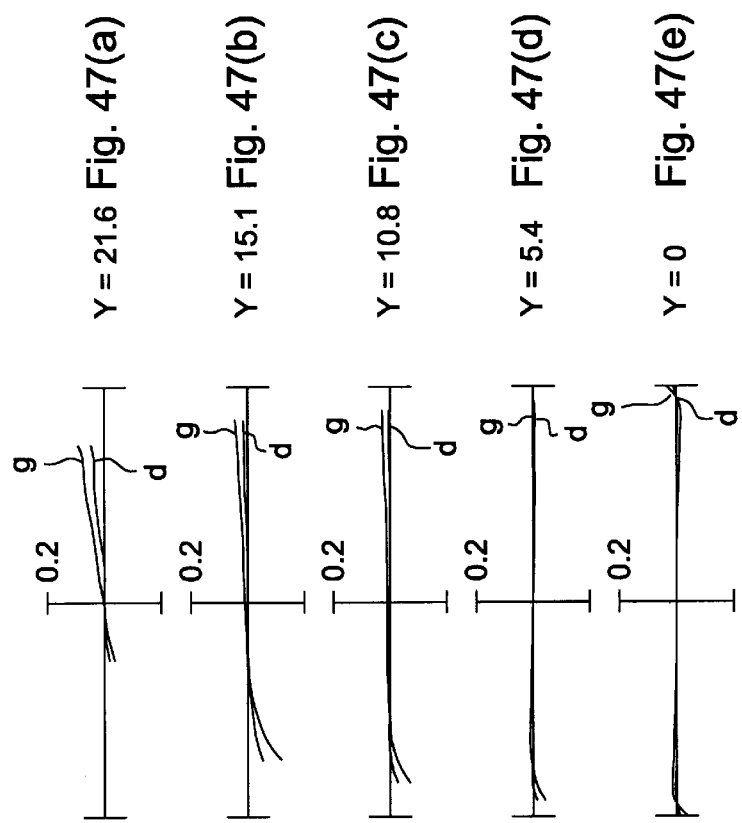
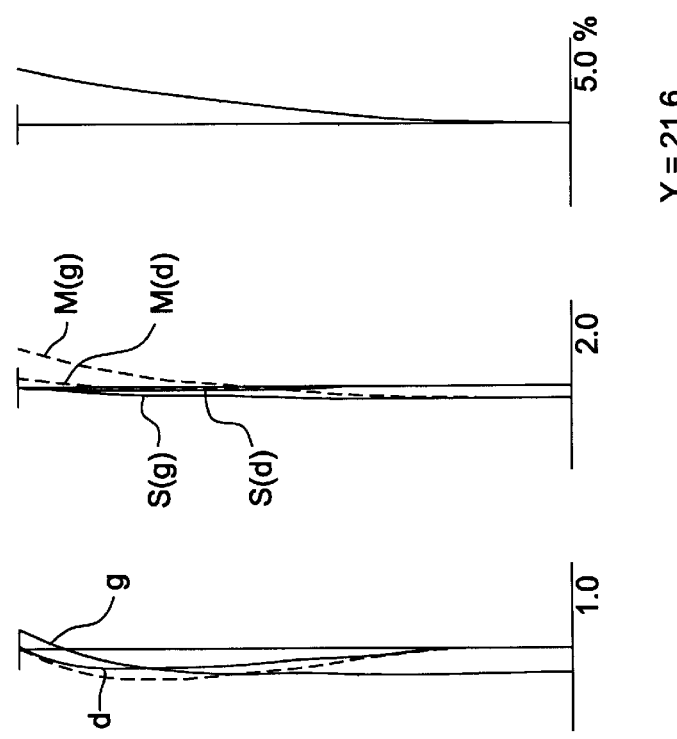
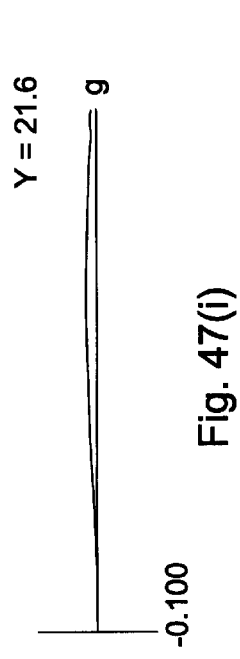

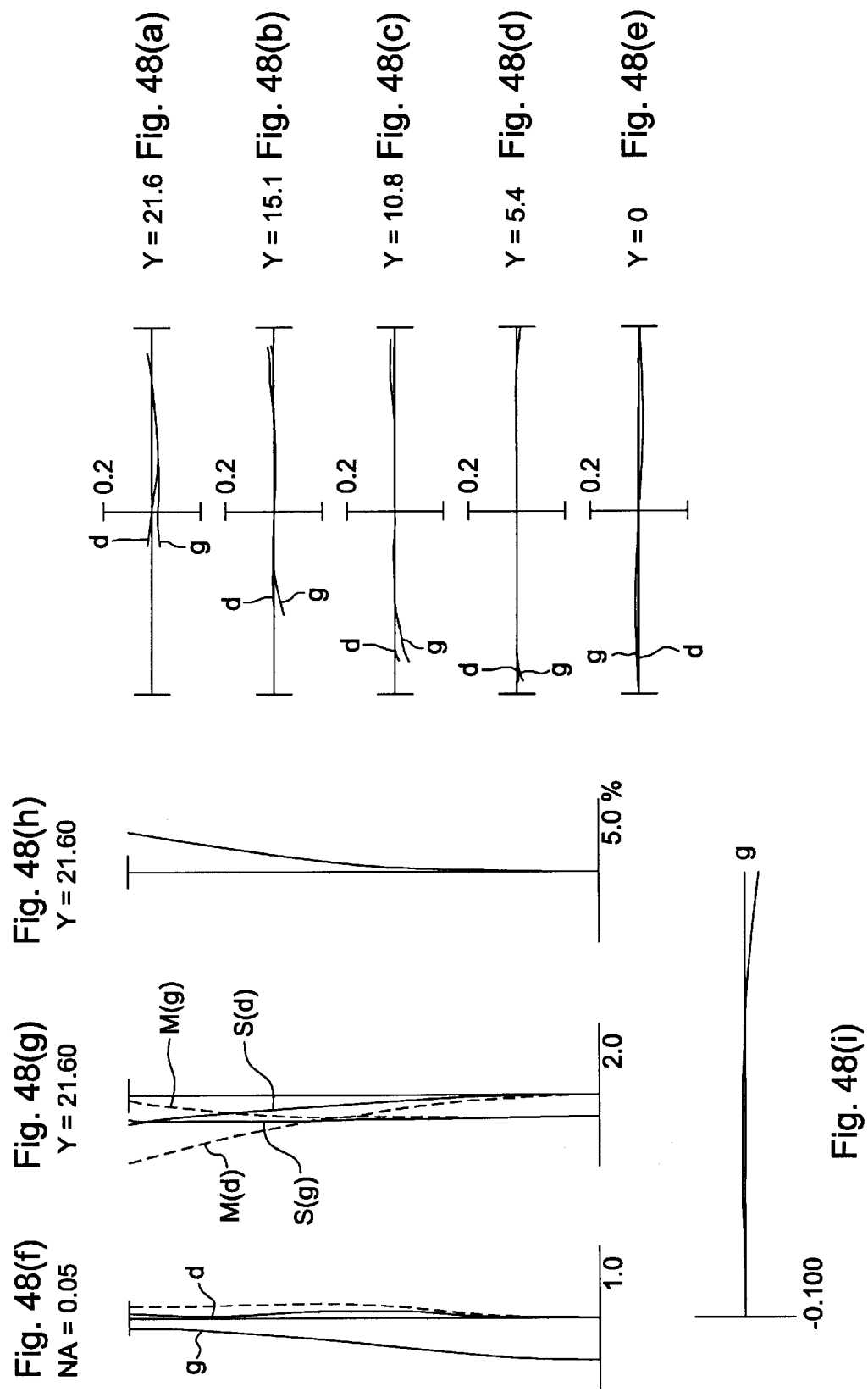

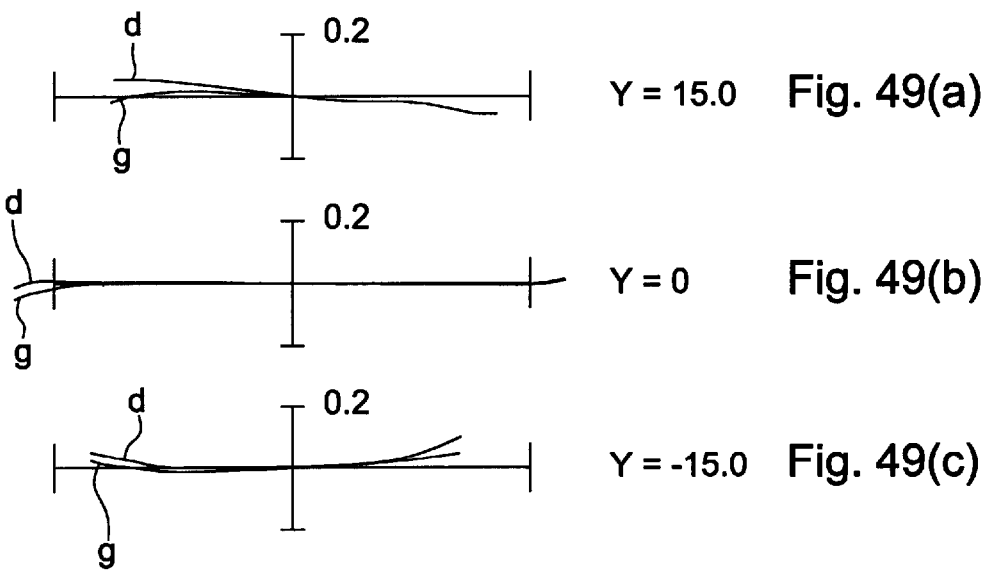
Fig. 49(a) Y = 15.0
Fig. 49(b) Y = 0
Fig. 49(c) Y = -15.0
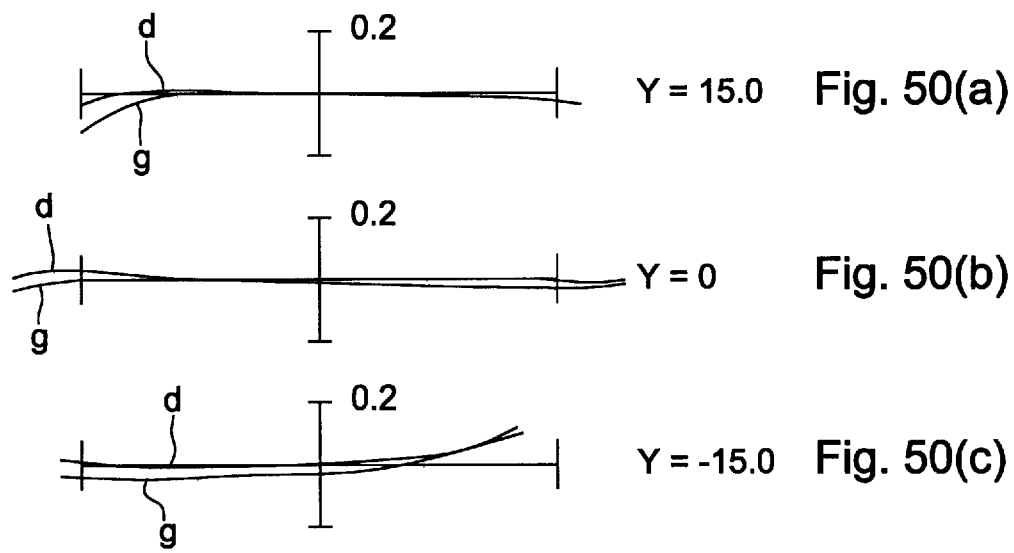
Fig. 50(a) Y = 15.0
Fig. 50(b) Y = 0
Fig. 50(c) Y = -15.0

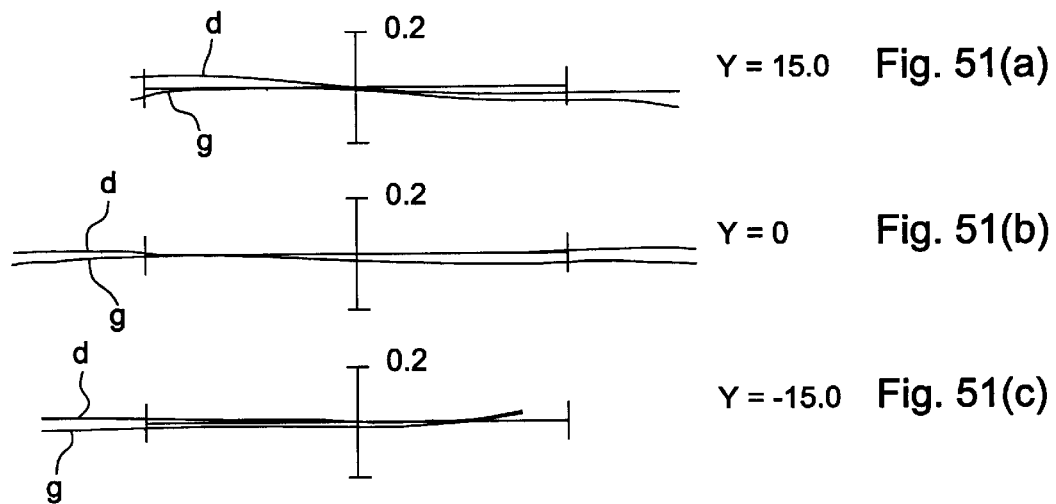
Y = 15.0  Fig. 51(a)
Y = 0    Fig. 51(b)
Y = -15.0 Fig. 51(c)
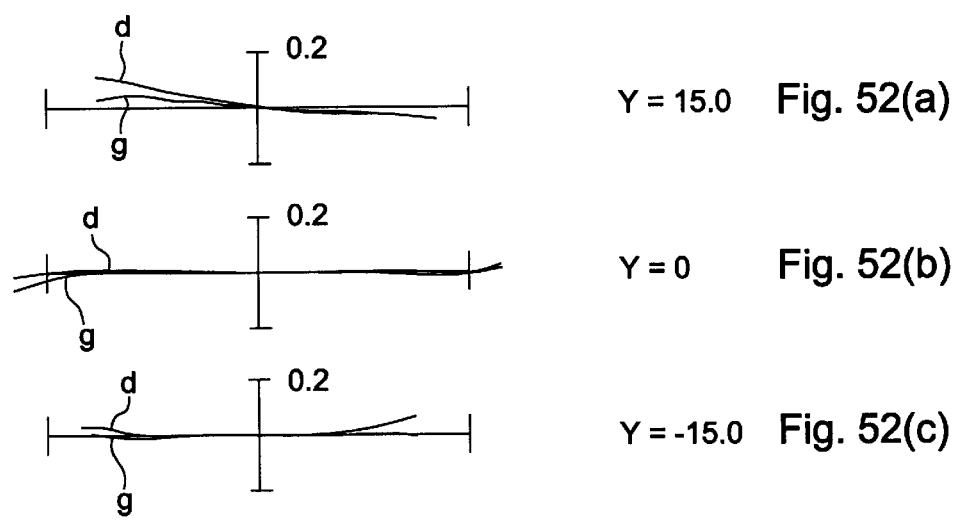
Y = 15.0  Fig. 52(a)
Y = 0    Fig. 52(b)
Y = -15.0 Fig. 52(c)

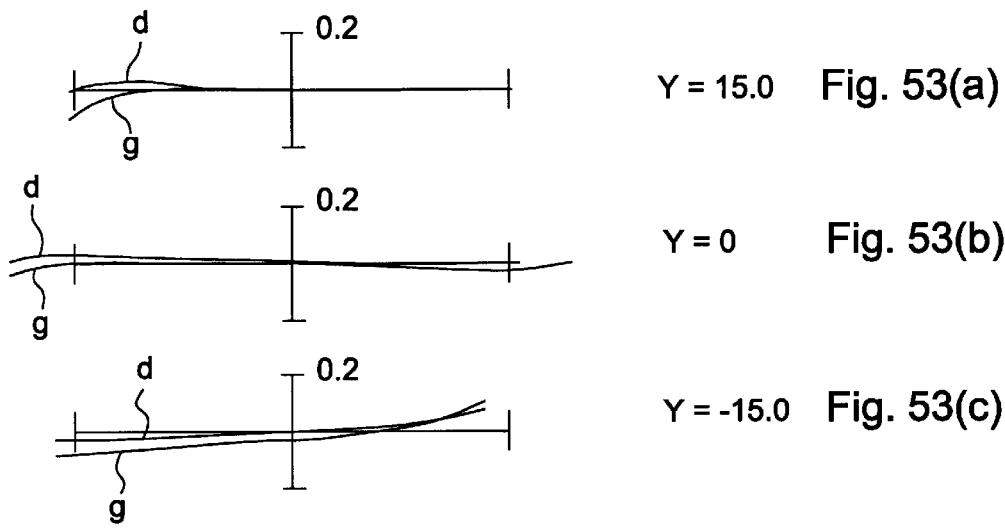
Y = 15.0  Fig. 53(a)
Y = 0  Fig. 53(b)
Y = -15.0  Fig. 53(c)
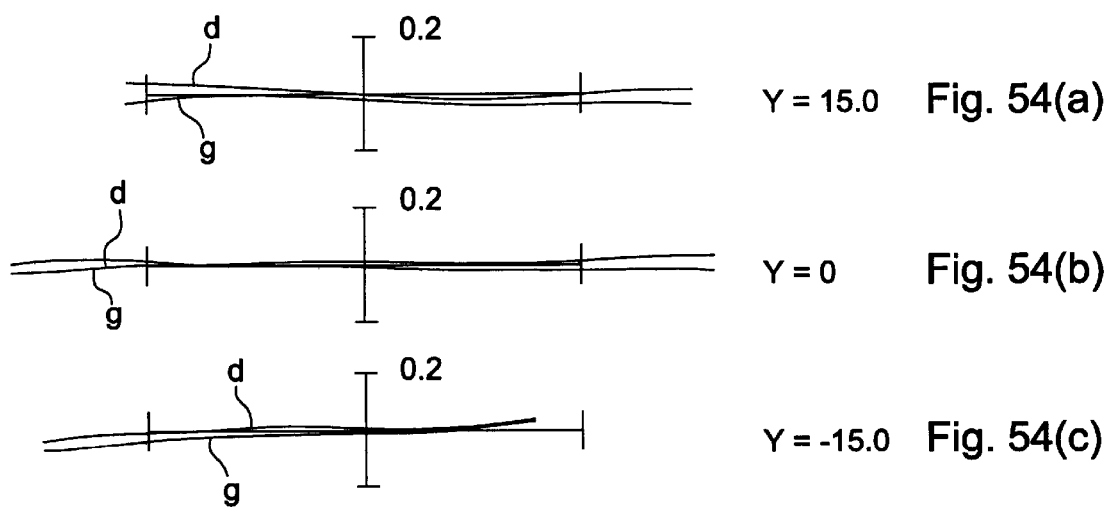
Y = 15.0  Fig. 54(a)
Y = 0  Fig. 54(b)
Y = -15.0  Fig. 54(c)

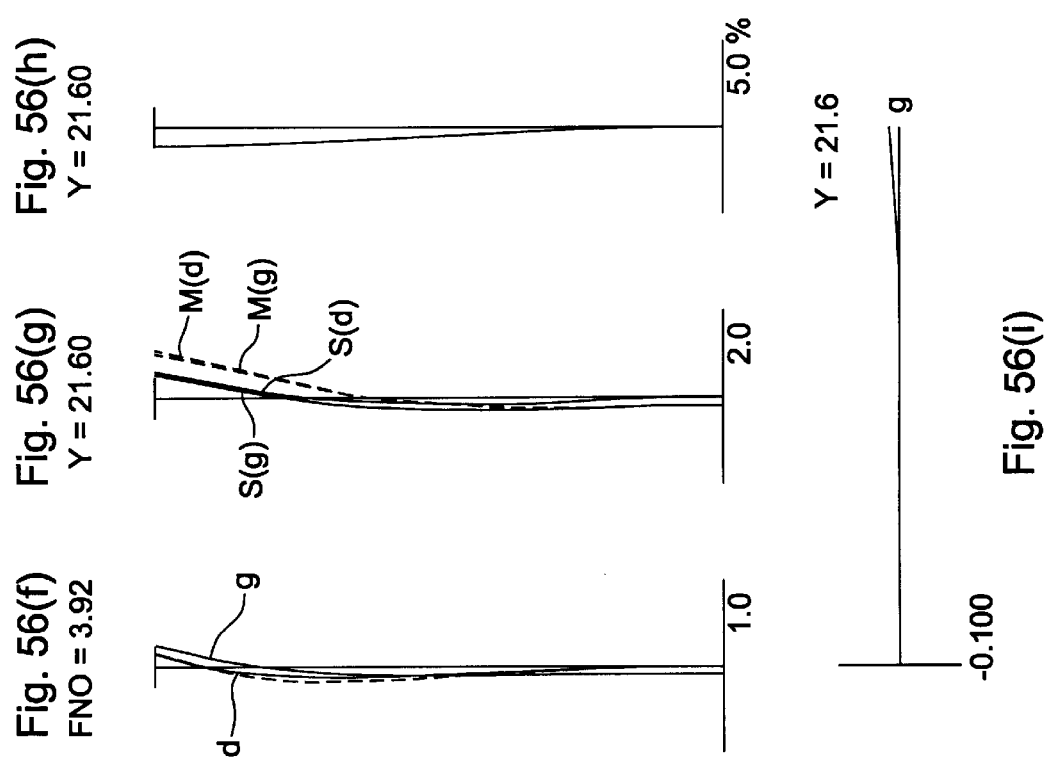

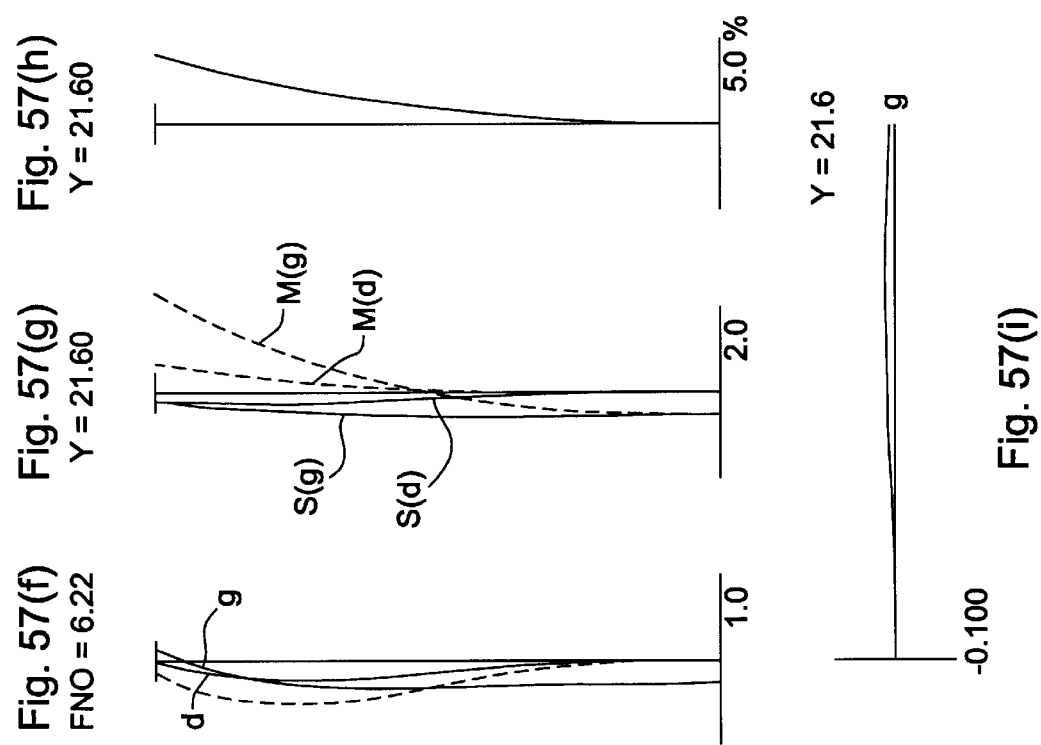

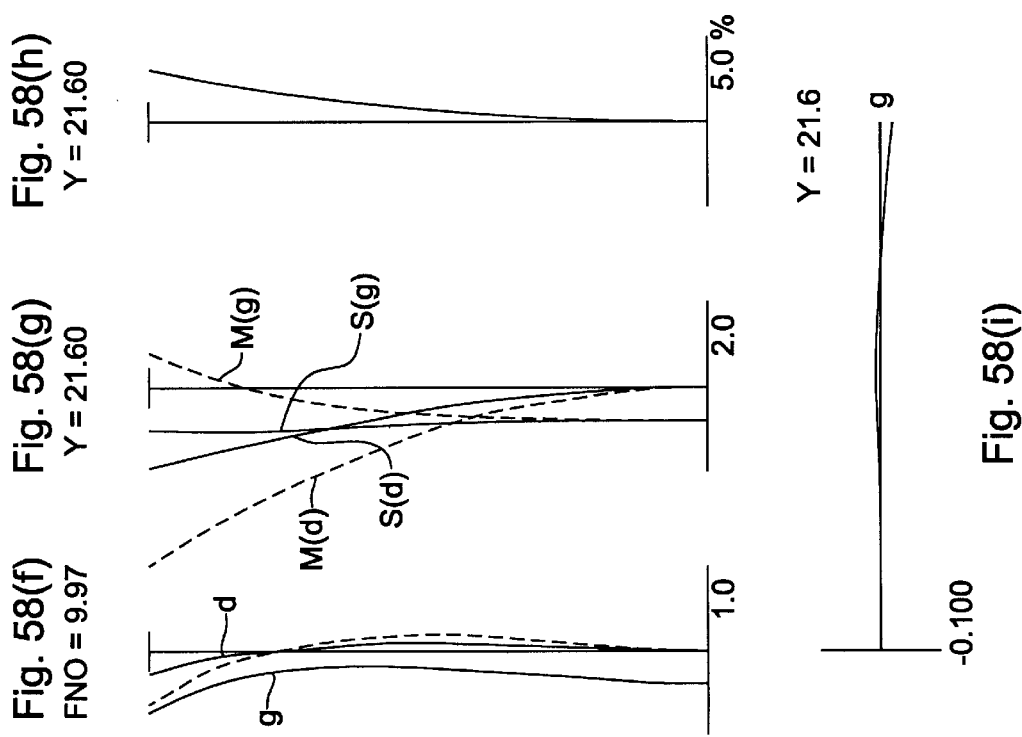

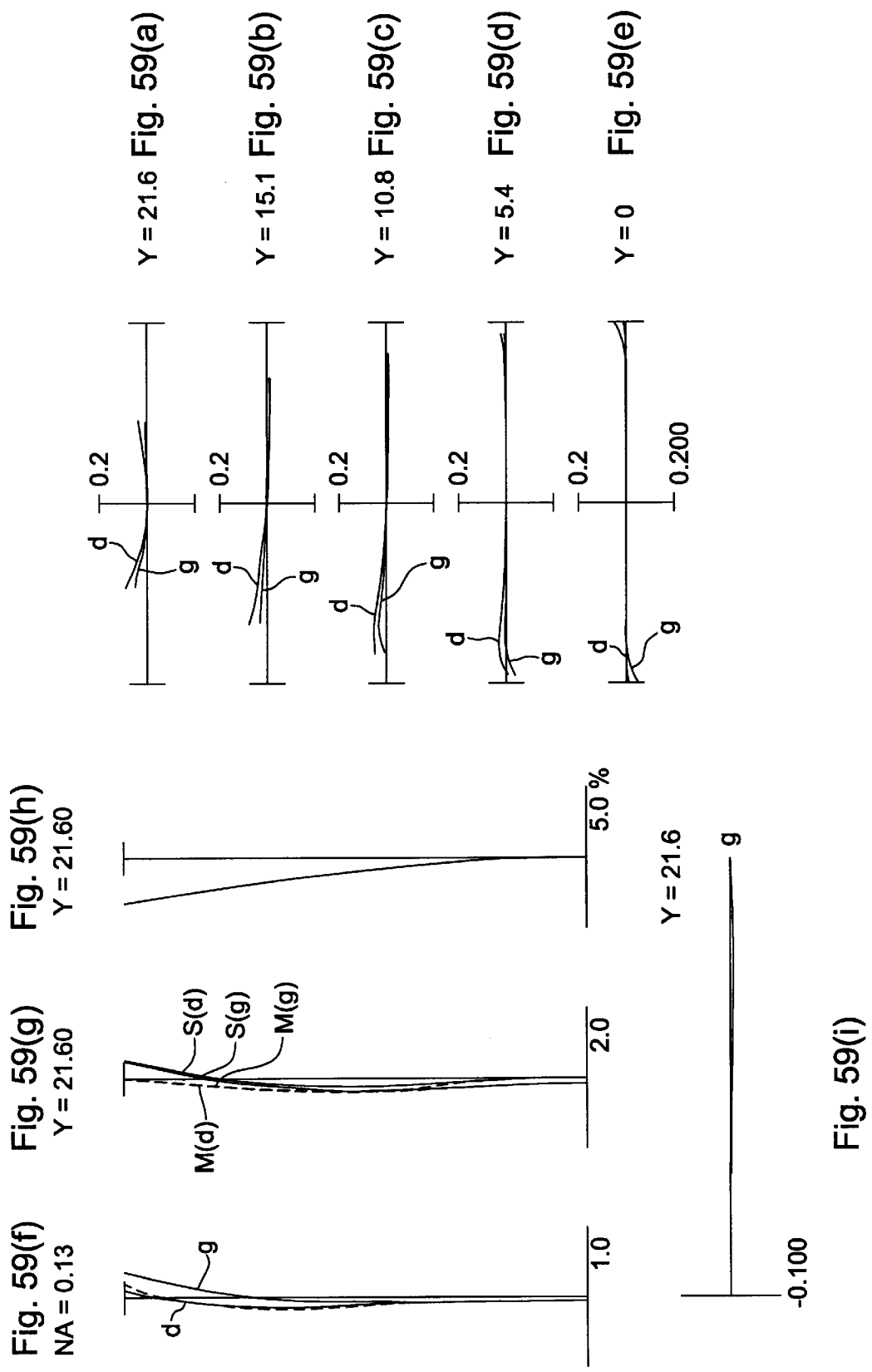

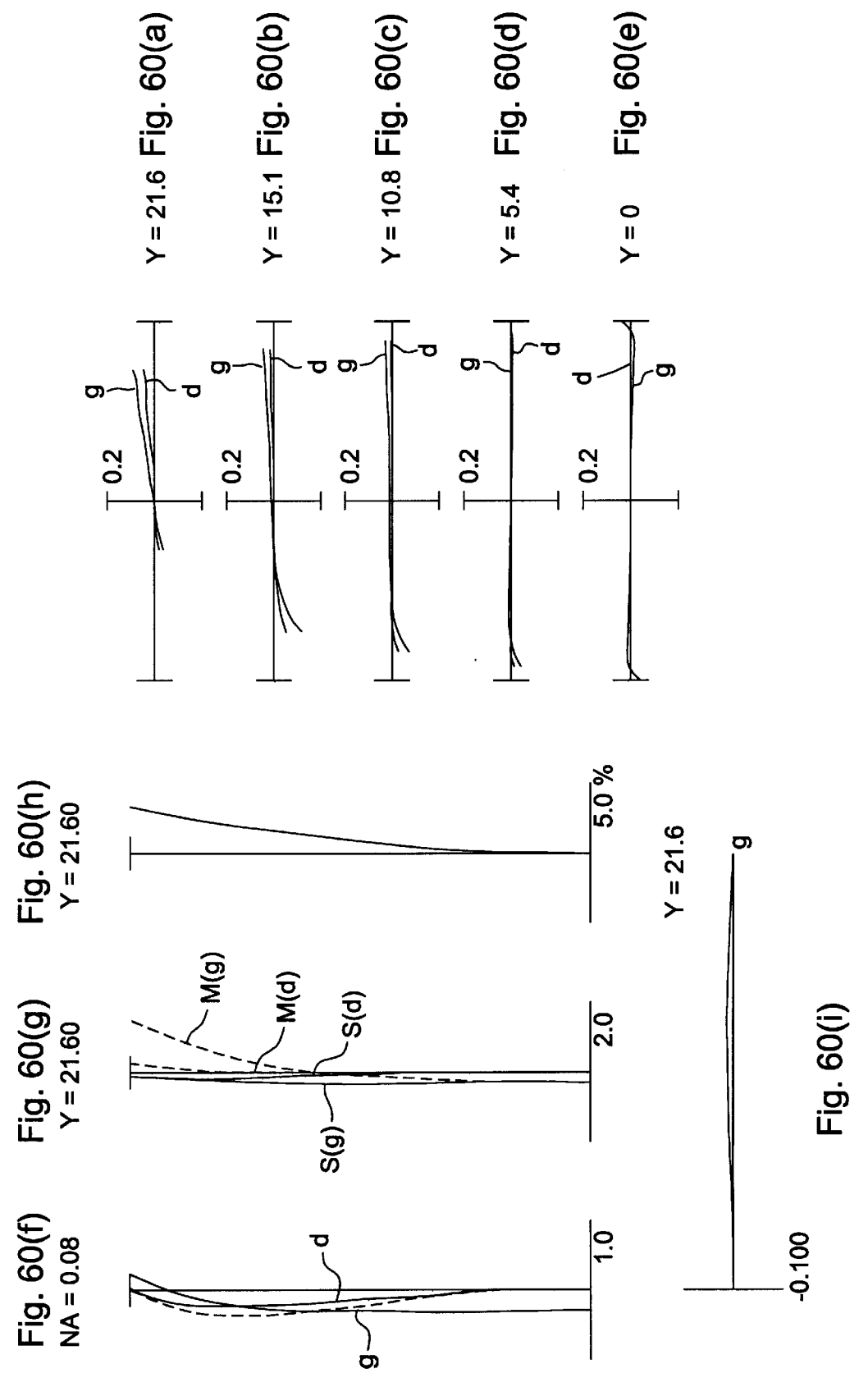

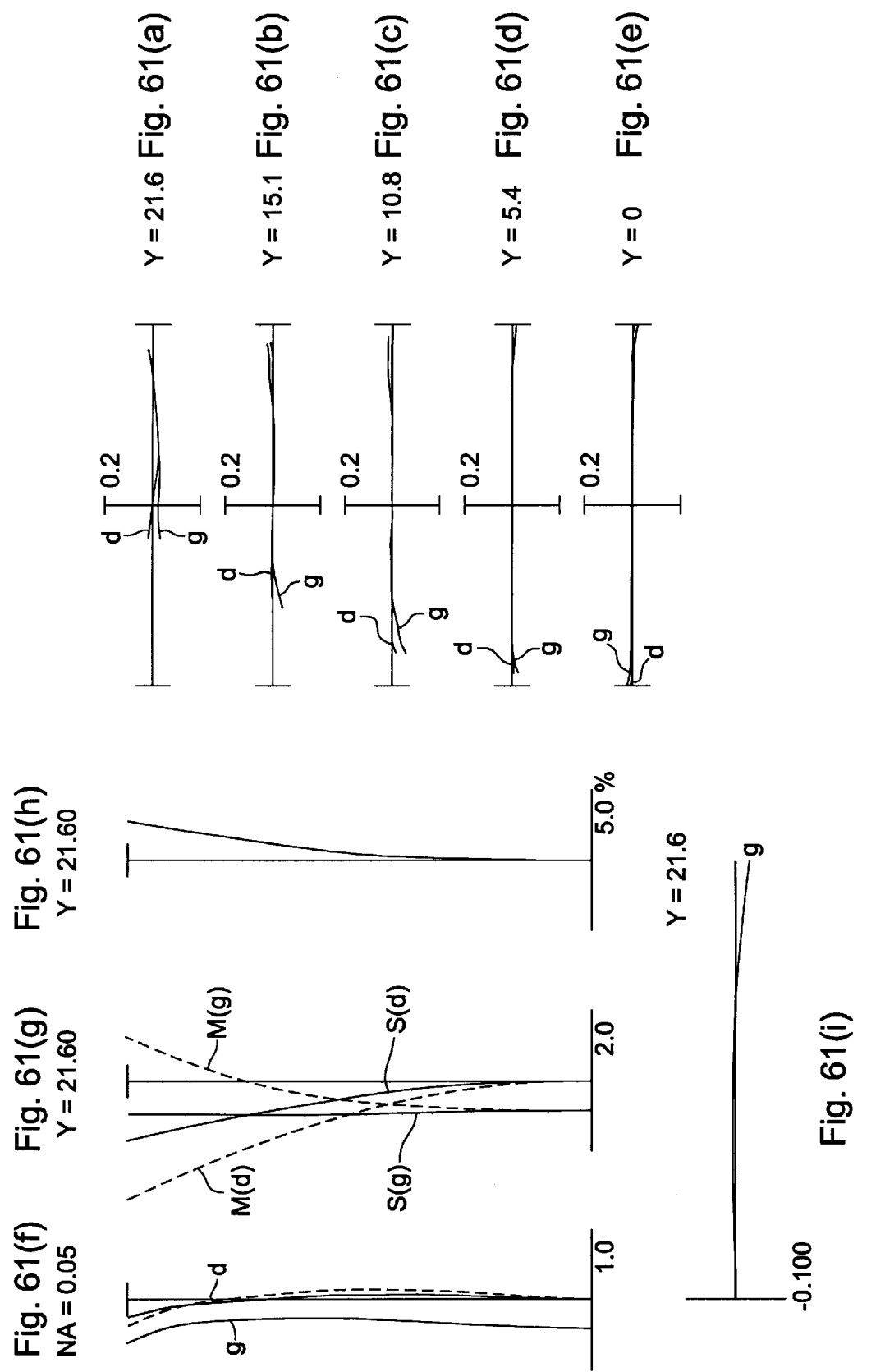

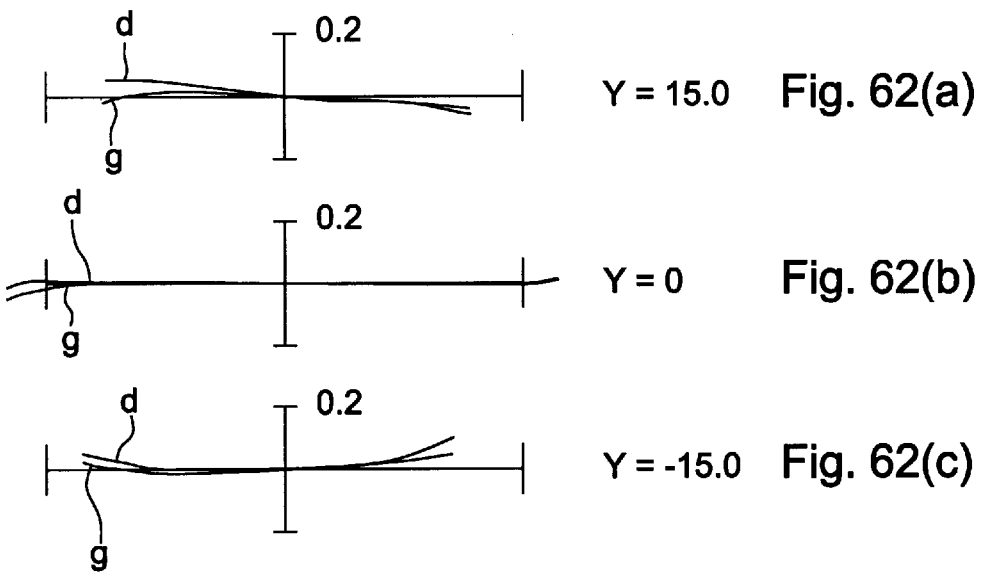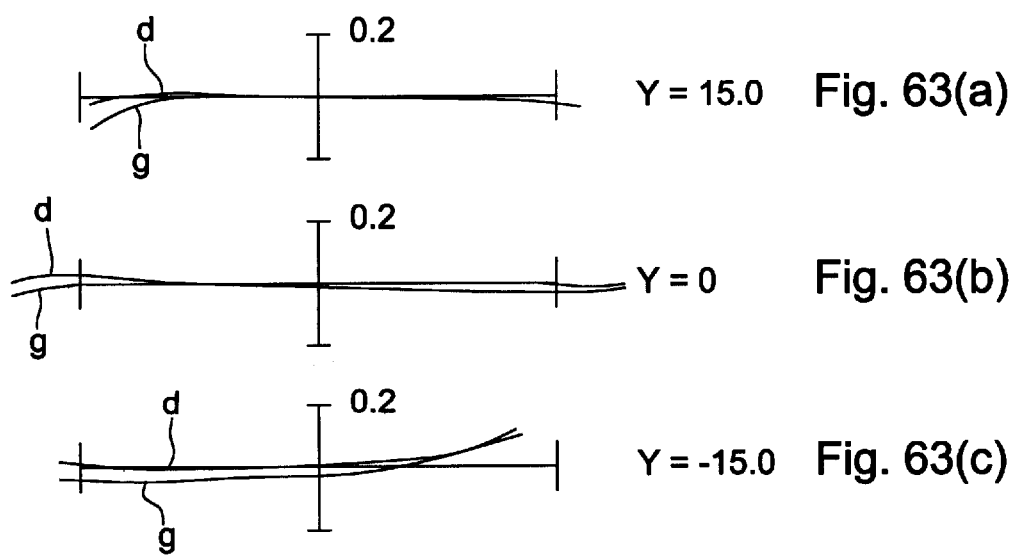

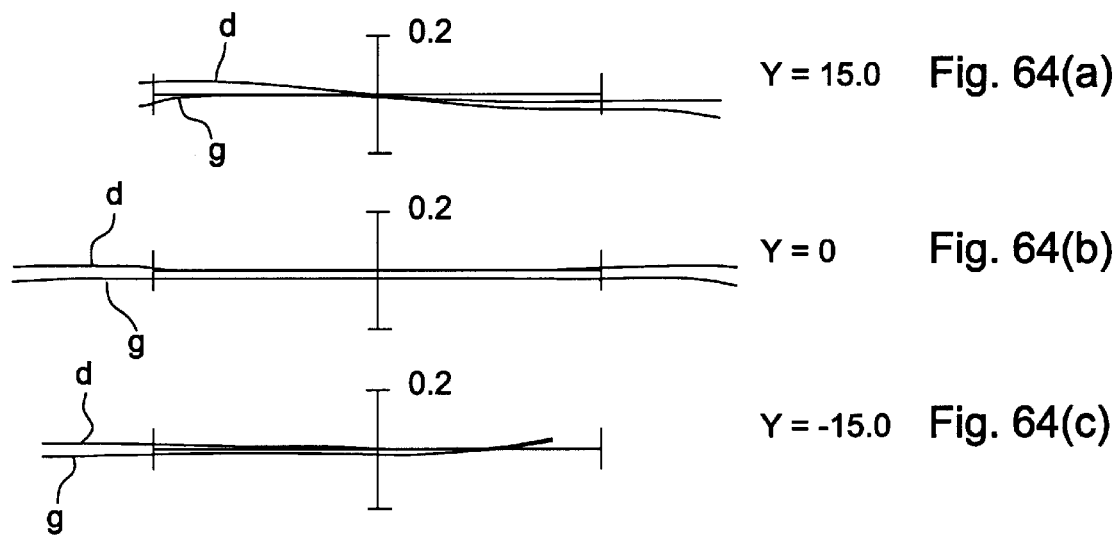
Y = 15.0  Fig. 64(a)
Y = 0     Fig. 64(b)
Y = -15.0 Fig. 64(c)
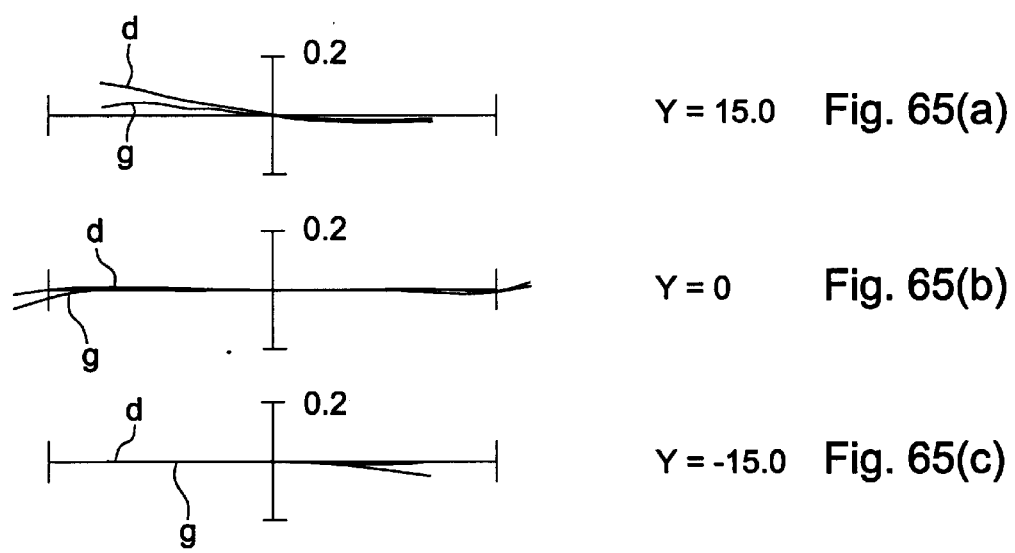
Y = 15.0  Fig. 65(a)
Y = 0     Fig. 65(b)
Y = -15.0 Fig. 65(c)

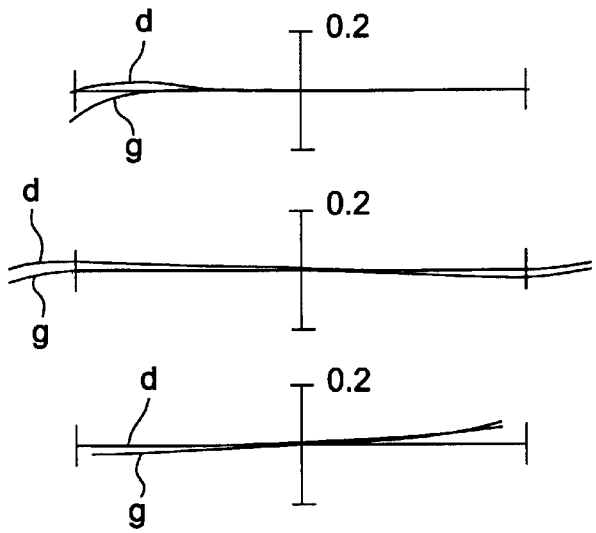
Y = 15.0   Fig. 66(a)
Y = 0      Fig. 66(b)
Y = -15.0  Fig. 66(c)
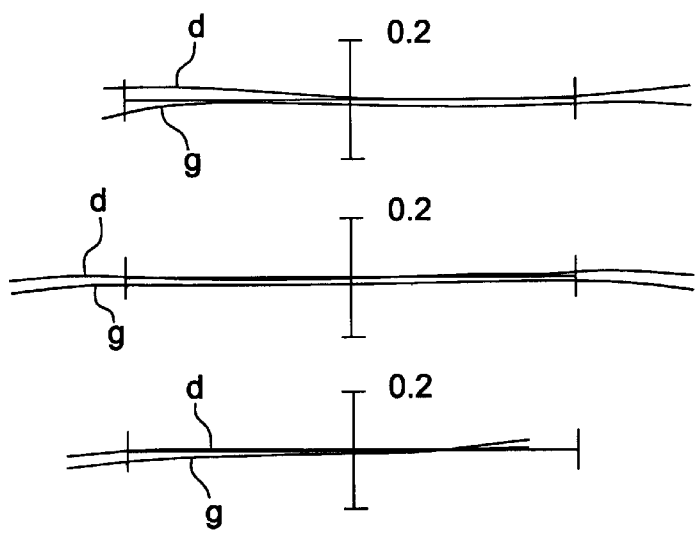
Y = 15.0   Fig. 67(a)
Y = 0      Fig. 67(b)
Y = -15.0  Fig. 67(c)

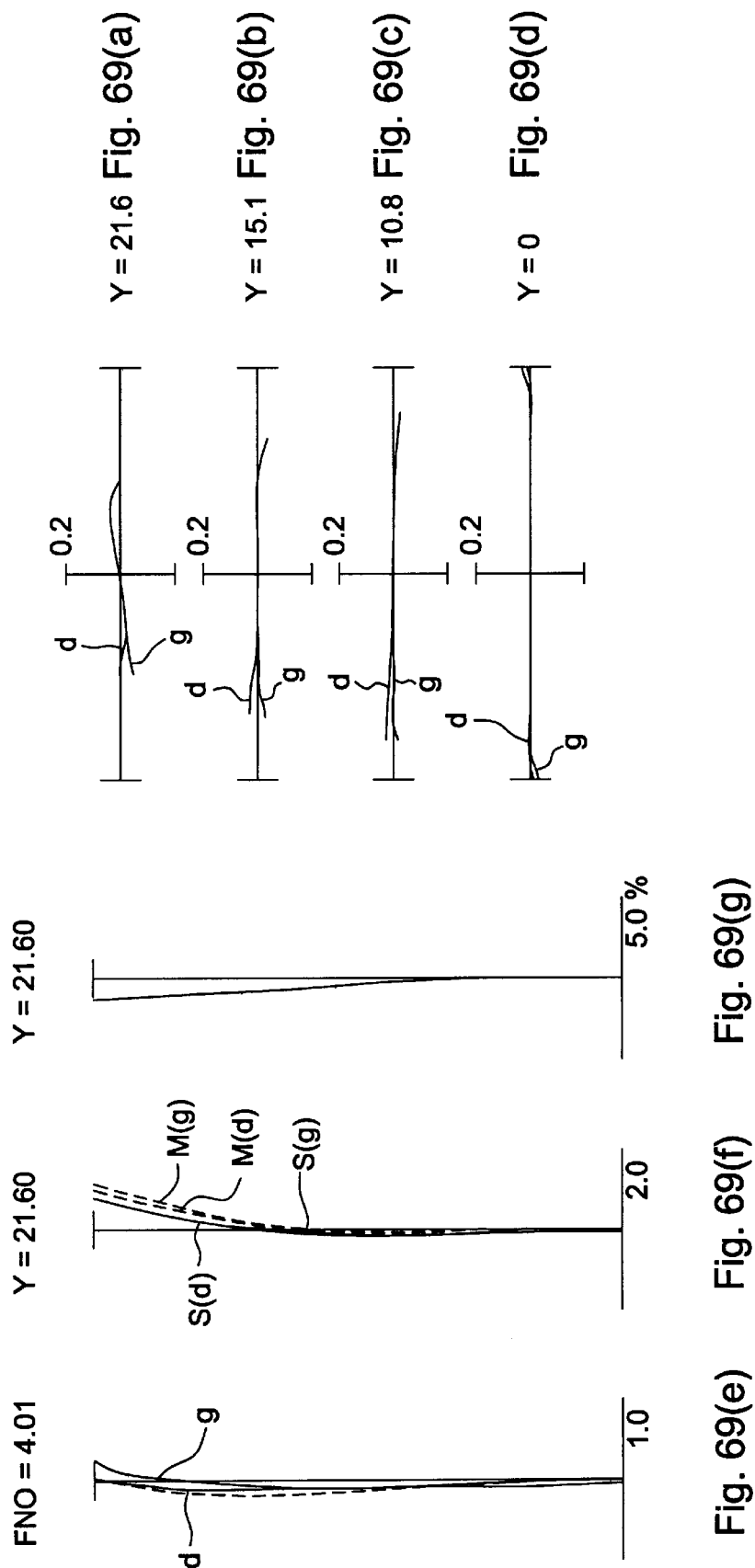

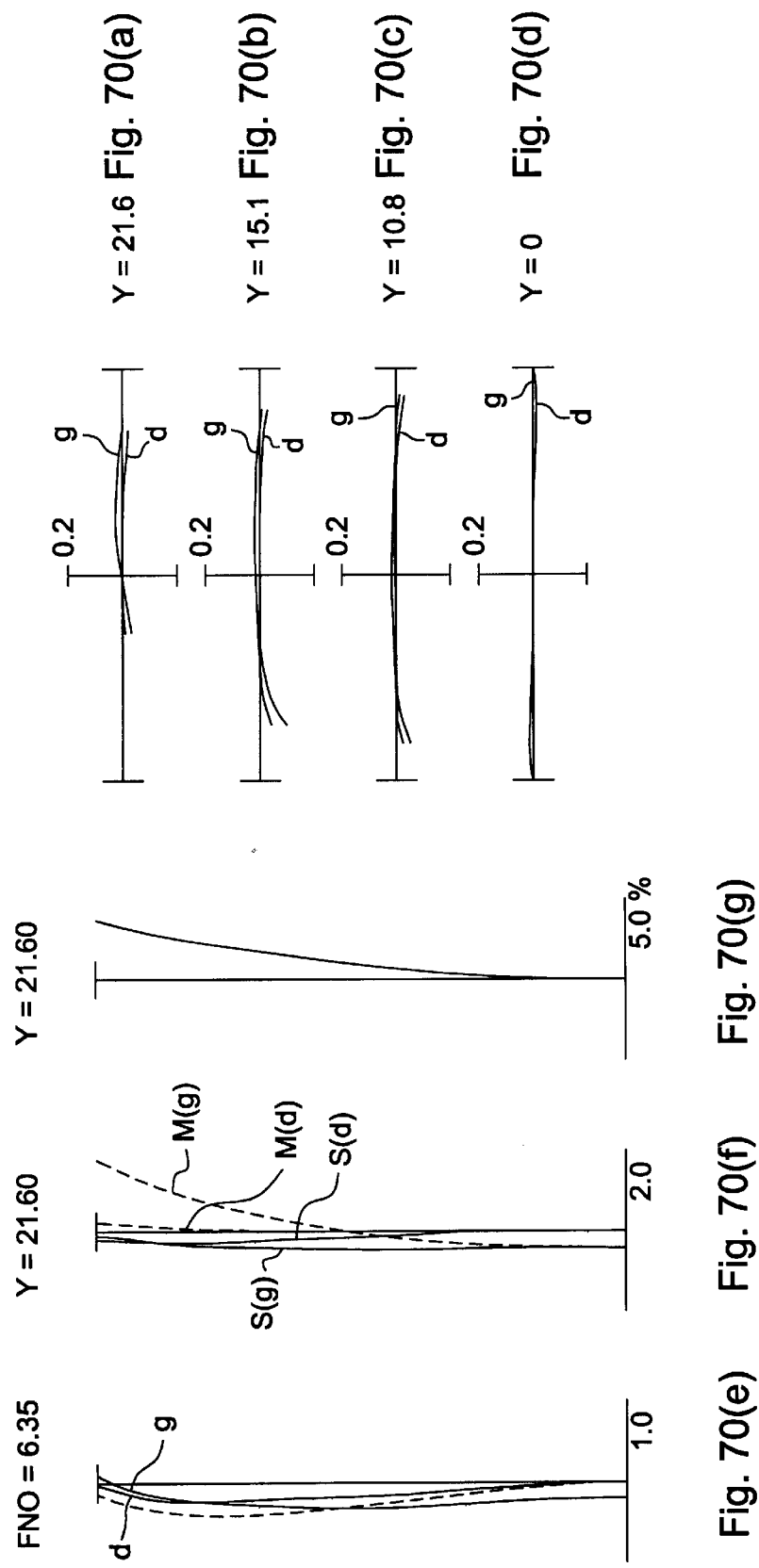

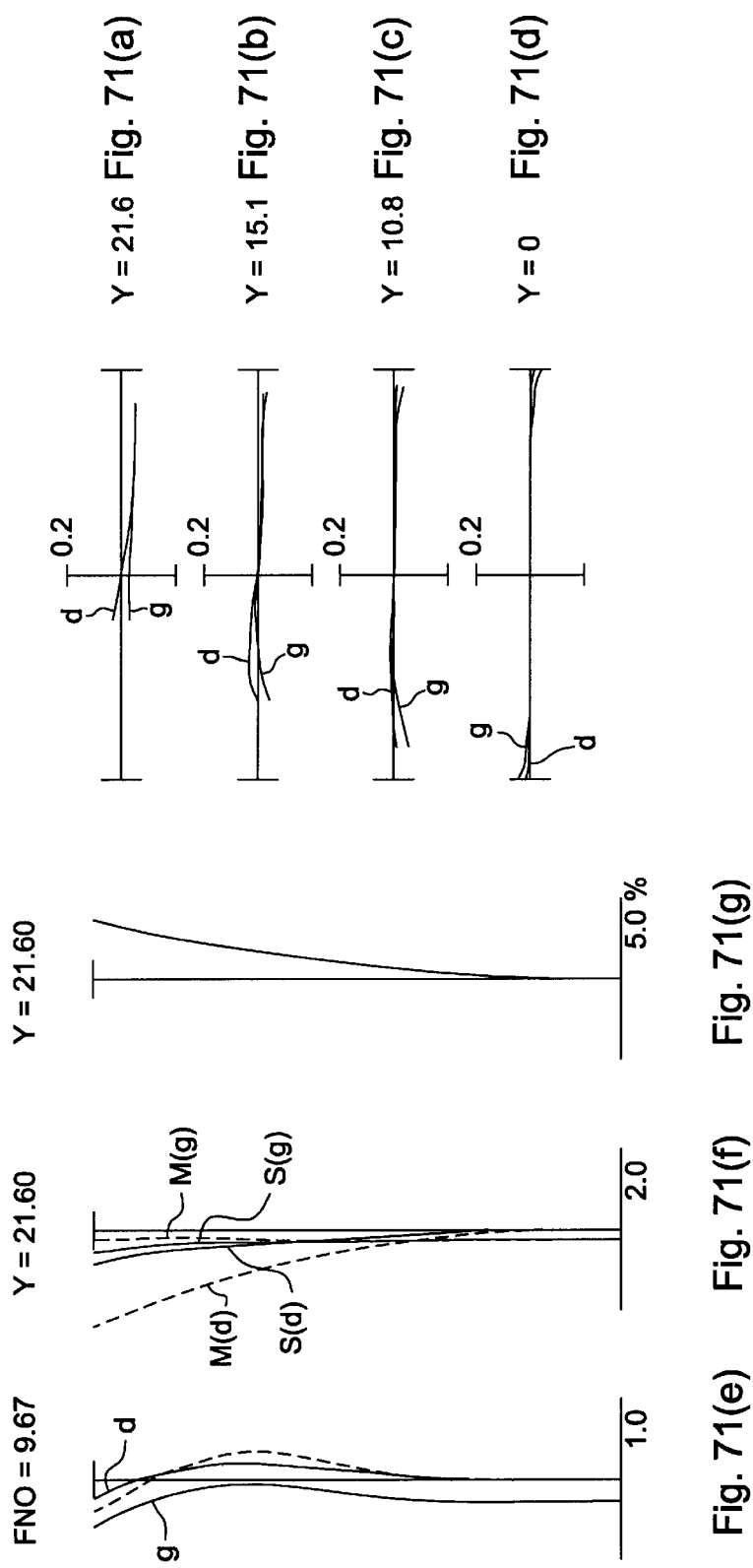

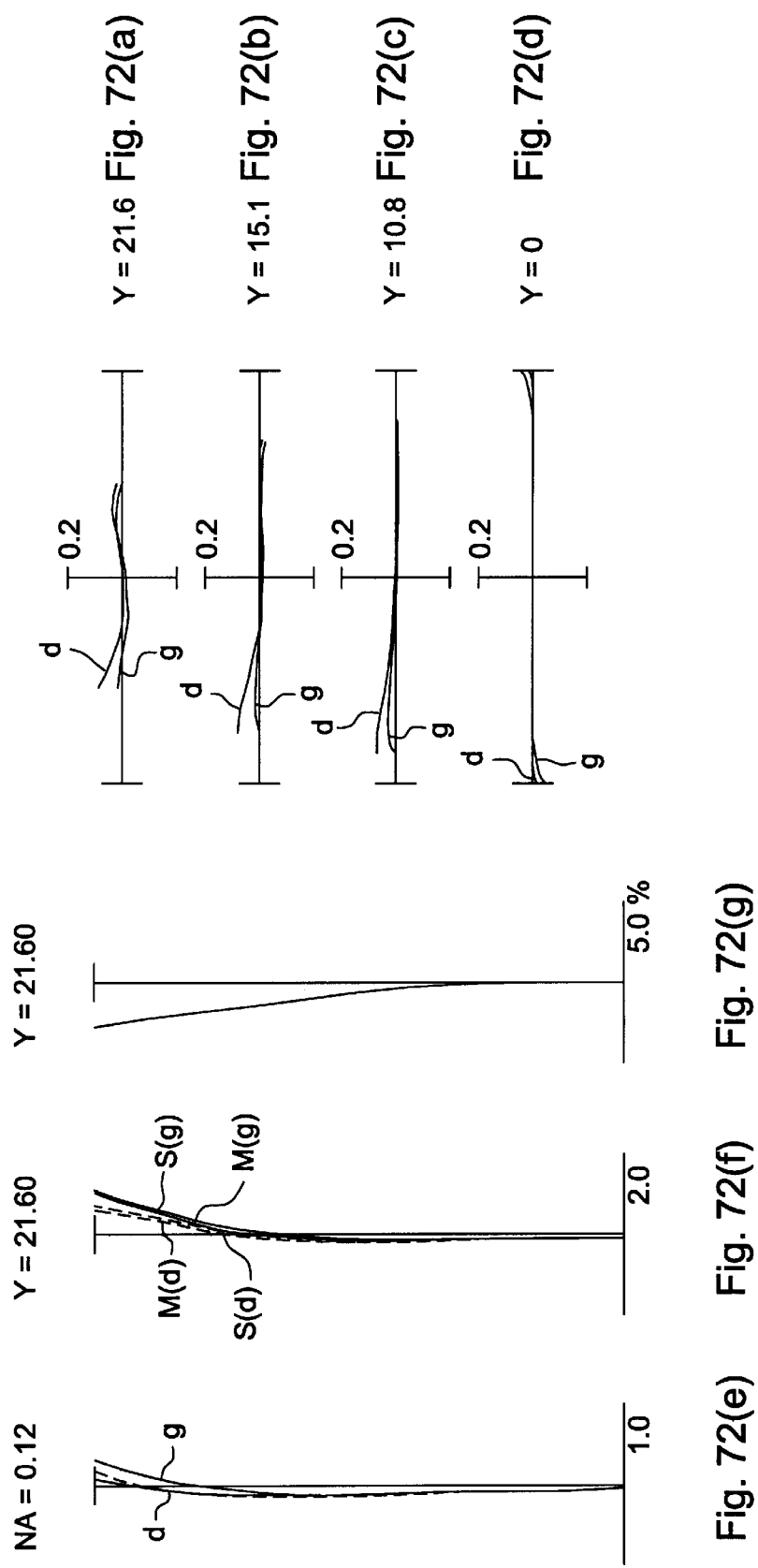

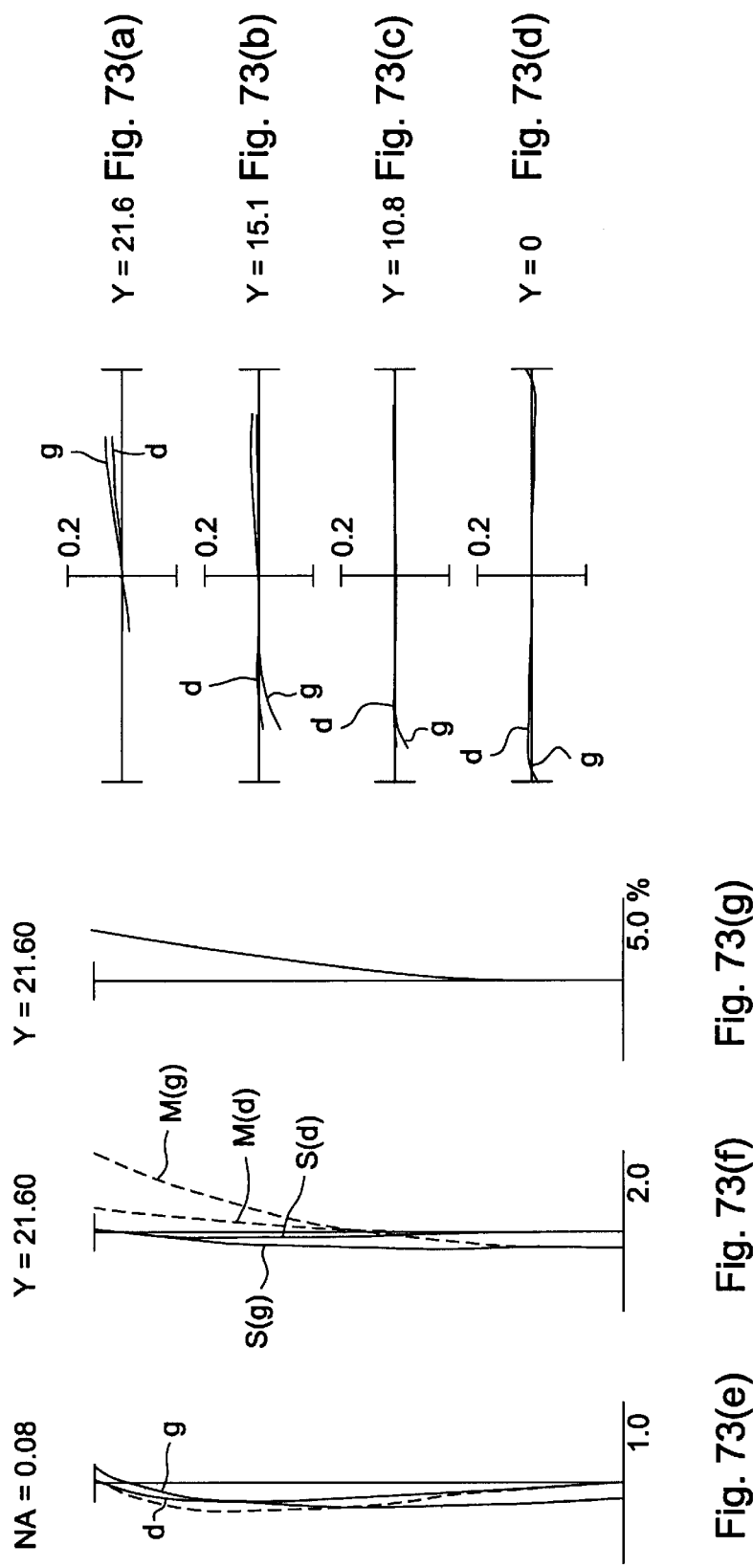

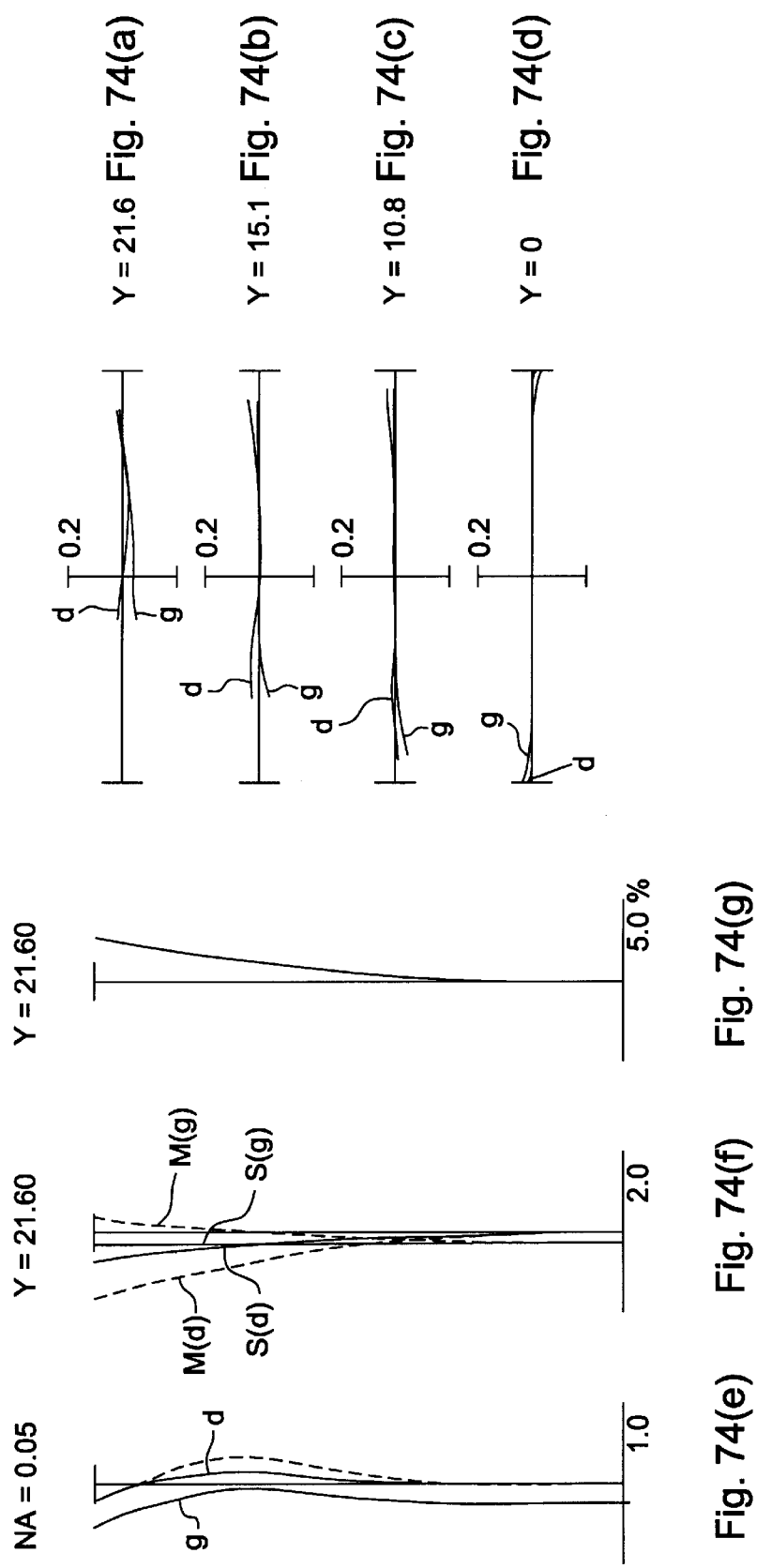

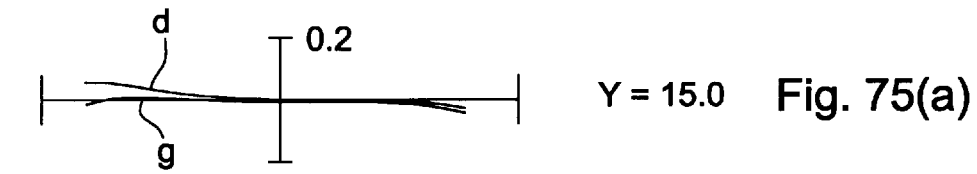
Y = 15.0  Fig. 75(a)
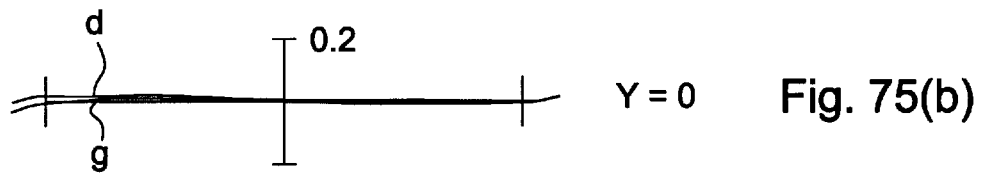
Y = 0  Fig. 75(b)
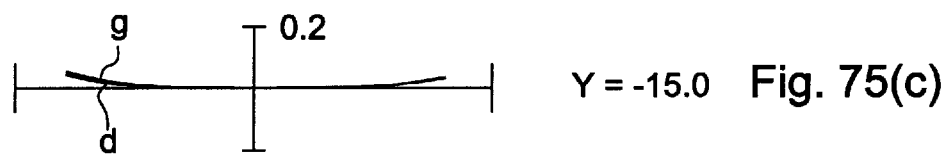
Y = -15.0  Fig. 75(c)
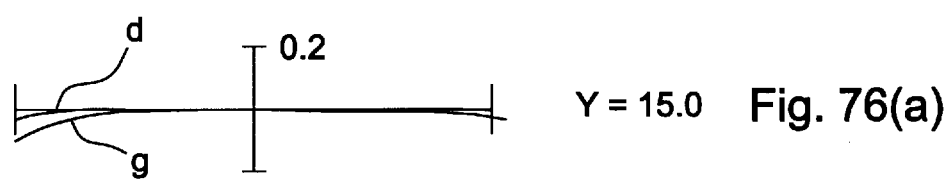
Y = 15.0  Fig. 76(a)
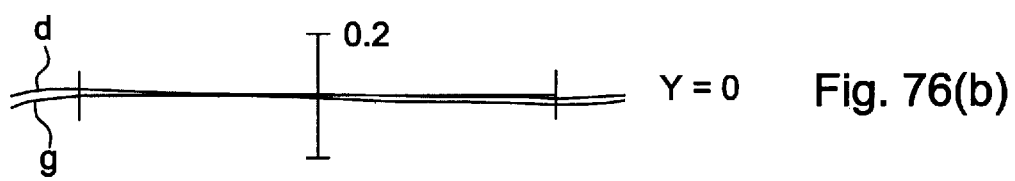
Y = 0  Fig. 76(b)
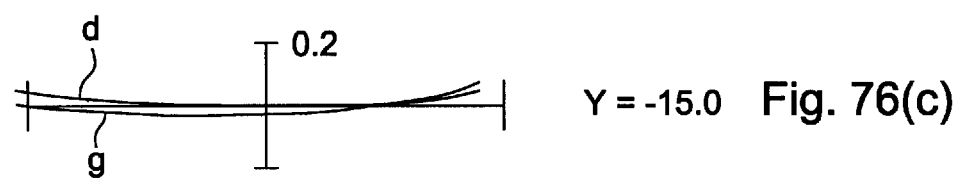
Y = -15.0  Fig. 76(c)

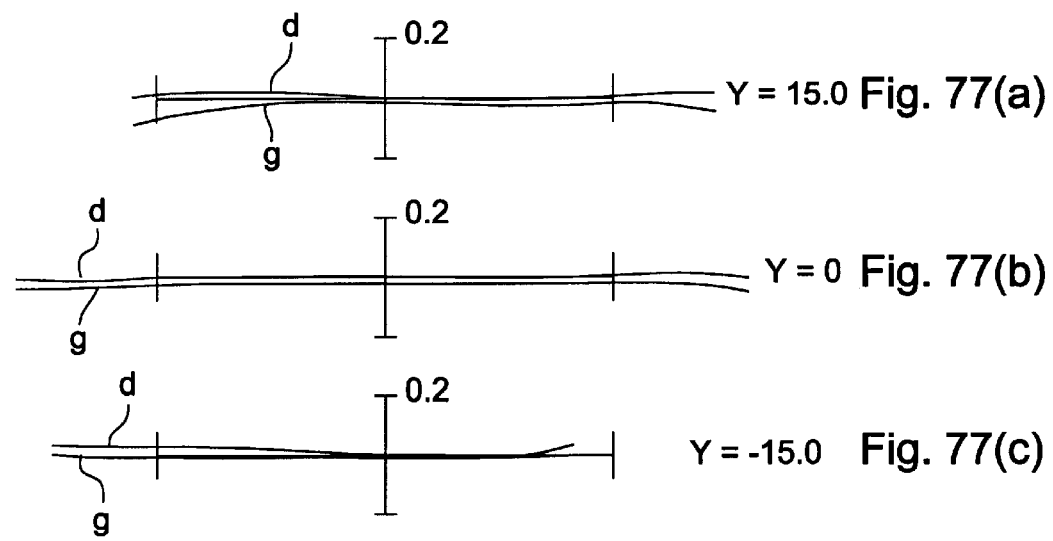
Fig. 77(a) Y = 15.0
Fig. 77(b) Y = 0
Fig. 77(c) Y = -15.0
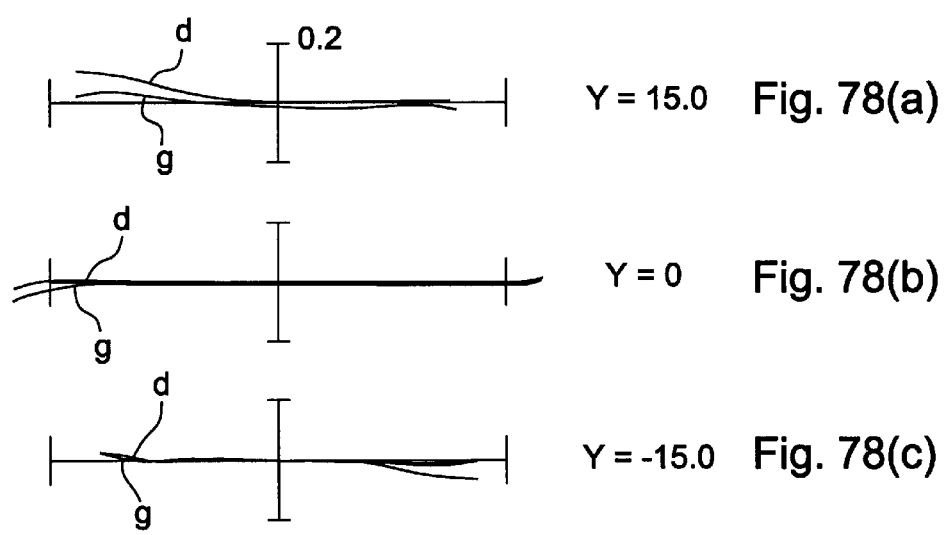
Fig. 78(a) Y = 15.0
Fig. 78(b) Y = 0
Fig. 78(c) Y = -15.0

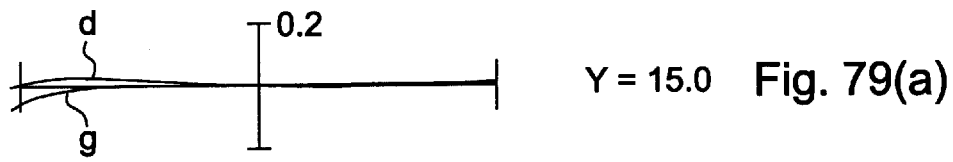
Y = 15.0  Fig. 79(a)
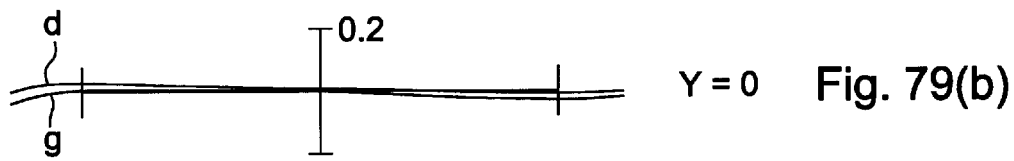
Y = 0  Fig. 79(b)
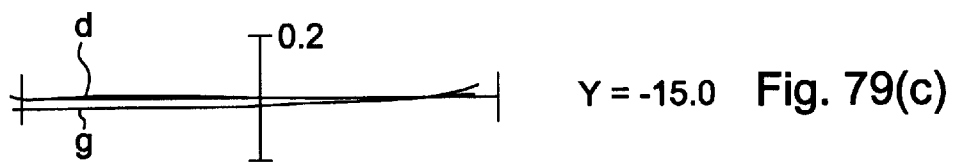
Y = -15.0  Fig. 79(c)
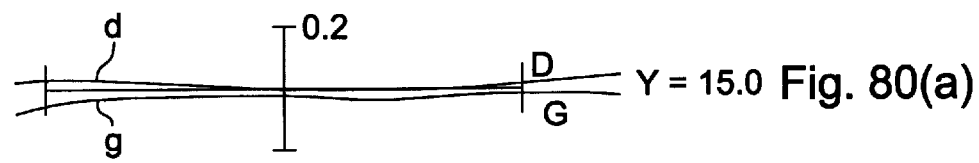
Y = 15.0  Fig. 80(a)
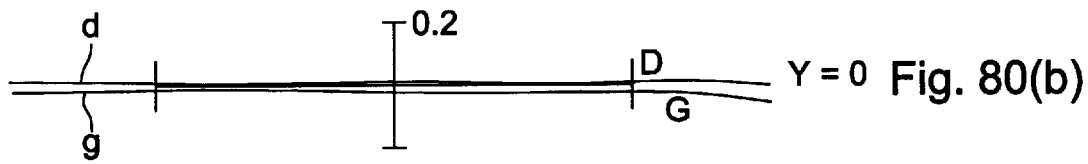
Y = 0  Fig. 80(b)
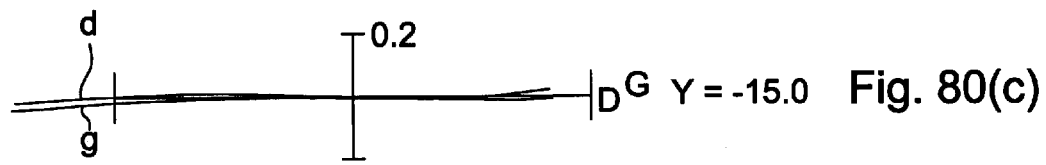
Y = -15.0  Fig. 80(c)

ZOOM LENS CAPABLE OF SHIFTING AN IMAGE

BACKGROUND OF THE INVENTION

1. Field of Invention

The present invention relates to a zoom lens capable of shifting an image, and specifically, to a zoom lens capable of shifting an image by causing a portion of the lens groups that comprise the lens system to move in a direction substantially perpendicular to the optical axis.

2. Description of Related Art

Various automatic camera operations, such as winding and rewinding of film, focusing, exposure, etc., have become about through electrical and mechanical advances in the basic technologies involved in developing a camera. In particular, there has been a remarkable decrease in errors in photography caused by over- and under-exposure and by improper focusing as the precision of automatic exposure and focus functions has increased. Furthermore, camera bodies have become smaller and lighter as a result of the advances in the basic technologies.

Zoom lenses with a high zoom ratio, e.g., zoom ratio greater than 2, are generally used in photography. With these zoom lenses, it is possible to take close pictures by extending the focal length of the telephoto end.

However, with smaller and more light weight cameras with long focal length, it is easier for photographs to be adversely affected by camera vibration caused by shaking of the hand or the like. Therefore, various proposals have been presented regarding so-called vibration reduction optical systems that correct for fluctuations of the image position caused by vibration of the optical system. In particular, zoom lenses that correct for fluctuations on the image plane caused by shaking are disclosed in Japanese Laid-Open Patent Publications Hei 1-191112, Hei 2-93620 and Hei 2-103014. In these publications, correction is effected by detecting the amount of vibration of the zoom lens and then causing the image to shift by moving a portion of the lens system by an appropriate amount in a direction substantially perpendicular to the optical axis.

The greater the permissible shift of the shift lens, the greater the vibration which can be corrected. In general, the shift amount $\delta$ of the image at the image plane can be expressed by the following equation (a) when a shift lens group GB is displaced by $\blacktriangle$ in a direction perpendicular to the optical axis:

$$\delta = \blacktriangle * \beta b * (1 - \beta a) \quad (a)$$

Here, $\beta a$ is the magnification of the lens groups GB and $\beta b$ is the composite magnification of all of the lens groups positioned closer to the image side than the shift lens group. If the absolute value of $\beta b*(1-\beta a)$ ($|\beta b*(1-\beta a)|$) becomes small, the displacement $\blacktriangle$ to shift the predetermined image amount becomes too large, so the vibration reduction mechanism becomes bulky. If the absolute value of $\beta b*(1-\beta a)$ ($|\beta b*(1-\beta a)|$) becomes large, the position control error of the lens group GB becomes too large to control the image position at the image plane. Accordingly, it is necessary for the absolute value of $\beta b*(1-\beta a)$ to be set to the suitable value.

With respect to Japanese Laid-Open Patent Publication Hei 1-191112, because the number of lenses which form the shift lens group is large, the shift lens group is large and heavy. In addition, when the zoom ratio is increased, the variation of various aberrations for zooming becomes large and the optical performance of the zoom lens is not sufficient. Further, when the shift amount of the image is large, the displacement of the shift lens group becomes large, and looking at changes in the several aberrations when preventing shaking, it is also necessary to address the question of deterioration of picture quality. When an attempt is made to increase both the zoom ratio and the displacement of the shift lens group, it is necessary to suppress the variations of aberrations caused by both zooming and image shifting in order to prevent deterioration of optical performance. In the zoom lens disclosed in Japanese Unexamined Patent Publication Hei 1-191112, it was not possible to achieve these increases and still obtain good performance.

In Japanese Unexamined Patent Publication Hei 2-93620, the shift lens group is made lighter and more compact by using, as the shift lens group, a portion of the lens group positioned closest to the image plane. However, when the attempt is made to increase the image shift amount and the zoom ratio by positioning fixed lens groups to the object side of the shift lens group, good imaging performance is not obtained.

In Unexamined Patent Publication Hei 2-103014, the shift lens group consists of a single negative lens. Consequently, it is impossible to suppress chromatic aberrations created by the shift lens group during the vibration reduction function. As a result, large variations in chromatic aberrations arise.

SUMMARY OF THE INVENTION

In consideration of the foregoing, it is an object of the present invention to provide a zoom lens in which both the zoom ratio and the image shift amount are increased while retaining good imaging performance.

In order to achieve the above and other objects of the invention, the zoom lens according to embodiments of the present invention includes an image shifting lens group having, in order from the object, a first lens sub-group, a second lens sub-group, and a third lens sub-group, wherein the lens group moves as an integral unit along the optical axis when zooming from the wide-angle end to the telephoto end and the second lens sub-group has at least one positive lens element and at least one negative lens element. The image is shifted by causing the second lens sub-group to move in a direction substantially perpendicular to the optical axis. With this arrangement, both zoom ratio and image shift amount can be increased while retaining good performance.

In accordance with another aspect of the invention, the lens configurations of the lens group satisfies the formula: $-0.25 < (\phi B1 + \phi B3)/\phi B2 < 0.25$, where $\phi B1$ is the refractive power of the first lens sub-group, $\phi B2$ is the refractive power of the second lens sub-group and $\phi B3$ is the refractive power of the third lens sub-group. With this arrangement, the structure of the second sub-lens group can be simplified.

In accordance with another embodiment of the present invention, each of the first and third sub-lens groups includes at least one plastic lens, and satisfied the following formula: $-1 < (\phi P1 + \phi P3)/(\phi P1 - \phi P3) < 1$, where $\phi P1$ denotes the refraction power of the plastic lens in the first lens sub-group and $\phi P3$ denotes the refractive power of the plastic lens in the third lens sub-group. With this arrangement, weight is reduced and fabrication and design are simplified while retaining good performance.

BRIEF DESCRIPTION OF THE DRAWINGS

The invention will be described in detail with reference to the following drawings in which like reference numerals refer to like elements and wherein:

FIGS. 4(a)–4(i) show the aberrations in the infinite distance focus state at the wide-angle end of the first embodiment.

FIGS. 5(a)–5(i) show the aberrations in the infinite distance focus state at an intermediate focal length state in the first embodiment.

FIGS. 6(a)–6(i) show the aberrations in the infinite distance focus state at the telephoto end in the first embodiment.

FIGS. 7(a)–7(i) show the aberrations in a focusing state with photographic magnification of −1/40 at the wide-angle end in the first embodiment.

FIGS. 8(a)–8(i) show the aberrations in a focusing state with photographic magnification of −1/40 at an intermediate focal length state in the first embodiment.

FIGS. 9(a)–9(i) show the aberrations in a focusing state with photographic magnification of −1/40 at the telephoto end in the first embodiment.

FIGS. 10(a)–10(c) show the coma aberrations during image shifting in the infinite distance focus state at the wide-angle end in the first embodiment.

FIGS. 11(a)–11(c) show the coma aberrations during image shifting in the infinite distance focus state at an intermediate focal length in the first embodiment.

FIGS. 12(a)–12(c) show the coma aberrations during image shifting in the infinite distance focus state at the telephoto end in the first embodiment.

FIGS. 13(a)–13(c) show the coma aberrations during image shifting with a photographic magnification of −1/40 at the wide-angle end in the first embodiment.

FIGS. 14(a)–14(c) show the coma aberrations during image shifting with a photographic magnification of −1/40 at an intermediate focal length in the first embodiment.

FIGS. 15(a)–15(c) show the coma aberrations during image shifting with a photographic magnification of −1/40 at the telephoto end in the first embodiment.

FIGS. 17(a)–17(i) show the aberrations in the infinite distance focus state at the wide-angle end in the second embodiment.

FIGS. 18(a)–18(i) show the aberrations in the infinite distance focus state at an intermediate focal length state in the second embodiment.

FIGS. 19(a)–19(i) show the aberrations in the infinite distance focus state at the telephoto end in the second embodiment.

FIGS. 20(a)–20(i) show the aberrations in a focusing state with photographic magnification of −1/30 at the wide-angle end in the second embodiment.

FIGS. 21(a)–21(i) show the aberrations in a focusing state with photographic magnification of −1/30 at an intermediate focal length state in the second embodiment.

FIGS. 22(a)–22(i) show the aberrations in a focusing state with photographic magnification of −1/30 at the telephoto end in the second embodiment.

FIGS. 23(a)–23(c) show the coma aberrations during image shifting in the infinite distance focus state at the wide-angle end in the second embodiment.

FIGS. 24(a)–24(c) show the coma aberrations during image shifting in the infinite distance focus state at an intermediate focal length in the second embodiment.

FIGS. 25(a)–25(c) show the coma aberrations during image shifting in the infinite distance focus state at the telephoto end in the second embodiment.

FIGS. 26(a)–26(c) show the coma aberrations during image shifting with a photographic magnification of −1/30 at the wide-angle end in the second embodiment.

FIGS. 27(a)–27(c) show the coma aberrations during image shifting with a photographic magnification of −1/30 at an intermediate focal length in the second embodiment.

FIGS. 28(a)–28(c) show the coma aberrations during image shifting with a photographic magnification of −1/30 at the telephoto end in the second embodiment.

FIGS. 30(a)–30(g) show the aberrations in the infinite distance focus state at the wide-angle end in the third embodiment.

FIGS. 31(a)–31(g) show the aberrations in the infinite distance focus state at an intermediate focal length state in the third embodiment.

FIGS. 32(a)–32(g) show the aberrations in the infinite distance focus state at the telephoto end in the third embodiment.

FIGS. 33(a)–33(g) show the aberrations in a focusing state with photographic magnification of −1/30 at the wide-angle end in the third embodiment.

FIGS. 34(a)–34(g) show the aberrations in a focusing state with photographic magnification of −1/30 at an intermediate focal length state in the third embodiment.

FIGS. 35(a)–35(g) show the aberrations in a focusing state with photographic magnification of −1/30 at the telephoto end in the third embodiment.

FIGS. 38(a)–38(c) show the coma aberrations during image shifting in the infinite distance focus state at the telephoto end in the third embodiment.

FIGS. 39(a)–39(c) show the coma aberrations during image shifting with a photographic magnification of −1/30 at the wide-angle end in the third embodiment.

FIGS. 40(a)–40(c) show the coma aberrations during image shifting with a photographic magnification of −1/30 at an intermediate focal length in the third embodiment.

FIGS. 41(a)–41(c) show the coma aberrations during image shifting with a photographic magnification of −1/30 at the telephoto end in the third embodiment.

FIGS. 43(a)–43(i) show the aberrations in the infinite distance focus state at the wide-angle end in the fourth embodiment.

FIGS. 44(a)–44(i) show the aberrations in the infinite distance focus state at an intermediate focal length state in the fourth embodiment.

FIGS. 45(a)–45(i) show the aberrations in the infinite distance focus state at the telephoto end in the fourth embodiment.

FIGS. 46(a)–46(i) show the aberrations in a focusing state with photographic magnification of −1/40 at the wide-angle end in the fourth embodiment.

FIGS. 47(a)–47(i) show the aberrations in a focusing state with photographic magnification of −1/40 at an intermediate focal length state in the fourth embodiment.

FIGS. 48(a)–48(i) show the aberrations in a focusing state with photographic magnification of −1/40 at the telephoto end in the fourth embodiment.

FIGS. 49(a)–49(c) show the coma aberrations during image shifting in the infinite distance focus state at the wide-angle end in the fourth embodiment.

FIGS. 50(a)–50(c) show the coma aberrations during image shifting in the infinite distance focus state at an intermediate focal length in the fourth embodiment.

FIGS. 51(a)–51(c) show the coma aberrations during image shifting in the infinite distance focus state at the telephoto end in the fourth embodiment.

FIGS. 52(a)–52(c) show the coma aberrations during image shifting with a photographic magnification of −1/40 at the wide-angle end in the fourth embodiment.

FIGS. 53(a)–53(c) show the coma aberrations during image shifting with a photographic magnification of −1/40 at an intermediate focal length in the fourth embodiment.

FIGS. 54(a)–54(c) show the coma aberrations during image shifting with a photographic magnification of −1/40 at the telephoto end in the fourth embodiment.

FIGS. 56(a)–56(i) show the aberrations in the infinite distance focus state at the wide-angle end in the fifth embodiment.

FIGS. 57(a)–57(i) show the aberrations in the infinite distance focus state at an intermediate focal length state in the fifth embodiment.

FIGS. 58(a)–58(i) show the aberrations in the infinite distance focus state at the telephoto end in the fifth embodiment.

FIGS. 59(a)–59(i) show the aberrations in a focusing state with photographic magnification of −1/30 at the wide-angle end in the fifth embodiment.

FIGS. 60(a)–60(i) show the aberrations in a focusing state with photographic magnification of −1/30 at an intermediate focal length state in the fifth embodiment.

FIGS. 61(a)–61(i) show the aberrations in a focusing state with photographic magnification of −1/30 at the telephoto end in the fifth embodiment.

FIGS. 62(a)–62(c) show the coma aberration during image shifting in the infinite distance focus state at the wide-angle end in the fifth embodiment.

FIGS. 63(a)–63(c) show the coma aberrations during image shifting in the infinite distance focus state at an intermediate focal length in the fifth embodiment.

FIGS. 64(a)–64(c) show the coma aberration during image shifting in the infinite distance focus state at the telephoto end in the fifth embodiment.

FIGS. 65(a)–65(c) show the coma aberrations during image shifting with a photographic magnification of −1/30 at the wide-angle end in the fifth embodiment.

FIGS. 66(a)–66(c) show the coma aberrations during image shifting with a photographic magnification of −1/30 at an intermediate focal length in the fifth embodiment.

FIGS. 67(a)–67(c) show the coma aberrations during image shifting with a photographic magnification of −1/30 at the telephoto end in the fifth embodiment.

FIGS. 69(a)–69(g) show the aberrations in the infinite distance focus state at the wide-angle end in the sixth embodiment.

FIGS. 70(a)–70(g) show the aberrations in the infinite distance focus state at an intermediate focal length state in the sixth embodiment.

FIGS. 71(a)–71(g) show the aberrations in the infinite distance focus state at the telephoto end in the sixth embodiment.

FIGS. 72(a)–72(g) show the aberrations in a focusing state with photographic magnification of −1/30 at the wide-angle end in the sixth embodiment.

FIGS. 73(a)–73(g) show the aberrations in a focusing state with photographic magnification of −1/30 at an intermediate focal length state in the sixth embodiment.

FIGS. 74(a)–74(g) show the aberrations in a focusing state with photographic magnification of −1/30 at the telephoto end in the sixth embodiment.

FIGS. 75(a)–75(c) show the coma aberrations during image shifting in the infinite distance focus state at the wide-angle end in the sixth embodiment.

FIGS. 76(a)–76(c) show the coma aberrations during image shifting in the infinite distance focus state at an intermediate focal length in the sixth embodiment.

FIGS. 77(a)–77(c) show the coma aberrations during image shifting in the infinite distance focus state at the telephoto end in the sixth embodiment.

FIGS. 78(a)–78(c) show the coma aberration during image shifting with a photographic magnification of −1/30 at the wide-angle end in the sixth embodiment.

FIGS. 79(a)–79(c) show the coma aberrations during image shifting with a photographic magnification of −1/30 at an intermediate focal length in the sixth embodiment.

FIGS. 80(a)–80(c) show the coma aberrations during image shifting with a photographic magnification of −1/30 at the telephoto end in the sixth embodiment.

DETAILED DESCRIPTION OF PREFERRED EMBODIMENTS

Figure 1:
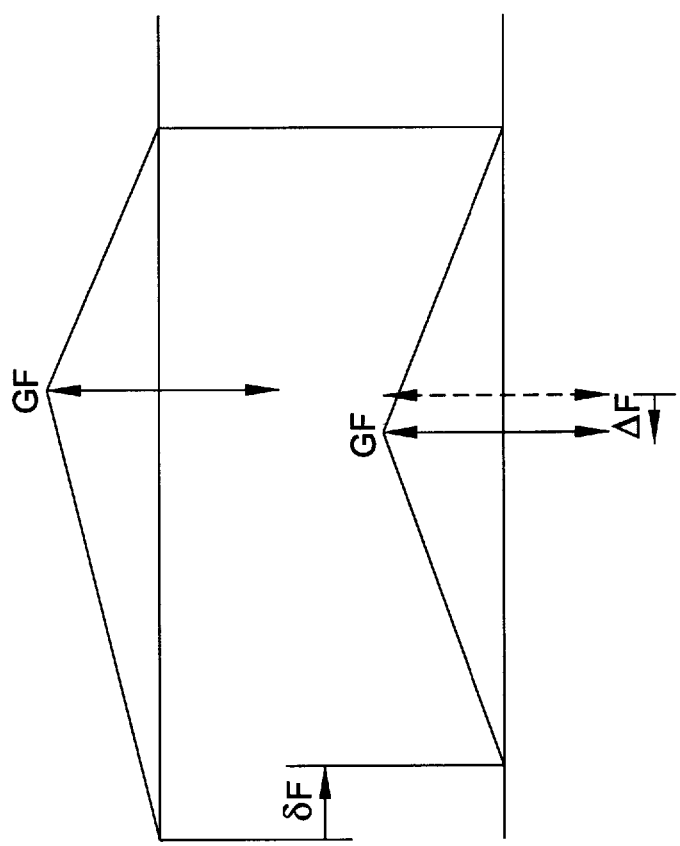
FIG. 1 is a schematic diagram showing the relationship between movement of the focusing lens group GF and the change in position of the object point.

Preferred embodiments of the present invention is described hereafter, with reference to the drawings. When a lens group is displaced in a direction substantially perpendicular to the optical axis in order to shift an image, variations in aberrations occur. The variations in aberrations cause a deterioration in image quality. Accordingly, in order to maintain good performance, it is necessary to suppress these aberrations during shifting of the shift lens group.

The aberrations are created as a result of several factors. First, when the sine condition becomes large in a positive direction in comparison to spherical aberration, off-axis aberration show a tendency toward positive coma in regions near but slightly off the optical axis. Conversely, when the sine condition becomes large in a negative direction in comparison to spherical aberration, the tendency is toward negative coma. Consequently, when spherical aberration and the sine condition are not corrected so as to have a good balance by the shift lens group, astigmatism is created at the center of the field when the shift lens group is decentered from the optical axis.

Curvature of the image plane occurs when the Petzval sum of the shift lens group is not a suitable value. An unsuitable value will result in the image plane becoming oblique. This is because positive image plane warping is created on one side while negative image plane warping is created on the other side when the shift lens group decenters from the optical axis. Consequently, it is necessary to make the Petzval sum of the shift lens group a suitable value and thus suppress variations in image plane warping created when the shift lens group is displaced.

Furthermore, when correction of the chromatic aberration in the shift lens group is insufficient, high variations in chromatic aberrations are created when the shift lens group decenters. Consequently, correction of chromatic aberration by the shift lens group is necessary.

With a zoom lens, the aberrations created by each of the lens groups are corrected to some degree. Consequently, when a shifting lens group optical system is applied to a zoom lens, it is possible to suppress, to a certain degree, the above-described variations in aberrations. However, when the zoom ratio is increased, the change in magnification of each lens group increases. This results in an increase in variation of aberrations. In order to sufficiently suppress variations in aberrations created when zooming, each lens group is required to have a set aberration correction condition.

Hereinafter, a description will be provided of a specific method of compensating fluctuations in image position caused by camera shaking.

The displacement $\delta'$ of the image position on the image plane in the zoom lens of the present invention can be expressed using the following equation (b), wherein f is the focal length between the wide-angle end and the telephoto end, and $\epsilon$ is the angle of inclination of the zoom lens as a whole in the plane including the optical axis of the zoom lens:

$$\delta' = f^* \tan \epsilon \quad (b)$$

However, when the angle of inclination is approximated as being small, the displacement $\delta'$ of the image position can be expressed using equation (b') below.

$$\delta' = f^* \epsilon \quad (b')$$

On the other hand, the shift amount $\delta$ on the image plane of a light ray close to the axis can be expressed by above-described equation (a), shown again below, wherein $\beta a$ is the magnification of a shift lens group GB and $\beta b$ is the imaging magnification of a lens group positioned to the image side of the shift lens group GB, and ▲ is the displacement of the shift lens group in a direction perpendicular to the optical axis.

$$\delta = \blacktriangle^* \beta b^* (1 - \beta a) \quad (a)$$

In order to correct for displacement $\delta'$ of the image position when the zoom lens is inclined at an angle $\epsilon$, it is desirable to shift the image by $-\delta$ by causing the shift lens group to move in a direction perpendicular to the optical axis so that $\delta' = -\delta$. From equations (a) and (b), the relationship expressed by the following equation (c) can be established between the angle $\epsilon$ of inclination and the displacement ▲.

$$\blacktriangle = -\epsilon^* f / \{\beta b^* (1 - \beta a)\} \quad (c)$$

By causing the shift lens group to be displaced by ▲ in a direction perpendicular to the optical axis so as to satisfy above-described equation (c), the displacement $\delta'$ of the image position caused by shaking or the like at an angle $\epsilon$ of inclination of the zoom lens, and the shift amount $\delta$ of the image from the vibration reduction operation, offset each other. Consequently, it is possible to correct for image position fluctuation.

With the present invention, the lens group G4 consists of lens sub-groups L41, L42 and L43 from the object side. The lens group G4 is moved integrally as a whole for zooming. Further, the lens sub-group L42 is moved substantially perpendicular to the optical axis to shift the image. The lens group G4 is corrected to suppress the variation of the various aberrations as a whole caused by making the zoom ratio high, and the lens sub-group L42 is corrected to suppress the performance deterioration when the amount of the image shift is increased. So the amount of the image shift is increased to keep good performance, while the zoom ratio becomes high. Consequently, performance deterioration is suppressed when shifting the image, while the zoom ratio is increased. Furthermore, by conducting the aberration correction required in order to increase the zoom ratio of the lens group G4, it is possible to suppress variations in aberrations accompanying zooming. In addition, by conducting the aberration correction necessary to suppress deterioration of image quality during image shifting by moving the sub-group L42 in a direction substantially perpendicular to the optical axis, it becomes possible to enlarge the shift amount of the image.

With the present invention, in order to suppress deterioration of the image quality created during image shifting as described above, it is necessary to correct favorably the sine condition and the spherical aberration created in lens sub-group L42. Consequently, lens sub-group L42 is comprised of at least one positive lens element and at least one negative lens element.

Furthermore, by providing the positive lens element and the negative lens element each with a suitable refractive index, it is possible to suppress favorably variations in image warping created during image shifting by making a suitable value for the Petzval sum of the lens sub-group L42 alone. Furthermore, it is possible to correct chromatic aberration in the lens sub-group L42 alone by providing both the positive lens element and negative lens element with suitable Abbe numbers.

Hereinafter, the various conditional equations for the present invention are described.

In the zoom lens of the present invention, it is desirable for the following conditional equation (1) to be satisfied:

$$-0.25 < (\phi B1 + \phi B3)/\phi B2 < 0.25 \quad (1)$$

Here, $\phi B1$ is the refractive power of the lens sub-group L41, $\phi B2$ is the refractive power of the lens sub-group L42, and $\phi B3$ is the refractive power of the lens sub-group L43.

Conditional equation (1) is used to obtain favorable optical performance by preventing deterioration of the image quality during image shifting while suppressing variations in the aberrations created during zooming of the lens group G4.

When the lens sub-group L42 moves in a direction perpendicular to the optical axis, light rays headed toward the center of the image field pass through and are shifted by the lens sub-group L42. When the upper limit in conditional equation (1) is exceeded, the displacement of lens sub-group L42 required to shift the image by a prescribed amount becomes large. Consequently, it becomes necessary for the lens sub-group L42 to have a large aperture making it impossible for the lens sub-group L42 to have a simple structure. In addition, the drive mechanism, which causes the lens sub-group L42 to move in a direction perpendicular to the optical axis, becomes undesirably bulky.

Conversely, when the lower limit in conditional equation (1) is exceeded, the refractive power of the lens sub-group L42 becomes too strong so that the lens subgroup L42 must have a large diameter. This is not desirable because it becomes impossible for the shift lens group to have a simple structure.

In order to further suppress a decrease in image performance during image shifting, an aperture stop S should be arranged either on the image side or the object side of the lens group G4, or in the lens group G4 of the present invention. The purpose of the aperture stop S is to minimize the difference in heights between off-axis and on-axis rays passing through the lens sub-group L42. When the difference between the heights of off-axis rays and on-axis rays passing through the lens sub-group L42 is large, the off-axis rays pass through the lens sub-group L42 closer to the boundary when the image is shifted by moving the lens sub-group L42 in a direction perpendicular to the optical axis. This results in an increase in the amount of the aberrations.

The lens surface closest to the aperture stop and included in one of the lens sub-groups L41 or L43, whichever group is farther from the aperture stop S, is selected to be concave on the side toward the aperture stop. The lens surface is also selected to satisfy the following conditional equation (2):

$$0.05 < D/|ra| < 0.6 \qquad (2)$$

where ra is the radius of curvature of the lens surface, and D is the distance along the optical axis between the lens surface and aperture stop S.

Conditional equation (2) specifies the appropriate range for the ratio of the distance D along the optical axis between the lens surface and aperture stop S and the size of the radius of curvature ra of the lens surface. When the range specified by the upper and lower limits in conditional equation (2) is deviated from, significant deterioration of off-axis performance occurs when the image is shifted by the lens sub-group L42. Preferably, the lower limit and upper limits should be set to 0.1 and 0.5, respectively.

Focusing is preferably performed by moving the lens group GF, which is positioned on the object side of the lens group G4 or adjacent to the lens group G4 on the image side, along the optical axis. A lens group positioned near aperture stop S is preferably selected as a focusing lens group because the height at which the off-axis rays pass through the lens group is close to the optical axis and the lens size is small.

When focusing lens group GF is positioned on the object side of lens group G4, the use magnification of the lens group positioned on the image side of the lens group G4 does not change, even when the photographic distance changes under certain focal length conditions. Consequently, it is possible to easily control image shifting by the shift lens sub-group L42.

Next, the focusing method in the zoom lens of the present invention is described below.

In general, driving becomes easier as the displacement of the focusing lens group GF becomes smaller. Accordingly, the following description will use a thin lens system in explaining the conditions needed to reduce the displacement ▲F of focusing the lens group GF.

As shown in FIG. 1, when the position of the object point with respect to the focusing lens group GF moves by the amount δF, the lens group GF moves by the amount ▲F in order for the position of the object point with respect to the lens group G4 to be constant. The displacement ▲F can be expressed by the following equation (d), wherein βF is the imaging magnification of the lens group GF:

$$\blacktriangle F = \beta F^2/(\beta F^2 - 1) * \delta F \qquad (d)$$

In equation (d), calling $k = \beta F^2/(\beta F^2-1)$, it can be seen that:

$1 < j \ (\beta F^2 > 1)$ $0 > k \ (\beta F^2 < 1)$

In order to make the displacement ▲F as small as possible, it is desirable, where $\beta F^2 > 1$, to make k as close to 1 as possible, i.e., to make $1/\beta F$ close to 0. Where $\beta F^2 < 1$, it is desirable to make k as close to 0 as possible, i.e., to make βF close to 0.

In addition, it is desirable for conditional equation (3) below to be satisfied in order to suppress displacement for focusing:

$$(\beta t + 1/\beta t)^{-2} < 0.16 \qquad (3)$$

where, βt is the imaging magnification of the lens group GF at the telephoto end.

Conditional equation (3) specifies the appropriate range for the use magnification of focusing lens group GF at the telephoto end. As noted above, in order to reduce the displacement ΔF of the lens group GF for focusing, it is necessary for the use magnification βF of the lens group GF to approach 0, or for 1/βF to approach 0.

When the upper limit in conditional equation (3) is exceeded, the displacement of the lens group GF becomes too large for focusing, making it necessary to have a large space in front of and in back of the lens group GF to allow focusing movement. As a result, the lens system becomes bulky.

In order to make the displacement during focusing even smaller, it is desirable for the upper limit in conditional equation (3) to be set to 0.12.

In the present invention, it is possible to correct for fluctuations in the image position caused by camera shaking by causing an appropriate shift in the image through the displacement of the shift lens sub-group L42 in a direction substantially perpendicular to the optical axis. However, it is also possible to apply the zoom lens of the present invention as a shift lens that causes movement of the photography range.

Figure 2:
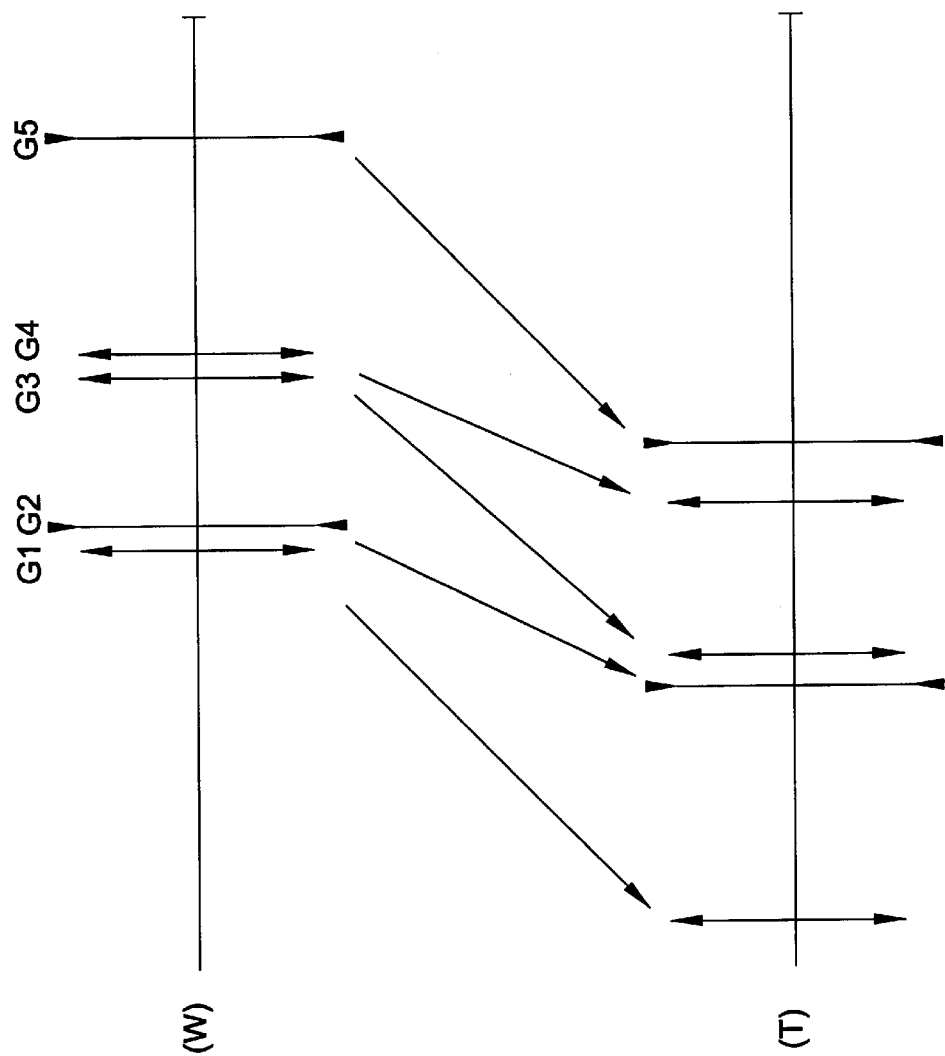
FIG. 2 is a schematic diagram showing the movement of each lens group in a zoom lens incorporating the image shifting lens group of this invention.

FIG. 2 shows the distribution of refractive powers in a zoom lens according to the preferred embodiments of the present invention, and shows the condition of movement of each lens group for zooming from the wide-angle end (W) to the telephoto end (T).

As shown in FIG. 2, the zoom lens according to the preferred embodiments of the present invention is composed, in order from the side toward the object, of a first lens group G1 having a positive refractive power, a second lens group G2 having a negative refractive power, a third lens group G3 having a positive refractive power, a fourth lens group G4 having a positive refractive power, and a fifth lens group G5 having a negative refractive power. For zooming from the wide angle end to the telephoto end, each lens group moves toward the object in such a way that the distance between first lens group G1 and second lens group G2 increases, the distance between second lens group G2 and third lens group G3 decreases, the distance between third lens group G3 and fourth lens group G4 increases, and the distance between fourth lens group G4 and fifth lens group G5 decreases.

Figure 3:
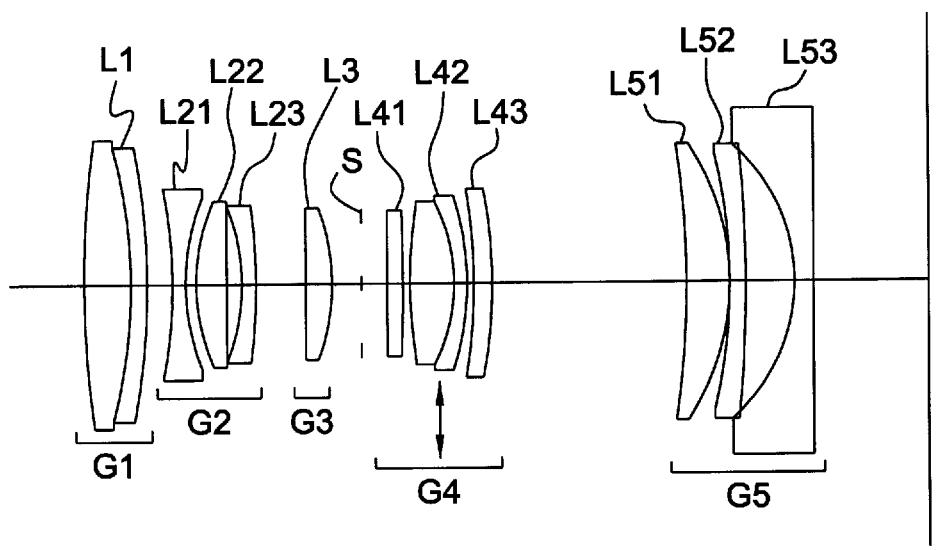
FIG. 3 is a schematic diagram showing the lens configuration of a first zoom lens embodiment incorporating the image shifting lens group of this invention.

FIG. 3 shows the lens composition of a zoom lens according to a first embodiment of the present invention.

The zoom lens of FIG. 3 is composed, in order from the object side, of a first lens group G1 consist of a cemented positive lens L1 having a biconvex lens and a negative meniscus lens with the concave surface facing to the object side; a second lens group G2 comprised of a biconcave lens L21, a biconvex lens L22 and a negative meniscus lens L23 with the concave surface facing the side toward the object; a third lens group G3 comprised of a positive meniscus lens L3 with the concave surface facing the side toward the object; a fourth lens group G4 comprised of a negative meniscus lens L41 with the convex surface facing to the object side, a compound positive lens L42 having a biconvex lens and a negative meniscus lens with the concave surface facing the side toward the object, and a positive meniscus lens L43 with the concave surface facing the side toward the object; and a fifth lens group G5 comprised of a positive meniscus lens L51 with the concave surface facing the side toward the object, a negative meniscus lens L52 with the concave surface facing to the object side, and a biconcave lens L53.

An aperture stop S is arranged between the third lens group G3 and the fourth lens group G4. The aperture stop S moves integrally with the fourth lens group G4 for zooming from the wide-angle end to the telephoto end.

FIG. 3 shows the positional relationship among the various lens groups at the wide-angle end. The lens groups move along the optical axis on the zooming locus indicated by the arrows in FIG. 2 for zooming to the telephoto end.

Correction of fluctuations in the image position caused by camera shaking is effected by displacing the compound positive lens L42 in the fourth lens group G4 in a direction substantially perpendicular to the optical axis. The lens L42 may be driven by a conventional drive arrangement known in the art. Optionally, the drive arrangement may be driven on the basis of a detected amount of camera vibration.

Focusing on close-range objects is effected by causing the third lens group G3 to move toward the image side along the optical axis.

The values of the items of the first embodiment of the present invention are given in Table (1) below. In Tables (1)–(6), f is the focal length, F NO is the F number, 2w is the field angle and βf is the back focus. The surface number indicates the order of the lens surface from the object side, and the refractive indices indicate the values for d-lines (λ=587.6 nm).

The aspherical surfaces are expressed by the following formula (e) when the aspherical surfaces are described with y as the height in the direction perpendicular to the optical axis; S(y) as the displacement in the direction of the optical axis at height y; r as the standard radius of curvature, i.e., the radius of curvature at the apex of the aspherical surface; k as the conical coefficient; and Cn as the n-dimensional aspherical surface coefficient.

$$S(y)=(r/k)/[1-(1-k^*y^2/r^2)^{1/2}]+C_2{}^*y^2+C_4{}^*y^4+C_6{}^*y^6+C_8{}^*y^8+C_{10}{}^*y^{10}+\ldots \quad (e)$$

The aspherical surfaces in Tables (1)–(6) are marked with the symbol * to the right of the surface number.

TABLE 1 f = 38.81--75.31--146.92 mm
F NO = 3.96--6.38--9.70
2w = 58.12--30.96--16.26°

| Surface Number | Radius of Curvature | Intersurface Distance | Abbe Number | Refractive Index |
|---|---|---|---|---|
| 1 | 76.2241 | 4.019 | 69.98 | 1.51860 |
| 2 | −47.4746 | 1.381 | 23.01 | 1.86074 |
| 3 | −76.6896 | (d3-variable) | | |
| 4 | −53.5482 | 1.130 | 45.37 | 1.79668 |
| 5 | 19.1680 | 0.880 | | |
| 6 | 16.8235 | 2.763 | 25.80 | 1.78472 |
| 7 | −509.2328 | 1.005 | | |
| 8 | −18.6135 | 1.130 | 45.37 | 1.79668 |
| 9 | −86.4849 | (d9 = variable) | | |
| 10 | −556.1586 | 2.135 | 69.98 | 1.51860 |
| 11 | −19.2038 | (d11 = variable) | | |
| 12 | ∞ | 2.260 | (aperture stop) | |
| 13* | 881.8165 | 1.256 | 30.24 | 1.58518 |
| 14 | 138.4036 | 0.628 | | |
| 15 | 30.5374 | 3.767 | 70.41 | 1.48749 |
| 16 | −13.9471 | 1.256 | 23.01 | 1.86074 |
| 17 | −22.5167 | 0.628 | | |
| 18* | −46.0998 | 1.633 | 57.57 | 1.49108 |
| 19 | −33.9488 | (d19 = variable) | | |
| 20 | −81.3711 | 3.391 | 25.35 | 1.80518 |
| 21 | −22.5435 | 0.251 | | |
| 22 | −45.3352 | 1.256 | 43.35 | 1.84042 |
| 23 | −152.1781 | 4.144 | | |
| 24 | −14.9528 | 1.507 | 49.45 | 1.77279 |
| 25 | 1174.6127 | (Bf) | | |

Aspherical surface data:

surface 13  k     $C_2$           $C_4$                  $C_6$
            1.0000  0.0000         $-3.7970 \times 10^{-5}$  $8.7280 \times 10^{-9}$
                    $C_8$                        $C_{10}$
                    $-3.8696 \times 10^{-9}$     $1.8028 \times 10^{-11}$ surface 18  k     $C_2$           $C_4$                  $C_6$
            1.0000  0.0000         $2.3231 \times 10^{-5}$   $-1.4367 \times 10^{-7}$
                    $C_8$                        $C_{10}$
                    $4.9064 \times 10^{-9}$      $-4.0009 \times 10^{-11}$ Variable space for zooming:

| f | 38.8139 | 75.3083 | 146.9210 |
|---|---|---|---|
| d3 | 2.1349 | 12.8945 | 26.2437 |
| d9 | 4.3709 | 2.6213 | 1.2558 |
| d11 | 2.5361 | 4.2857 | 5.6512 |
| d19 | 16.9404 | 8.9927 | 2.7628 |
| Bf | 9.3026 | 31.4511 | 65.2447 |

Displacement of lens component L42 during shifting of the image by 0.01 radian:

| f | 38.8139 | 75.3083 | 146.9210 |
|---|---|---|---|
| lens displacement | 0.3141 | 0.3780 | 0.4893 |
| image shift amount | 0.3881 | 9.7531 | 1.4692 |

Focusing displacement of third lens group G3 at photographic magnification of −1/40:

| f | 38.8139 | 75.3038 | 146.9210 |
|---|---|---|---|
| displacement | 0.8082 | 0.6045 | 0.5653 |

(Here, positive is taken to be the direction of movement from the object side to the image side)

Values corresponding to conditions:

$\phi B1 = 3.56 \times 10^{-3}$
$\phi B2 = 2.72 \times 10^{-2}$
$\phi B3 = -3.98 \times 10^{-3}$
$\beta t = -6.66$
(1) $(\phi B1 + \phi B3)/\phi B2 = -0.015$
(2) $D/|ra| = 0.212$
(3) $(\beta t + 1/\beta t)^{-2} = 0.022$ FIGS. 4(a) to 9(i) show aberrations in the first embodiment. FIGS. 4(a)–4(i) shows the aberrations in the infinite distance focus state at the wide-angle end (the shortest focal length state). Specifically, FIGS. 4(a)–4(e) show coma aberrations prior to image shift; FIG. 4(f) shows the spherical aberration; FIG. 4(g) shows the astigmatism; FIG. 4(h) shows distortion; and FIG. 4(i) shows magnification chromatic aberration. It is understood that the correspondence between the particular aberration and the particular figure of FIGS. 4(a)–4(i) is identical with respect to FIGS. 5(a)–9(i), as well as the corresponding figures of the other embodiments of the invention.

FIGS. 5(a)–5(i) show the aberrations in the infinite distance focus state at an intermediate focal length state. FIGS. 6(a)–6(i) show the aberrations in the infinite distance focus state at the telephoto end (the longest focal length state).

FIGS. 7(a)–7(i) show the aberrations at a photographic magnification of $-1/40$ at the wide-angle end. FIGS. 8(a)–8(i) show the aberrations at a photographic magnification of $-1/40$ at an intermediate focal length state. FIGS. 9(a)–9(i) show the aberrations at a photographic magnification of $-1/40$ at the telephoto end.

FIGS. 10(a) through 15(c) show coma aberrations in the first embodiment when the image is shifted by 0.01 rad (radian) with respect to the optical axis. FIGS. 10(a)–10(c) show the coma aberration in the infinite distance focusing state at the wide-angle end. FIGS. 11(a)–11(c) shows the coma aberration in the infinite distance focus state at an intermediate focal length state. FIGS. 12(a)–12(c) show the coma aberration in the infinite distance focus state at the telephoto end. In addition, FIGS. 13(a)–13(c) show the coma aberration at a photographic magnification of $-1/40$ at the wide-angle end. FIGS. 14(a)–14(c) show the coma aberration at a photographic magnification of $-1/40$ at an intermediate focal length state. FIGS. 15(a)–15(c) show the aberrations at a photographic magnification of $-1/40$ at the telephoto end.

In these figures, and in the subsequent figures relating to other embodiments, F NO indicates the F number, NA indicates the aperture number, Y indicates the image height, D indicates the d-line (lambda=587.6 nm), and G indicates the g-line (lambda=453.8 nm). In addition, in the drawings showing astigmatism, the solid line indicates the sagittal image plane S, while the dashed line indicates the meridional image plane M. In the drawings showing spherical aberration, the dashed line shows the sine condition.

FIGS. 10(a) through FIG. 15(c) show the coma aberration for Y=15.0, 0, and −15.0, when lens component L42 is move in the direction perpendicular to the optical axis.

As is clear from the above figures, the aberrations are corrected for in each focal length state and each photographic distance state, even during image shifting.

Figure 16:
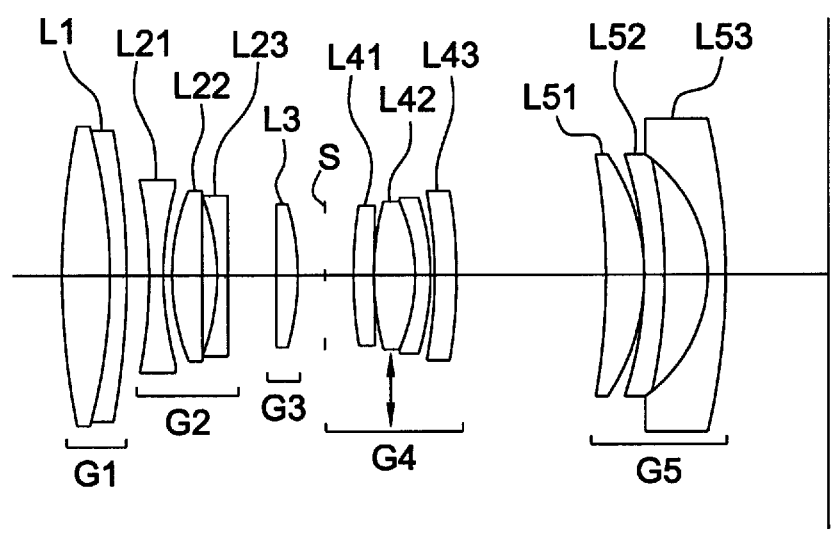
FIG. 16 illustrates the lens configuration of a second zoom lens embodiment incorporating the image shifting lens group of this invention.

FIG. 16 shows the lens composition of a zoom lens according to a second embodiment of the present invention.

The zoom lens of FIG. 16 is composed, in order from the side toward the object, of a first lens group G1 comprised of a compound positive lens L1 having a biconvex lens and a negative meniscus lens with the concave surface facing the side toward the object; a second lens group G2 comprised of a biconcave lens L21, a biconvex lens L22 and a biconcave lens L23; a third lens group G3 comprised of a positive meniscus lens L3 with the concave surface facing the side toward the object; a fourth lens group G4 comprised of a negative meniscus lens L41 with the convex surface facing the side toward the object, a compound positive lens L42 having a biconvex lens and a negative meniscus lens with the concave surface facing the side toward the subject, and a positive meniscus lens L43 with the concave surface facing the side toward the object; and a fifth lens group G5 comprised of a positive meniscus lens L51 with the concave surface facing the side toward the object, a negative meniscus lens L52 with the concave surface facing the side toward the object, and a negative meniscus lens L53 with the concave surface facing the side toward the object.

As in the first embodiment, the aperture stop S is positioned between the third lens group G3 and the fourth lens group G4, and moves integrally with the fourth lens group G4 for zooming from the wide-angle end to the telephoto end. The positional relationship among the various lens groups is shown at the wide-angle setting. Correction of fluctuations in the image position is effected by displacing the compound positive lens L42 in a direction substantially perpendicular to the optical axis. Focusing is effected by moving the third lens group G3 along the optical axis.

The values of the items of the second embodiment of the present invention are given in Table (2) below.

TABLE 2

$f = 38.81$--$75.31$--$146.92$ mm
$F\ NO = 3.96$--$6.38$--$9.70$
$2w = 58.12$--$30.96$--$16.26°$

| Surface Number | Radius of Curvature | Intersurface Distance | Abbe Number | Refractive Index |
|---|---|---|---|---|
| 1 | 63.1212 | 4.270 | 69.98 | 1.51860 |
| 2 | −46.8523 | 1.381 | 23.01 | 1.86074 |
| 3 | −76.4097 | (d3-variable) | | |
| 4 | −37.0295 | 1.130 | 45.37 | 1.79668 |
| 5 | 24.7002 | 0.880 | | |
| 6 | 19.3306 | 2.888 | 25.80 | 1.78472 |
| 7 | −122.8160 | 0.927 | | |
| 8 | −22.3702 | 1.130 | 45.37 | 1.79668 |
| 9 | 5400.1057 | (d9 = variable) | | |
| 10 | −1110.1994 | 1.884 | 69.98 | 1.51860 |
| 11 | −21.40936 | (d11 = variable) | | |
| 12 | ∞ | 2.512 | aperture stop | |
| 13* | 35.9674 | 1.884 | 58.90 | 1.51823 |
| 14 | 125.5814 | 0.126 | | |
| 15 | 29.3767 | 3.767 | 69.98 | 1.51860 |
| 16 | −13.8166 | 1.256 | 25.35 | 1.80518 |
| 17 | −24.3599 | 0.377 | | |
| 18* | −34.7066 | 1.884 | 25.35 | 1.80518 |
| 19 | −51.3329 | (d19 = variable) | | |
| 20 | −55.9076 | 3.265 | 25.35 | 1.80518 |
| 21 | −17.5684 | 0.166 | | |
| 22 | −26.1538 | 1.256 | 43.35 | 1.84042 |
| 23 | −83.4784 | 4.229 | | |
| 24 | −12.3760 | 1.507 | 49.45 | 1.77279 |
| 25 | −81.5024 | (Bf) | | |

Aspherical surface data:

| surface | k | $C_2$ | $C_4$ | $C_6$ |
|---|---|---|---|---|
| 13 | 1.0000 | 0.0000 | $-3.1755 \times 10^{-6}$ | $2.9219 \times 10^{-8}$ |
| | | $C_8$ | $C_{10}$ | |
| | | $-8.2462 \times 10^{-10}$ | $-2.1634 \times 10^{-11}$ | |

Variable space for zooming:

| f | 38.8046 | 84.7678 | 146.9311 |
|---|---|---|---|
| d3 | 2.1349 | 17.6333 | 24.5778 |
| d9 | 4.3337 | 2.8045 | 1.2553 |
| d11 | 2.5733 | 4.1025 | 5.6517 |
| d19 | 13.6225 | 5.1508 | 1.0735 |
| Bf | 9.4187 | 33.4370 | 62.0188 |

Displacement of lens component L42 during shifting of the image by 0.01 rad:

| f | 38.8046 | 84.7678 | 146.9311 |
|---|---|---|---|
| lens displacement | 0.3048 | 0.4092 | 0.4882 |
| image shift amount | 0.3881 | 0.7531 | 1.4692 |

TABLE 2-continued

Focusing displacement of third lens
group G3 at photographic magnification of −1/30:

| f | 38.8139 | 75.3083 | 146.9210 |
|---|---|---|---|
| displacement | 1.1121 | 1.0120 | 0.8789 |

(Here, positive is taken to be the direction of movement from
the object side to the image side)

Values corresponding to conditions:

$\phi B1 = 1.04 \times 10^{-2}$
$\phi B2 = 2.95 \times 10^{-2}$
$\phi B3 = -7.13 \times 10^{-3}$
$\beta t = -11.386$
(1) $(\phi B1 + \phi B3)/\phi B2 = 0.111$
(2) $D/|ra| = 0.286$
(3) $(\beta t + 1/\beta t)^{-2} = 0.008$ FIGS. 17(a) to 22(c) are drawings of aberrations in the second embodiment. FIGS. 17(a)–17(i) are drawings of the aberrations in the infinite distance focus state at the wide-angle end, FIGS. 18(a)–18(i) are drawings of the aberrations in the infinite distance focus state at an intermediate focal length state, and FIGS. 19(a)–19(i) are drawings of the aberrations in the infinite distance focus state at the telephoto end.

FIGS. 20(a)–20(i) show the aberrations at a photographic magnification of −1/30 at the wide-angle end, FIGS. 21(a)–21(i) show the aberrations at a photographic magnification of −1/30 at an intermediate focal length state, and FIGS. 22(a)–22(i) show the aberrations at a photographic magnification of −1/30 at the telephoto end.

FIGS. 23(a) through 28(c) show the coma aberrations in the second embodiment when the image is caused to shift by 0.01 rad (radian) with respect to the optical axis. FIGS. 23(a)–23(c) shows the coma aberration in the infinite distance focusing state at the wide-angle end. FIGS. 24(a)–24(c) show the coma aberration in the infinite distance focus state at an intermediate focal length state; and FIGS. 25(a)–25(c) show the coma aberration in the infinite distance focus state at the telephoto end. FIGS. 26(a)–26(c) show the coma aberration at a photographic magnification of −1/30 at the wide-angle end; FIGS. 27(a)–27(c) show the coma aberration at a photographic magnification of −1/30 at an intermediate focal length state; and FIGS. 28(a)–28(c) show the aberrations at a photographic magnification of −1/30 at the telephoto end.

FIG. 23(a) through FIG. 28(c) show the coma aberration for Y=15.0, 0, −15.0 when lens component L42 is shifted perpendicularly to the optical axis.

As clearly shown in the figures, the aberrations are corrected in each focal length state and each photography distance state, even during image shifting.

Figure 29:
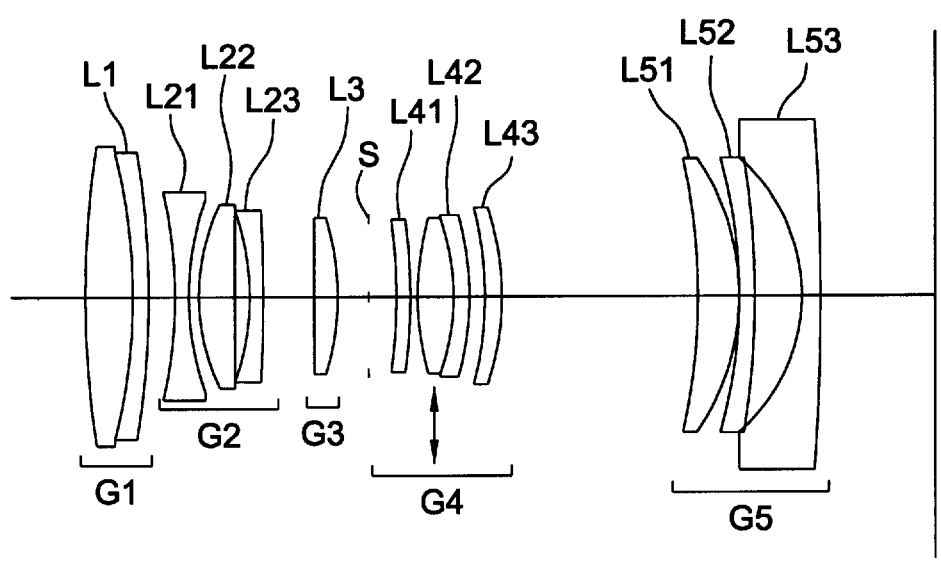
FIG. 29 illustrates the lens configuration of a third zoom lens embodiment incorporating the image shifting lens group of this invention.

FIG. 29 shows the lens composition of a zoom lens according to a third embodiment of the present invention.

The zoom lens of FIG. 29 is composed, in order from the side toward the object, of a first lens group G1 comprised of a compound positive lens L1 having a biconvex lens and a negative meniscus lens with the concave surface facing the side toward the object; a second lens group G2 comprised of a biconcave lens L21, a biconvex lens L22 and a negative meniscus lens L23 with the concave surface facing the side toward the object; a third lens group G3 comprised of a positive meniscus lens L3 with the concave surface facing the side toward the object; a fourth lens group G4 comprised of a negative meniscus lens L41 with the convex surface facing the side toward the object, a compound positive lens L42 having a biconvex lens and a negative meniscus lens with the concave surface facing the side toward the object, and a positive meniscus lens L43 with the concave surface facing the side toward the object; and a fifth lens group G5 comprised of a positive meniscus lens L51 with the concave surface facing the side toward the object, a negative meniscus lens L52 with the concave surface facing the side toward the object, and negative meniscus lens L53 with the concave surface facing the side toward the object. The operation of the aperture stop S, focusing, and image fluctuation correction is identical to the prior embodiments.

The values of the items of the third embodiment of the present invention are given in Table (3) below.

TABLE 3 f = 38.80--75.35--146.93 mm
F NO = 4.00--6.36--9.70
2w = 58.70--30.92--16.270

| Surface Number | Radius of Curvature | Intersurface Distance | Abbe Number | Refractive Index |
|---|---|---|---|---|
| 1 | 73.1332 | 4.019 | 69.98 | 1.51860 |
| 2 | −46.6612 | 1.381 | 23.01 | 1.86074 |
| 3 | −76.0467 | (d3-variable) | | |
| 4 | −42.2187 | 1.130 | 45.37 | 1.79668 |
| 5 | 21.9169 | 0.880 | | |
| 6 | 18.4144 | 3.140 | 25.80 | 1.78472 |
| 7 | −163.2882 | 1.130 | | |
| 8 | −19.9737 | 1.130 | 45.37 | 1.79668 |
| 9 | −130.7137 | (d9 = variable) | | |
| 10 | −382.1379 | 2.135 | 69.98 | 1.51860 |
| 11 | −18.9181 | (d11 = variable) | | |
| 12 | ∞ | 2.260 | (aperture stop) | |
| 13* | −47.6819 | 1.256 | 30.24 | 1.58518 |
| 14 | −62.7907 | 0.628 | | |
| 15 | 25.6916 | 3.140 | 70.41 | 1.48749 |
| 16 | −15.6352 | 1.256 | 23.01 | 1.86074 |
| 17 | −26.6752 | 1.507 | | |
| 18 | −24.2170 | 1.507 | 57.57 | 1.49108 |
| 19 | −20.6574 | (d19 = variable) | | |
| 20 | −50.1110 | 3.265 | 25.35 | 1.80518 |
| 21 | −19.9206 | 0.251 | | |
| 22 | −37.0495 | 1.256 | 43.35 | 1.84042 |
| 23 | −76.7513 | 3.893 | | |
| 24 | −14.3845 | 1.507 | 49.45 | 1.77279 |
| 25 | −460.6413 | (Bf) | | |

Aspherical surface data:

surface 13  k      $C_2$      $C_4$              $C_6$
            1.0000 0.0000   $-2.0952 \times 10^5$  $-2.2066 \times 10^{-7}$
                   $C_8$          $C_{10}$
                   $3.5334 \times 10^{-9}$  $-5.2491 \times 10^{-11}$ Variable space for zooming:

| f | 38.8048 | 75.3492 | 146.9313 |
|---|---|---|---|
| d3 | 2.1349 | 12.7708 | 25.6207 |
| d9 | 4.3329 | 2.6219 | 1.2558 |
| d11 | 2.5741 | 4.6251 | 5.6512 |
| d19 | 16.5467 | 9.0592 | 2.5116 |
| Bf | 9.4386 | 30.9864 | 65.9288 |

Displacement of lens component L42
during shifting of the image by 0.01 radian:

| f | 38.8046 | 75.3492 | 146.9313 |
|---|---|---|---|
| lens displacement | 0.3144 | 0.3846 | 0.4938 |
| image shift amount | 0.3881 | 0.7534 | 1.4691 |

Focusing displacement of third lens
group G3 at photographic magnification of −1/30:

| f | 38.8048 | 75.3492 | 146.9313 |
|---|---|---|---|
| displacement | 1.1122 | 0.8498 | 0.8125 |

(Here, positive is taken to be the direction of movement from
the object side to the image side)

TABLE 3-continued

Values corresponding to conditions:

φB1 = 2.86 × $10^{-3}$
φB2 = 2.71 × $10^{-2}$
φB3 = 3.98 × $10^{-3}$
βt = −5.6387
(1) (φB1 + φB3)/φB2 = 0.041
(2) D/|ra| = 0.410
(3) (βt + 1/βt)$^{-2}$ = 0.030

FIGS. 30(a) to 41 are drawings of aberrations in the third embodiment. FIGS. 30(a)–30(g) show the aberrations in the infinite distance focus state at the wide-angle end; FIGS. 31(a)–31(g) show the aberrations in the infinite distance focus state at an intermediate focal length state, and FIGS. 32(a)–32(g) show the aberrations in the infinite distance focus state at the telephoto end.

FIGS. 33(a)–33(g) show the aberrations at a photographic magnification of −1/30 at the wide-angle end, FIGS. 34(a)–34(g) show the aberrations at a photographic magnification of −1/30 at an intermediate focal length state, and FIGS. 35(a)–35(g) show the aberrations at a photographic magnification of −1/30 at the telephoto end.

Figure 36A:
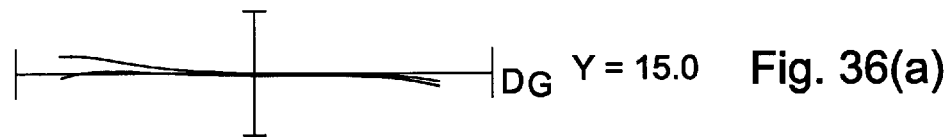
FIGS. 36(a)–36(c) show the coma aberrations during image shifting in the infinite distance focus state at the wide-angle end in the third embodiment.
Figure 36B:
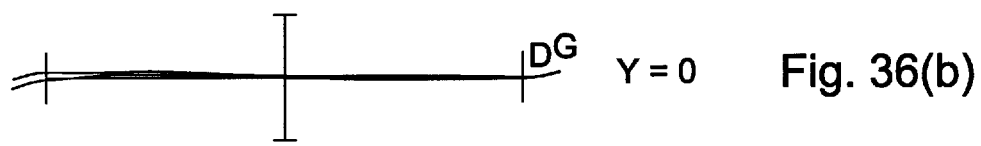
Figure 36C:
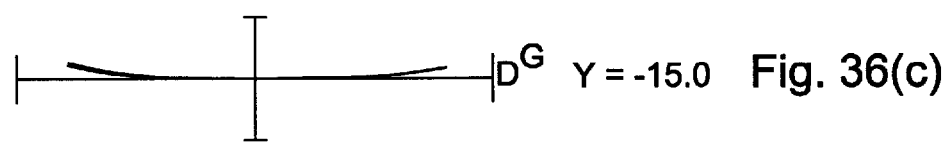
Figure 37A:
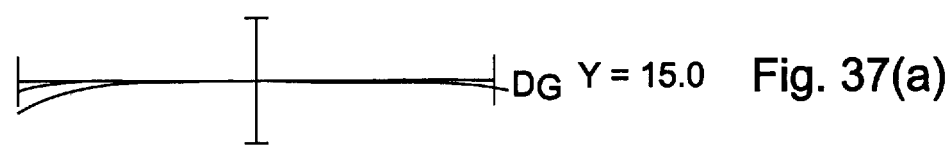
FIGS. 37(a)–37(c) show the coma aberrations during image shifting in the infinite distance focus state at an intermediate focal length in the third embodiment.
Figure 37B:
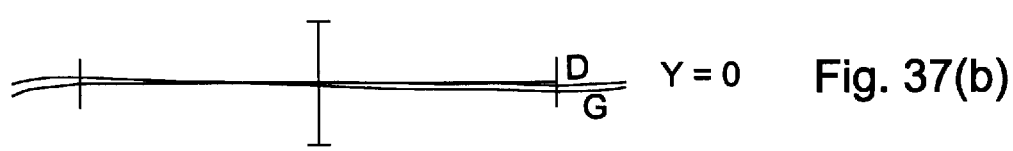
Figure 37C:

FIGS. 36(a) through 41(c) show coma aberrations in the third embodiment when the image is caused to shift by 0.01 rad (radian) with respect to the optical axis. FIGS. 36(a)–36(c) show coma aberrations in the infinite distance focusing state at the wide-angle end, FIGS. 37(a)–37(c) show coma aberrations in the infinite distance focus state at an intermediate focal length state, and FIGS. 38(a)38(c) show coma aberrations in the infinite distance focus state at the telephoto end. FIGS. 39(a)14 39(c) show the coma aberrations at a photographic magnification of −1/30 at the wide-angle end; FIGS. 40(a)–40(c) show the coma aberrations at a photographic magnification of −1/30 at an intermediate focal length state; and FIGS. 41(a)–41(c) show the aberrations at a photographic magnification of 1/30 at the telephoto end.

FIGS. 36(a)–41(c) show the coma aberration for Y=15.0, 0, −15.0 when lens component L42 is moved perpendicularly to the optical axis.

As is clear from these figures, the aberrations are corrected well in each focal length state and each photography distance state, even during image shifting.

In the fourth through sixth embodiments of the invention, at least one plastic lens is provided in each of the lens sub-groups L41 and L43.

Plastic lenses have the following advantages. Since a plastic lens may be made by molding, it is possible to manufacture a plastic lens with a complicated boundary shape. Moreover, positionally fixing the lens by bonding is possible. Additionally, weight of the lens system is reduced. Therefore, by providing each of the lens sub-groups L41 and L43 with at least one plastic lens, and a high level of variable power can be achieved without complicating the structure of the lens barrel.

As in the previous embodiments of the invention, spherical surface aberrations produced by the lens subgroup L42 and the sine condition need to be corrected effectively in order to control the deterioration of image quality caused by image shift. For this purpose, the lens sub-group L42 should comprise at least one positive lens and one negative lens. Similarly, warping of the image caused by image shift is controlled effectively by choosing a positive lens element and a negative lens element with appropriate indexes of refraction and by making the Petzval sum of the lens sub-group L42 alone the appropriate value. Moreover, by assigning appropriate Abbe constants to both the positive lens and the negative lens, correction of color aberration by the lens sub-group L42 is realized.

In the fourth through sixth embodiments, the lens sub-group L41 and the lens sub-group L43 have at least one plastic lens satisfying formula (4) below:

$$-1<(\phi P1+\phi P3)/(\phi P1-\phi P3)<1 \tag{4}$$

where, φP1 is the refraction power of the plastic lens in the lens sub-group L41 and φP3 is the refraction power of the plastic lens in the lens sub-group L43.

Formula (4) regulates the refraction power of the plastic lenses contained in the lens group G4 and is designed to control movement of the image surface position caused by temperature changes.

With plastic lenses, focal distances may change substantially with changes in temperature. This is because the plastics used in lenses generally undergo a large change in the index of refraction when the temperature varies.

It is desirable to use more than one plastic lens in the lens group G4 and to choose the signs of the refraction powers of the plastic lens contained in the lens sub-group L41 and that of the plastic lens contained in the lens sub-group L43 to be opposite from each other. Thus, changes in focal distance for the entire lens system caused by temperature changes are controlled by weakening the combined refraction power. If the combined refraction power of the plastic lenses contained in the lens subgroups L41 and L43 is weak, variation of the image surface due to temperature change is controlled even if the signs of the refraction power are the same. However, the ratio of aberration correction performed by each plastic lens drops, thus preventing achievement of control of aberration changes during variation of power in the lens group G4.

If the range specified by the upper and lower limits of formula (1) is violated, the combined refraction power of the plastic lenses contained in the lens subgroups L41 and L43 is no longer able to effectively control variation of the image surface position due to temperature change.

In order to better prevent deterioration in image quality during image shift, formula (5) below should be satisfied.

$$0.5<(|\phi P1|+|\phi P3|)/\phi t<3 \tag{5}$$

Here, φt is the refraction power of the entire lens system at the telephoto end. Formula (5) specifies the appropriate range for the ratio of the sum of the magnitude of the refraction power of the plastic lenses contained in the lens sub-groups L41 and L43 to the refraction power of the entire lens system at the telephoto end.

If the ratio falls short of the lower limit of formula (5), the combined refraction power of the plastic lenses is weak. As a result, the ratio of aberration correction performed by the plastic lenses decreases, thus preventing control of aberration changes during zooming.

Plastic materials also change shape change with changes in temperature. Therefore, if the curvature of the lens surface decreases as the refraction power of the plastic lens increases, the aberration variation associated with the shape change becomes large.

If the upper limit of formula (5) is exceeded, the combined refraction power of the plastic lenses in the lens sub-groups L41 and L43 is large. Consequently, the ratio of aberration correction performed by the plastic lenses becomes too high. As a result, decreases in performance caused by temperature change cannot be prevented, although control of aberration changes during variation of power in the lens group G4 and prevention of deterioration of image performance during image shift are achieved at the same time.

As in the previously described embodiments; an aperture stop S is provided either adjacent to, or in, lens group G4, in order to minimize the height difference between off-axis and on-axis light rays. Likewise, in order to obtain even letter imaging performance, at least one of the plastic lenses contained in the lens groups L41 and L43 has a concave surface facing the aperture stop side.

The shape of the plastic lenses used in the lens sub-groups L41 and L43 should be a meniscus shape in order to prevent a decrease in performance caused by shape changes due to temperature changes. If the shapes of the plastic lenses used in the lens sub-group L41 and the lens sub-group L43 are both concave or both convex, then the signs of the refraction power of the lens surfaces on both sides are the same. Thus, the shape changes of the lens surfaces on both sides due to a temperature change occur in such a manner that when the refraction power of one lens surface increases, then that of the other lens also increases, i.e. the change occurs in directions that augment each other. Thus, decrease in performance due to temperature changes is magnified. On the other hand, if the shapes of the plastic lenses used in the lens subgroup L41 and the lens sub-group L43 are meniscus shapes, then the signs of the refraction power of the lens surfaces on both sides are opposite. Thus, the shape changes occur in a direction weakening the refraction powers of the lens surface of each other. Thus, deterioration in imaging performance caused by temperature changes is prevented.

Figure 42:
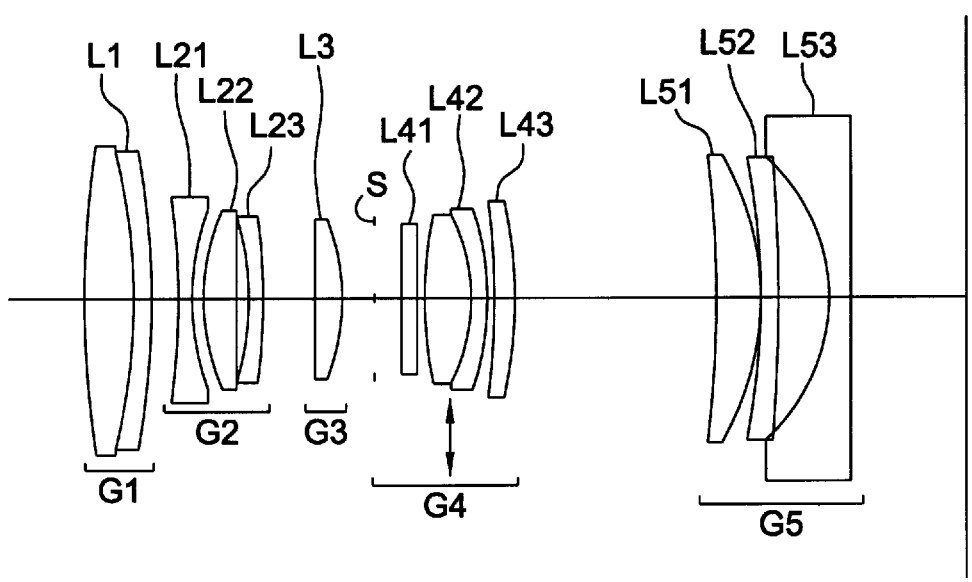
FIG. 42 illustrates a lens configuration of a fourth zoom lens embodiment incorporating the image shifting lens group of this invention.

FIG. 42 shows the lens composition of a zoom lens according to a fourth embodiment of the present invention.

The zoom lens of FIG. 42 is composed, in order from the side toward the object, of a first lens group G1 comprised of a compound positive lens L1 having a biconvex lens and a negative meniscus lens with the concave surface facing the side toward the object; a second lens group G2 comprised of a biconcave lens L21, a biconvex lens L22 and a negative meniscus lens L23 with the concave surface facing the side toward the object; a third lens group G3 comprised of a positive meniscus lens L3 with the concave surface facing the side toward the object; a fourth lens group G4 comprised of a negative meniscus plastic lens L41 with the convex surface facing the side toward the object, a compound positive lens L42 having a biconvex lens and a negative meniscus lens with the concave surface facing the side toward the object, and a positive meniscus plastic lens L43 with the concave surface facing the side toward the object; and a fifth lens group G5 comprised of a positive meniscus lens L51 with the concave surface facing the side toward the object, a negative meniscus lens L52 with the concave surface facing the side toward the object, and a biconcave lens L53. Aperture stop S is positioned between third lens group G3 and fourth lens group G4, and moves integrally with fourth lens group G4 for zooming from the wide-angle end to the telephoto end.

Correction of fluctuations in the image position and focusing are performed as in the previously described embodiments.

The values of the items of the fourth embodiment of the present invention are given in Table (4) below.

TABLE 4 f = 38.81--75.31--146.92 mm
F NO = 3.96--6.38--9.70
2w = 58.12--30.96--16.26°

| Surface Number | Radius of Curvature | Intersurface Distance | Abbe Number | Refractive Index |
|---|---|---|---|---|
| 1 | 76.2241 | 4.019 | 69.98 | 1.51860 |
| 2 | −47.4746 | 1.381 | 23.01 | 1.86074 |
| 3 | −76.6896 | (d3-variable) | | |
| 4 | −53.5482 | 1.130 | 45.37 | 1.79668 |
| 5 | 19.1680 | 0.880 | | |
| 6 | 16.8235 | 2.763 | 25.80 | 1.78472 |
| 7 | −509.2328 | 1.005 | | |
| 8 | −18.6135 | 1.130 | 45.37 | 1.79668 |
| 9 | −86.4849 | (d9 = variable) | | |
| 10 | −556.1586 | 2.135 | 69.98 | 1.51860 |
| 11 | −19.2038 | (d11 = variable) | | |
| 12 | ∞ | 2.260 | (aperture stop) | |
| 13* | 881.8165 | 1.256 | 30.24 | 1.58518 (poly-carbonate) |
| 14 | 138.4036 | 0.628 | | |
| 15 | 30.5374 | 3.767 | 70.41 | 1.48749 |
| 16 | −13.9471 | 1.256 | 23.01 | 1.86074 |
| 17 | −22.5167 | 0.628 | | |
| 18* | −46.0998 | 1.633 | 57.57 | 1.49108 (acryl) |
| 19 | −33.9488 | (d19 = variable) | | |
| 20 | −81.3711 | 3.391 | 25.35 | 1.80518 |
| 21 | −22.5435 | 0.251 | | |
| 22 | −45.3352 | 1.256 | 43.35 | 1.84042 |
| 23 | −152.1781 | 4.144 | | |
| 24 | −14.9528 | 1.507 | 49.45 | 1.77279 |
| 25 | 1174.6127 | (Bf) | | |

Aspherical surface data:

surface 13  k        $C_2$              $C_4$                 $C_6$
            1.0000   0.0000             −3.7970 × $10^{-5}$   8.7280 × $10^{-9}$
                     $C_8$              $C_{10}$
                     −3.8696 × $10^{-9}$  1.8028 × $10^{-11}$ surface 18  k        $C_2$              $C_4$                 $C_6$
            1.0000   0.0000             2.3231 × $10^{-5}$    −1.4367 × $10^{-7}$
                     $C_8$              $C_{10}$
                     4.9064 × $10^{-9}$  −4.0009 × $10^{-11}$ Variable space for zooming:

| f   | 38.8048 | 75.3492 | 146.9313 |
|---|---|---|---|
| d3  | 2.1349  | 12.8945 | 26.2437  |
| d9  | 4.3709  | 2.6213  | 1.2558   |
| d11 | 2.5361  | 4.2857  | 5.6512   |
| d19 | 16.9404 | 8.9927  | 2.7628   |
| Bf  | 9.3026  | 31.4511 | 65.2447  |

Displacement of lens component L42 during shifting of the image by 0.01 radian:

| f | 38.8139 | 75.3083 | 146.9210 |
|---|---|---|---|
| lens displacement | 0.3141 | 0.3780 | 0.4893 |
| image shift amount | 0.3881 | 0.7531 | 1.4692 |

Focusing displacement of third lens group G3 at photographic magnification of −1/40:

| f | 38.8139 | 75.3083 | 146.9210 |
|---|---|---|---|
| displacement | 0.8082 | 0.6045 | 0.5653 |

(Here, positive is taken to be the direction of movement from the object side to the image side)

Back focus variation amount when temperature is changed from −20° C. to 40° C.:

| f | 38.8139 | 75.3083 | 146.9210 |
|---|---|---|---|
| f variation amount | −0.0023 | −0.0041 | −0.0026 |
|  | ~0.0023 | ~0.0041 | ~0.0025 |
| Bf variation amount | −0.0003 | −0.0008 | −0.0042 |
|  | ~0.0003 | ~0.0008 | ~0.0042 |

TABLE 4-continued

Values corresponding to conditions:

$\phi P1 = -3.56 \times 10^{-3}$
$\phi P3 = 3.98 \times 10^{-3}$
(1) $(\phi P1 + \phi P3)/(\phi P1 - \phi P3) = -0.056$
(2) $(|\phi P1| + |\phi P3|)/\phi t = 1.108$ FIGS. 43(a)–48(8) show aberrations in the fourth embodiment. FIGS. 43(a)–43(i) show the aberrations in the infinite distance focus state at the wide-angle end (the shortest focal length state), FIGS. 44(a)–44(i) show the aberrations in the infinite distance focus state at an intermediate focal length state, and FIGS. 45(a)–45(i) show the aberrations in the infinite distance focus state at the telephoto end (the longest focal length state).

FIGS. 46(a)–46(i) show the aberrations at a photographic magnification of –1/40 at the wide-angle end, FIGS. 47(a)–47(i) show the aberrations at a photographic magnification of –1/40 at an intermediate focal length state, and FIGS. 48(a)–48(i) show the aberrations at a photographic magnification of –1/40 at the telephoto end.

FIGS. 49(a)–54(c) are drawings of coma aberrations in the fourth embodiment when the image is shifted by 0.01 rad (radian) with respect to the optical axis. FIGS. 49(a)–49(c) show the coma aberrations in the infinite distance focusing state at the wide-angle end, FIGS. 50(a)–50(c) show the coma aberrations in the infinite distance focus state at an intermediate focal length state, and FIGS. 51(a)–51(c) show the coma aberrations in the infinite distance focus state at the telephoto end.

FIGS. 52(a)–52(c) show the coma aberrations at a photographic magnification of –1/40 at the wide-angle end, FIGS. 53(a)–53(c) show the coma aberrations at a photographic magnification of –1/40 at an intermediate focal length state, and FIGS. 54(a)–54(c) show the aberrations at a photographic magnification of –1/40 at the telephoto end.

FIGS. 49(a) through FIG. 54(c), shows the coma aberration for Y=15.0, 0, –15.0 when lens component L42 is moved perpendicularly with respect to the optical axis.

As is clear from the drawings of aberrations, the aberrations are corrected in each focal length state and each photography distance state, even during image shifting.

Figure 55:
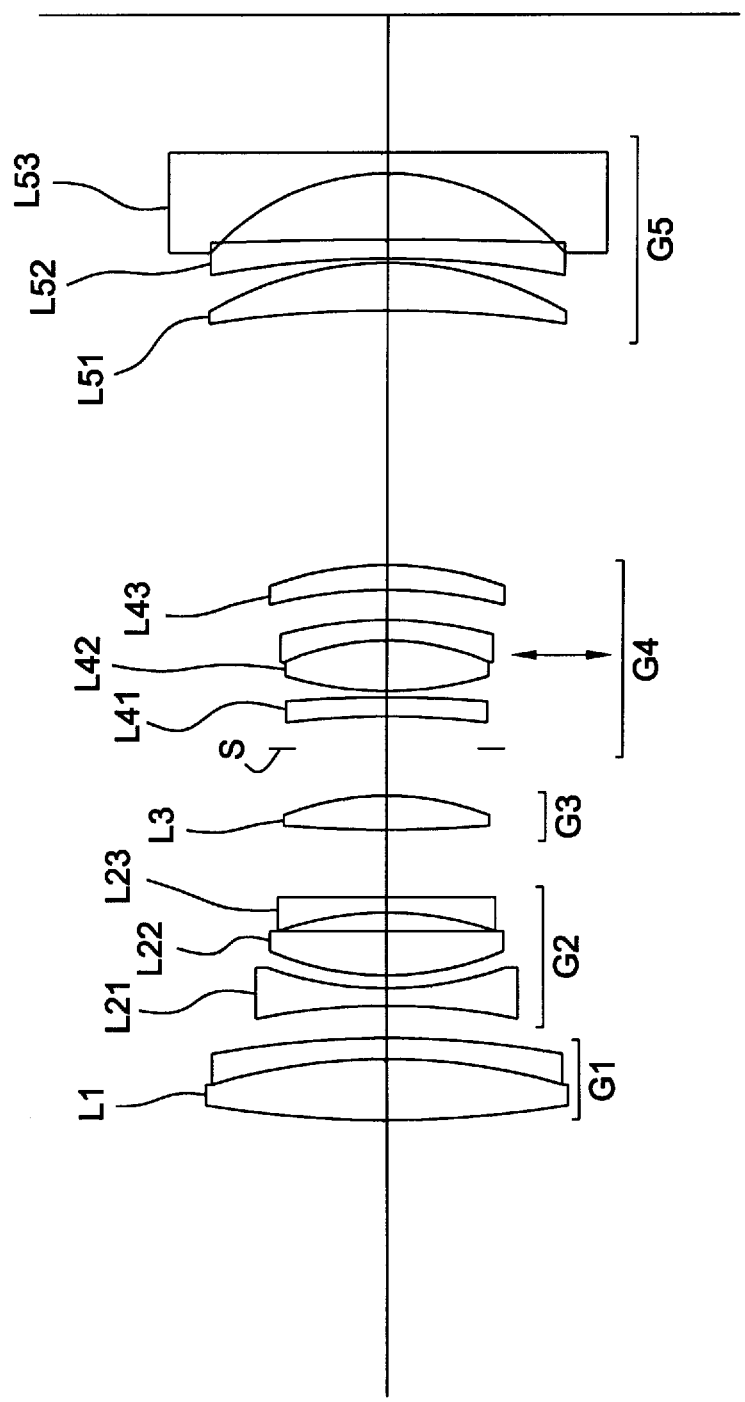
FIG. 55 illustrates a lens configuration of a fifth zoom lens embodiment incorporating the image shifting lens group of this invention.

FIG. 55 shows the lens composition of a zoom lens according to a fifth embodiment of the present invention.

The zoom lens of FIG. 55 is composed, in order from the side toward the object, of a first lens group G1 comprised of a compound positive lens L1 having a biconvex lens and a negative meniscus lens with the concave surface facing the side toward the object; a second lens group G2 comprised of a biconcave lens L21, a biconvex lens L22 and a biconcave lens L23; a third lens group G3 comprised of a positive meniscus lens L3 with the concave surface facing the side toward the object; a fourth lens group G4 comprised of a negative meniscus plastic lens L41 with the convex surface facing the side toward the object, a compound positive lens L42 having a biconvex lens and a negative meniscus lens with the concave surface facing the side toward the object, and a positive meniscus plastic lens L43 with the concave surface facing the side toward the object; and a fifth lens group G5 comprised of a positive meniscus lens L51 with the concave surface facing the side toward the object, a negative meniscus lens L52 with the concave surface facing the side toward the object, and a negative meniscus lens L53 with the concave surface facing the side toward the object. An aperture stop S is positioned between third lens group G3 and fourth lens group G4, and moves integrally with fourth lens group G4 for zooming from the wide-angle end to the telephoto end. Focusing and image fluctuation correction is as described in the prior embodiments.

The values of the items of the fifth embodiment of the present invention are given in Table (5) below.

TABLE 5 f = 38.79--75.01--153.22 mm
F NO = 3.90--6.23--10.00
2w = 58.70°--31.04°--15.64°

| Surface Number | Radius of Curvature | Intersurface Distance | Abbe Number | Refractive Index |
|---|---|---|---|---|
| 1 | 73.3723 | 4.019 | 70.41 | 1.48749 |
| 2 | –41.3728 | 1.381 | 23.01 | 1.86074 |
| 3 | –63.5060 | (d3-variable) | | |
| 4 | –40.8258 | 1.130 | 45.37 | 1.79668 |
| 5 | 21.8873 | 0.880 | | |
| 6 | 18.8014 | 3.140 | 25.80 | 1.78472 |
| 7 | –125.2349 | 1.005 | | |
| 8 | –20.9542 | 1.130 | 45.37 | 1.79668 |
| 9 | –221.6574 | (d9 = variable) | | |
| 10 | 437.8482 | 2.135 | 64.10 | 1.51860 |
| 11 | –20.1039 | (d11 = variable) | | |
| 12 | ∞ | 2.260 | (aperture stop) | |
| 13* | –44.4771 | 1.256 | 30.24 | 1.58518 (poly-carbonate) |
| 14 | –62.7167 | 0.377 | | |
| 15 | 28.0309 | 3.391 | 70.41 | 1.48749 |
| 16 | –14.9351 | 1.256 | 23.05 | 1.86074 |
| 17 | –24.7823 | 2.009 | | |
| 18 | –24.3656 | 1.633 | 57.57 | 1.49108 (acryl) |
| 19 | –20.8522 | (d19 = variable) | | |
| 20 | –62.9139 | 3.140 | 25.50 | 1.80518 |
| 21 | –22.4198 | 0.251 | | |
| 22 | –53.4113 | 1.256 | 45.37 | 1.79668 |
| 23 | –214.2800 | 4.270 | | |
| 24 | –15.0687 | 1.507 | 49.45 | 1.77279 |
| 25 | –827.9830 | (Bf) | | |

Aspherical surface data:

surface 13  k          $C_2$        $C_4$                  $C_6$
            1.000      0.0000       $-2.1495 \times 10^{-5}$   $-4.1308 \times 10^{-8}$
                                    $C_8$                  $C_{10}$
                                    $-1.6800 \times 10^{-9}$   $1.0232 \times 10^{-11}$ Variable space for zooming:

| f | 38.7940 | 75.0134 | 153.2222 |
|---|---|---|---|
| d3 | 2.1349 | 12.5510 | 24.9955 |
| d9 | 4.4061 | 2.4325 | 1.2558 |
| d11 | 3.1288 | 5.1024 | 6.2791 |
| d19 | 16.8012 | 8.9400 | 1.8774 |
| Bf | 9.0593 | 30.7210 | 70.1322 |

Displacement of lens component L42
during shifting of the image by 0.01 rad:

| f | 38.7941 | 75.0134 | 153.2222 |
|---|---|---|---|
| lens displacement | 0.3143 | 0.3817 | 0.4876 |
| image shift amount | 0.3879 | 0.7500 | 1.5324 |

Focusing displacement of third lens
group G3 at photographic magnification of –1/30:

| f | 38.7940 | 75.0134 | 153.2222 |
|---|---|---|---|
| displacement | 1.0418 | 0.7873 | 0.6856 |

(Here, positive is taken to be the direction of movement from the object side to the image side)

Back focus variation amount when
temperature is changed from –20° C. to 40° C.:

| f | 38.7940 | 75.1034 | 153.222 |
|---|---|---|---|
| f variation amount | –0.0024 | –0.0029 | –0.0211 |
| | –0.0024 | –0.0028 | –0.0210 |
| Bf variation amount | –0.0024 | –0.0060 | –0.0192 |
| | –0.0024 | –0.0059 | –0.0191 |

TABLE 5-continued

Values corresponding to conditions:

$\phi P1 = -3.73 \times 10^{-3}$
$\phi P3 = 3.92 \times 10^{-3}$
(1) $(\phi P1 + \phi P3)/(\phi P1 - \phi P3) = -0.025$
(2) $(|\phi P1| + |\phi P3|)/\phi t = 1.172$ FIGS. 56(a)–61(i) are drawings of aberrations in the fifth embodiment. FIGS. 56(a)–56(i) show the aberrations in the infinite distance focus state at the wide-angle end, FIGS. 57(a)–57(i) show the aberrations in the infinite distance focus state at an intermediate focal length state, and FIGS. 58(a)–58(i) show the aberrations in the infinite distance focus state at the telephoto end.

FIGS. 59(a)–59(i) show the aberrations at a photographic magnification of –1/30 at the wide-angle end, FIGS. 60(a)–60(i) show the aberrations at a photographic magnification of –1/30 at an intermediate focal length state, and FIGS. 61(a)–61(i) show the aberrations at a photographic magnification of –1/30 at the telephoto end.

Furthermore, FIGS. 62(a) through 67(c) are drawings of coma aberrations in the fifth embodiment when the image is caused to shift by 0.01 rad (radian) with respect to the optical axis. FIGS. 62(a)–62(c) show the coma aberration in the infinite distance focusing state at the wide-angle end, FIGS. 63(a)–63(c) show the coma aberrations in the infinite distance focus state at an intermediate focal length state, and FIGS. 64(a)–64(c) show the coma aberrations in the infinite distance focus state at the telephoto end.

In addition, FIGS. 65(a)–65(c) show the coma aberrations at a photographic magnification of –1/30 at the wide-angle end, FIGS. 66(a)–66(c) show the coma aberrations at a photographic magnification of –1/30 at an intermediate focal length state, and FIGS. 67(a)–67(c) show the aberrations at a photographic magnification of –1/30 at the telephoto end.

FIGS. 62(a)–67(c) shows the coma aberration for Y=15.0, 0, –15.0 when lens component L42 is move perpendicularly from the optical axis.

As is clear from the figures, the aberrations are corrected for in each focal length state and each photographic distance state, even during image shifting.

Figure 68:
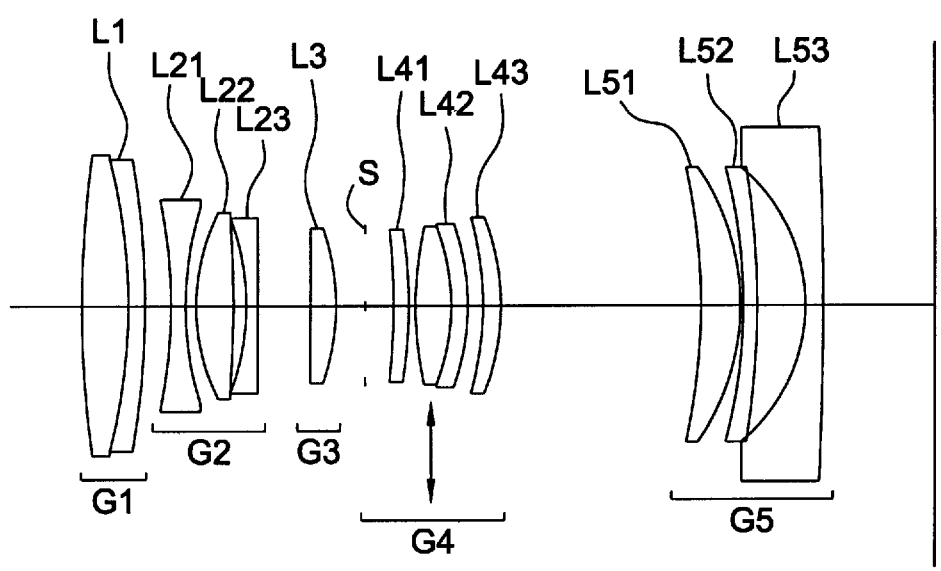
FIG. 68 illustrates a lens configuration of a sixth zoom lens embodiment incorporating the image shifting lens group of this invention.

FIG. 68 illustrates a lens composition of a zoom lens according to a sixth embodiment of the present invention.

The zoom lens of FIG. 68 is composed, in order from the side toward the object, of a first lens group G1 comprised of a compound positive lens L1 having a biconvex lens and a negative meniscus lens with the concave surface facing the side toward the object; a second lens group G2 comprised of a biconcave lens L21, a biconvex lens L22 and a negative meniscus lens L23 with the concave surface facing the side toward the object; a third lens group G3 comprised of a positive meniscus lens L3 with the concave surface facing the side toward the object; a fourth lens group G4 comprised of a negative meniscus plastic lens L41 with the convex surface facing the side toward the object, a compound positive lens L42 having a biconvex lens and a negative meniscus lens with the concave surface facing the side toward the object, and a positive meniscus plastic lens L43 with the concave surface facing the side toward the object; and a fifth lens group G5 comprised of a positive meniscus lens L51 with the concave surface facing the side toward the object, a negative meniscus lens L52 with the concave surface facing the side toward the object, and negative meniscus lens L53 with the concave surface facing the side toward the object. The aperture stop and focusing and image fluctuation correction operations are as described in the prior embodiments.

The values of the items of the sixth embodiment of the present invention are given in Table (6) below.

TABLE 6 f = 38.80--75.35--146.93 mm
F NO = 4.00--6.36--9.70
2w = 58.70--30.92--16.27°

| Surface Number | Radius of Curvature | Intersurface Distance | Abbe Number | Refractive Index |
|---|---|---|---|---|
| 1 | 73.1332 | 4.019 | 69.98 | 1.51860 |
| 2 | –46.6612 | 1.381 | 23.01 | 1.86074 |
| 3 | –75.0467 | (d3-variable) | | |
| 4 | –42.2187 | 1.130 | 45.37 | 1.79668 |
| 5 | 21.9169 | 0.880 | | |
| 6 | 18.1444 | 3.140 | 25.80 | 1.78472 |
| 7 | –163.2882 | 1.130 | | |
| 8 | –19.9737 | 1.130 | 45.37 | 1.79668 |
| 9 | –130.7137 | (d9 = variable) | | |
| 10 | –382.1379 | 2.135 | 69.98 | 1.51860 |
| 11 | –18.9181 | (d11 = variable) | | |
| 12 | ∞ | 2.260 | (aperture stop) | |
| 13* | –47.6819 | 1.256 | 30.24 | 1.58518 (polycarbonate) |
| 14 | –62.7906 | 0.628 | | |
| 15 | 25.6916 | 3.140 | 70.41 | 1.48749 |
| 16 | –15.6352 | 1.256 | 23.01 | 1.86074 |
| 17 | –26.6752 | 1.507 | | |
| 18 | –24.2170 | 1.507 | 57.57 | 1.49108 (acryl) |
| 19 | –20.8522 | (d19 = variable) | | |
| 20 | –50.1110 | 3.265 | 25.35 | 1.80518 |
| 21 | –19.9206 | 0.251 | | |
| 22 | –37.0495 | 1.256 | 43.35 | 1.84042 |
| 23 | –76.7513 | 3.893 | | |
| 24 | –14.3845 | 1.507 | 49.45 | 1.77279 |
| 25 | –460.6413 | (Bf) | | |

Aspherical surface data:

surface 13   k            $C_2$              $C_4$                   $C_6$
             1.000       0.0000           $-2.0952 \times 10^{-5}$   $-2.2066 \times 10^{-7}$
                          $C_8$              $C_{10}$
                         $3.5334 \times 10^{-9}$   $-5.2491 \times 10^{-11}$ Variable space for zooming:

| f | 38.8048 | 75.3492 | 146.9313 |
|---|---|---|---|
| d3 | 2.1349 | 12.7708 | 25.6207 |
| d9 | 4.3329 | 2.6219 | 1.2558 |
| d11 | 2.5741 | 4.6251 | 5.6512 |
| d19 | 16.5467 | 9.0592 | 2.5116 |
| Bf | 9.4386 | 30.9864 | 65.9288 |

Displacement of lens component L42
during shifting of the image by 0.01 radian:

| f | 38.8046 | 75.3492 | 146.9313 |
|---|---|---|---|
| lens displacement | 0.3144 | 0.3846 | 0.4938 |
| image shift amount | 0.3881 | 0.7534 | 1.4691 |

Focusing displacement of third lens
group G3 at photographic magnification of –1/30:

| f | 38.8048 | 75.3492 | 146.9313 |
|---|---|---|---|
| displacement | 1.1122 | 0.8498 | 0.8125 |

(Here, positive is taken to be the direction of movement from the object side to the image side)

Back focus variation amount when
temperature is changed from –20° C. to 40° C.:

| f | 38.8048 | 75.3492 | 146.9313 |
|---|---|---|---|
| f variation amount | –0.0057 | –0.0125 | –0.0207 |
| | ~0.0057 | ~0.0124 | ~0.0206 |
| Bf variation amount | –0.0013 | –0.0032 | –0.0036 |
| | –0.0013 | –0.0031 | –0.0035 |

TABLE 6-continued

Values corresponding to conditions:

φP1 = −2.86 × 10⁻³
φP3 = 3.98 × 10⁻³
(1) (φP1 + φP3)/(φP1 − φP3) = −0.164
(2) (|φP1| + |φP3|)/φt = 1.005

FIGS. 69(a)–80(c) are drawings of aberrations according to the sixth embodiment. FIGS. 69(a)–69(g) show the aberrations in the infinite distance focus state at the wide-angle end, FIGS. 70(a)–70(g) show the aberrations in the infinite distance focus state at an intermediate focal length state, and FIGS. 71(a)–71(g) show the aberrations in the infinite distance focus state at the telephoto end.

FIGS. 72(a)–72(g) show the aberrations at a photographic magnification of −1/30 at the wide-angle end, FIGS. 73(a)–73(g) show the aberrations at a photographic magnification of −1/30 at an intermediate focal length state, and FIGS. 74(a)–74(g) show the aberrations at a photographic magnification of −1/30 at the telephoto end.

FIGS. 75(a)–80(c) show of coma aberrations in the sixth embodiment when the image is shifted by 0.01 rad (radian) with respect to the optical axis. FIGS. 75(a)–75(c) show the coma aberrations in the infinite distance focusing state at the wide-angle end, FIGS. 76(a)–76(c) show the coma aberrations in the infinite distance focus state at an intermediate focal length state, and FIGS. 77(a)–77(c) show the coma aberration in the infinite distance focus state at the telephoto end.

FIGS. 78(a)–78(c) show the coma aberrations at a photographic magnification of −1/30 at the wide-angle end, FIGS. 79(a)–79(c) show the coma aberration at a photographic magnification of −1/30 at an intermediate focal length state, and FIGS. 80(a)–80(c) show the aberrations at a photographic magnification of −1/30 at the telephoto end.

As is clear from these figures, the aberrations are corrected well in each focal length state and each photography distance state, even during image shifting.

In the above-described embodiments, examples were shown of imaging performance for the case where the image shift was 0.01 rad with respect to the optical axis. However, it is also possible to obtain good imaging performance with the present invention with respect to larger image shift amounts.

Furthermore, in the fourth-sixth embodiments, examples are shown wherein each of the lens groups L41 and L43 are composed of a single plastic lens. However, it is equally possible to form these lens groups each with a plurality of lenses containing one or more plastic lenses.

With the above-described embodiments, an object is to correct fluctuations in image position by shifting the image, without creating image plane warping when the shift lens group decenters. Conversely, the shift lens is configured so that the image plane becomes inclined by only a predetermined amount when the shift lens group is moved, so the zoom lens of the present invention can also be used as a tilt lens.

The zoom lens according to the preferred embodiments of the present invention is not limited to a zoom lens capable of image shifting. For example, it is clear that good imaging performance can also be obtained when this zoom lens is used as a regular zoom lens.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A zoom lens system having at least one lens group moveable along an optical axis, comprising:
an image shifting lens group, comprising:
a first lens sub-group,
a second lens sub-group, comprising at least one positive lens element and at least one negative lens element and being moveable in a direction substantially perpendicular to an optical axis for shifting an image, and
a third lens sub-group,
wherein refractive powers of the first, second and third lens sub-groups satisfies the condition:

$-0.25 < (\phi B1 + \phi B3)/\phi B2 < 0.25$ where:
φB1 is the refractive power of the first lens sub-group;
φB2 is the refractive power of the second lens sub-group; and
φB3 is the refractive power of the third lens sub-group.

2. The zoom lens system according to claim 1, further comprising an aperture stop.

3. The zoom lens system according to claim 2, wherein a lens surface which is closest to the aperture stop of the lens sub-group that is farthest from the aperture stop has a concave surface facing the aperture stop.

4. The zoom lens system according to claim 3, wherein the lens surface satisfies the condition:

$0.05 < D/|ra| < 0.6,$ where ra is the radius of curvature of the lens surface, and D is the distance along the optical axis between the lens surface and the aperture stop.

5. The zoom lens system according to claim 1, further comprising a focussing lens group separate from and adjacent to the image shifting lens group, wherein focussing is effected by moving the focussing lens group along the optical axis.

6. The zoom lens system according to claim 5, wherein the focussing lens group is positioned on a side of the image shifting lens group closest to an object.

7. The zoom lens according to claim 5, wherein the condition:

$(\beta t + 1/\beta t)^{-2} < 0.16$ is satisfied, where βt is an imaging magnification of the focussing lens group at a telephoto magnification.

8. The zoom lens system of claim 1, wherein each of said first and third lens sub-groups comprise at least one plastic lens.

9. The zoom lens system of claim 8, wherein the first and third lens sub-groups satisfy the condition:

$-1 < (\phi P1 + \phi P3)/(\phi P1 - \phi P3) < 1,$ where:
φP1 is the refractive power of the at least one plastic lens in the first lens sub-group, and
φP3 is the refractive power of the at least one plastic lens in the third lens sub-group.

10. The lens system of claim 9, wherein the first and third lens sub-groups satisfies condition:

$$0.5 < (|\phi P1| + |\phi P3|)/\phi t < 3,$$

where:

φt is the refractive power of the entire lens system at the telephoto end.

11. The zoom lens system of claim 8, further comprising an aperture stop, wherein at least one of the plastic lenses contained in said first and third lens sub-groups comprises a concave surface facing said aperture stop.

12. The zoom lens system of claim 8, wherein the plastic lenses have a meniscus shape.

13. A lens system, comprising:
   a focusing lens group; and
   an image shifting lens group, comprising:
      a first lens sub-group,
      a second lens sub-group, comprising at least one positive lens element and at least one negative lens element and being moveable in a direction substantially perpendicular to an optical axis for shifting an image, and
      a third lens sub-group,
   wherein refractive powers of the first, second and third lens sub-groups satisfies the following conditions:

$$-0.25 < (\phi B1 + \phi B3)/\phi B2 < 0.25;$$

and $$(\phi t + 1/\beta t)^{-2} < 0.16$$

where:

φB1 is the refractive power of the first lens sub-group;
φB2 is the refractive power of the second lens sub-group;
φB3 is the refractive power of the third lens sub-group; and
βt is an imaging magnification of the focusing lens group at a telephoto state.

14. The lens system of claim 13, further comprising an aperture stop adjacent to the image shifting lens group.

15. The lens system of claim 14, wherein the image shifting lens group is moveable along the optical axis for zooming.

16. A lens system, comprising:
   an image shifting lens group, comprising:
      a first lens sub-group comprising at least one plastic element;
      a second lens sub-group, comprising at least one positive lens element and at least one negative lens element and being moveable in a direction substantially perpendicular to an optical axis for shifting an image; and
      a third lens sub-group comprising at least one plastic lens element;
   wherein the at least one plastic element in the first lens sub-group and the at least one plastic element in the third lens sub-group are meniscus shaped.

17. A lens system, comprising:
   an image shifting lens group, comprising:
      a first lens sub-group comprising at least one plastic element;
      a second lens sub-group, comprising at least one positive lens element and at least one negative lens element and being moveable in a direction substantially perpendicular to an optical axis for shifting an image; and
      a third lens sub-group comprising at least one plastic lens element;
   wherein the first and third lens sub-groups satisfy the condition:

$$0.5 < (|\phi P1| + |\phi P3|)/\phi t < 3,$$

where:

φP1 is the refractive power of the at least one plastic lens in the first lens sub-group,
φP3 is the refractive power of the at least one plastic lens in the third lens sub-group, and
φt is the refractive power of the entire lens system at a telephoto end; and wherein the signs of the refractive powers φP1 and φP3 are opposite from each other.

* * * * *